US007653459B2

(12) United States Patent
Pouchak et al.

(10) Patent No.: US 7,653,459 B2
(45) Date of Patent: Jan. 26, 2010

(54) VAV FLOW VELOCITY CALIBRATION AND BALANCING SYSTEM

(75) Inventors: Michael A. Pouchak, Saint Anthony, MN (US); Wacker Paul, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 370 days.

(21) Appl. No.: 11/620,431

(22) Filed: Jan. 5, 2007

(65) Prior Publication Data
US 2008/0004754 A1 Jan. 3, 2008

Related U.S. Application Data

(63) Continuation-in-part of application No. 11/427,750, filed on Jun. 29, 2006.

(51) Int. Cl.
*G01M 1/38* (2006.01)
(52) U.S. Cl. .................................... 700/276
(58) Field of Classification Search ................ 700/276, 700/279, 282, 301
See application file for complete search history.

(56) References Cited

U.S. PATENT DOCUMENTS

| 4,784,580 | A | 11/1988 | Takata et al. |
| 5,449,319 | A | 9/1995 | Dushane et al. |
| 5,479,812 | A | 1/1996 | Juntunen et al. |
| 5,605,280 | A | 2/1997 | Hartman |
| 5,786,525 | A * | 7/1998 | Freund et al. ............ 73/1.34 |
| 5,970,430 | A * | 10/1999 | Burns et al. ............. 702/122 |
| 6,330,806 | B1 | 12/2001 | Beaverson et al. |
| 6,430,985 | B1 * | 8/2002 | Drees .................... 73/1.34 |
| 6,453,687 | B2 | 9/2002 | Sharwood et al. |
| 6,536,678 | B2 | 3/2003 | Pouchak |
| 6,549,826 | B1 | 4/2003 | Pouchak et al. |
| 6,934,862 | B2 | 8/2005 | Sharwood et al. |
| 2004/0144849 | A1 | 7/2004 | Ahmed |
| 2004/0238653 | A1 | 12/2004 | Alles |

FOREIGN PATENT DOCUMENTS

EP          1380909       *   1/2004

OTHER PUBLICATIONS

Honeywell, T7770A,B,C,D,E,F,G, Wall Modules, Excel 5000 Open System, pp. 1-4, 1997.

* cited by examiner

*Primary Examiner*—Albert DeCady
*Assistant Examiner*—Chad Rapp

(57) ABSTRACT

A variable velocity calibration and balancing system having a basis in a function block engine. It pertains to variable air volume systems and particularly to balancing systems as they relate to heating, ventilation and air conditioning (HVAC) systems. Balancing may be addressed using functional blocks to represent actual control and connections in an HVAC application for a variable air volume application.

8 Claims, 39 Drawing Sheets

| Linearization Table | | Pressure in Pascals (Not in Table) |
|---|---|---|
| Counts In | Counts Out | |
| 0 | 0 | -15 |
| 144 | 2390 | 0 |
| ••• | ••• | ••• |
| 4095 | 65520 | 400 |

Figure 5

Analog Inputs

| Input Name | Cfg | Range | | Input Value | Description |
|---|---|---|---|---|---|
| | | Low | High | | |
| press | IN_PAR | >=-∞ | <+∞ | Unconnected | Flow & Vel outputs set to invalid |
| | | | | Invalid | Flow & Vel outputs set to invalid |
| | | | | >-0.002425 and <0.002425 inw | Flow & Vel=0 |
| autoSetOffset | IN_PAR | >=-∞ | <+∞ | Unconnected | No effect on output |
| | | | | Invalid | No effect on output |
| | | | | !=0 | Set offset = incoming press |
| ClearOffset | IN_PAR | >=-∞ | <+∞ | unconnected or invalid | No effect on output |
| | | | | !=0 | Set offset = 0 |
| Area | PAR_IN | >=-∞ | <+∞ | Invalid or <=0; Value in ft^2 | Velocity set to invalid |
| KFactor | PAR_IN | >=-∞ | <+∞ | Unconnected | Flow & Vel outputs set to invalid |
| | | | | Invalid | Flow & Vel outputs set to invalid |
| | | | | <=0 | KFactor = 1015 |

*Figure 8*

Outputs 103

| Output Name | Cfg | Range | | Description |
| --- | --- | --- | --- | --- |
| | | Low | High | |
| flow | OUT_FLT | >=-∞ | <+∞ | Flow value (ft^3/min) |
| offset | OUT_FLT_SAV | >=-∞ | <+∞ | Input press offset correction (inches water column). Not for connection. Stores Flow offset amount |
| vel | OUT_FLT | >=-∞ | <+∞ | Flow velocity (ft/min) |

96 — flow row
97 — offset row
98 — vel row

*Figure 9*

| NV NAMES (16 CHARACTER LIMIT) |
|---|
| nviFlowOverride |
| nvoBoxFlowCool |
| nciKFactorCool |
| nciDuctAreaCool |
| nvoCmdCoolDmpPos |
| nciOccMinFlowCSP |
| nciMaxFlowCoolSP |
| nciMeasMinFlowC |
| nciMeasMaxFlowC |
| nviAutoOffsetC |
| nviClearOffsetC |
| nvoVelSenPressC |
| nvoPressOffsetC |
| nvoEffectFlowCSP |

*Figure 10*

Analog Inputs

| Input Name | Cfg | Range | | Input Value | Description |
|---|---|---|---|---|---|
| | | Low | High | | |
| nStagesActive | IN_ONLY | 0 | 255 | unconnected | Stages all off |
| | | | | invalid | Stages all off |
| runtimeReset. | IN_ONLY | 0 | 255 | unconnected | No action to reset; runtime can accumulate |
| | | | | invalid | No action; runtime can accumulate |
| | | | | Value=0 | No action; runtime can accumulate |
| | | | | 1<=VAL<=255 | Stage runtime for stage VAL is reset to 0; runtime for this stage will not accumulate-you must reset VAL to 0 to allow accumulation of runtime. |

*Figure 27*

Outputs

| Output Name | Cfg | Range | | Description |
|---|---|---|---|---|
| | | Low | High | |
| Stage1 | OUT_DIG | 0 | 1 | Stage 1 output |
| Stage2 | OUT_DIG | 0 | 1 | Stage 2 output |
| Stage3 | OUT_DIG | 0 | 1 | Stage 3 output |
| Stage4 | OUT_DIG | 0 | 1 | Stage 4 output |
| Stage5 | OUT_DIG | 0 | 1 | Stage 5 output |
| stgStatusOut | OUT_FLT | | | Output value to connect to StageDriverAdd block. The floating number must be converted to an integer and then converted to a 2 byte value. The upper byte (value right shifted 8 bits) is the maxStgs info and the lower byte (value AND 0xFF) is the stageStatus offset to reference the starting location in digital memory for the stageStatus bytes. |
| offset | OUT_FLT_SAV | | | Float value has two components - after conversion to a two byte unsigned integer value the upper byte is offset of number of nonvolatile entries to get to the start of the stage runtime storage (used only for leadLag=LL-RUNEQ) and the lower byte is the offset of number of digital memory locations to the start of the stage status bytes (one byte allocated per 8 stages assigned in maxStgs) |

Analog Inputs

| Input Name | Cfg | Range | | Input Value | Description |
|---|---|---|---|---|---|
| | | Low | High | | |
| stgStatusIn | IN_ONLY | 1 | 255 | unconnected | Stages all off |
| | | | | invalid | Stages all off |

Outputs

| Output Name | Cfg | Range | | Description |
| --- | --- | --- | --- | --- |
| | | Low | High | |
| Stage1 | OUT_DIG | 0 | 1 | Stage 1 output |
| Stage2 | OUT_DIG | 0 | 1 | Stage 2 output |
| Stage3 | OUT_DIG | 0 | 1 | Stage 3 output |
| Stage4 | OUT_DIG | 0 | 1 | Stage 4 output |
| Stage5 | OUT_DIG | 0 | 1 | Stage 5 output |
| Stage6 | OUT_DIG | 0 | 1 | Stage 6 output |
| Stage7 | OUT_DIG | 0 | 1 | Stage 7 output |
| Stage8 | OUT_DIG | 0 | 1 | Stage 8 output |

*Figure 31*

From Figure 34

↓ Yes

517

```
Input = nstgActive
if (input < old num stages)
diff = oldnumstages-input
stg = diff + seqStartptr
seqStart ptr = stg % max Stgs;
oldnumstages = input i startptrTemp = seqStartptr;
if (input = 0) seqEndptr = seqStartptr
else seqEndptr = (seqStartptr + input -1) % maxStgs;
endptrTemp = seqEndptr;
i = 0;
while (i < max Stgs)
if (i > = start ptr temp) & ci < endptrtemp)
else cmd = 0;
SetStageStatus (VID_ControlDigitalBase + offset Stage Status,i,cmd)
if (i<5) PotFVAL (stage[i] cmd); i ++
```

*Figure 35*

```
stage Status = Get Stage Status (base Stage Status,i)
    // if (stageStatus) // stage is On
        runtime copy ++;
        number Stages Counted On;++;
    Put FVAL (base Stage Runtimer + i, runtime copy)
    if (runtime copy > = highest Stage Runtime)
        highest Stage Runtime = rutnime copy
        highest Stage NumRuntime = i;

else // stage is off
    if (runtime copy < lowest Stage Runtime)
        lowest Stage Runtime = rutnime Copy;
        Lowest Stage Num Runtime = i;
        Stage Runtime = Runtime copy
```

```
i++;
if (input > number Stages Counted On)
    Set Stage Status (base Stage Status, lowest Stage Num Runtime, 1)
if (input < number Stages counted On)
    Set Stage Status (base Stage Status, highest Stage Num Runtime, 0);
    // cmd Stgs.
    i = 0;
    while (i < 5)

runtime copy = Get FVAL (base Stage Runtimer + i)
    Stage Status = Get Stage Status (base Stage Status, i);
    put FVAL (stage[i], stage Status)
    i ++ if (runtime reset : = 0)
    put FVAL (base Stage Runtimer + runtime Reset - 1, 0)
    // reset runtime value to 0 for number specified
```

Read Variables offset Stage Status = stgStatus in UInt 16 x OXFF
max Stgs = stg Status In UInt 16 >> 8
base Stage Status = VID_Control Digital Base + offset Stage Status;
i = 0
Current stgNum = firstStgNum-1;
while (i < 8)

if(current StgNum < max Stgs)
cmd = Get Stage Status (base StageStatus, current StgNum);
else
cmd = 0;
Put FVAL (stage[i], cmd)
i ++;
current Stg Num ++;

VAV FLOW VELOCITY CALIBRATION AND BALANCING SYSTEM

This application is a continuation-in-part of U.S. patent application Ser. No. 11/427,750, filed Jun. 29, 2006.

BACKGROUND

The present invention pertains to variable air volume (VAV) systems and particularly to balancing systems. More particularly, the invention pertains to such systems in conjunction with HVAC (heating, ventilation and air conditioning) systems.

The present invention may appear to be related to U.S. Pat. No. 6,549,826, issued Apr. 15, 2003, U.S. Pat. No. 6,536,678, issued Mar. 25, 2003, and U.S. Pat. No. 5,479,812, issued Jan. 2, 1996.

U.S. Pat. No. 6,549,826, issued Apr. 15, 2003, U.S. Pat. No. 6,536,678, issued Mar. 25, 2003, U.S. Pat. No. 5,479,812, issued Jan. 2, 1996, and U.S. patent application Ser. No. 11/427,750, filed Jun. 29, 2006, are hereby incorporated by reference.

SUMMARY

The invention is a variable velocity calibration and balancing system having a basis in a function block engine.

BRIEF DESCRIPTION OF THE DRAWING

FIG. 5 reveals a linearization table;

FIGS. 8 and 9 show a table of analog inputs and a table of outputs, respectively, for the VELP function block or module;

FIG. 10 is a list of network variables (NVs) used in the function block engine for balancing;

FIG. 27 is a table of analog inputs for the stage driver;

FIG. 28 is a table of analog outputs of the stage driver;

FIG. 30 is a table of the analog input for the stage driver addition;

FIG. 31 is a table of the analog outputs for the stage driver addition;

FIGS. 33-38 constitute a block diagram of the stage driver; and

FIG. 39 is a diagram of the stage driver add.

DESCRIPTION

Figure 1:
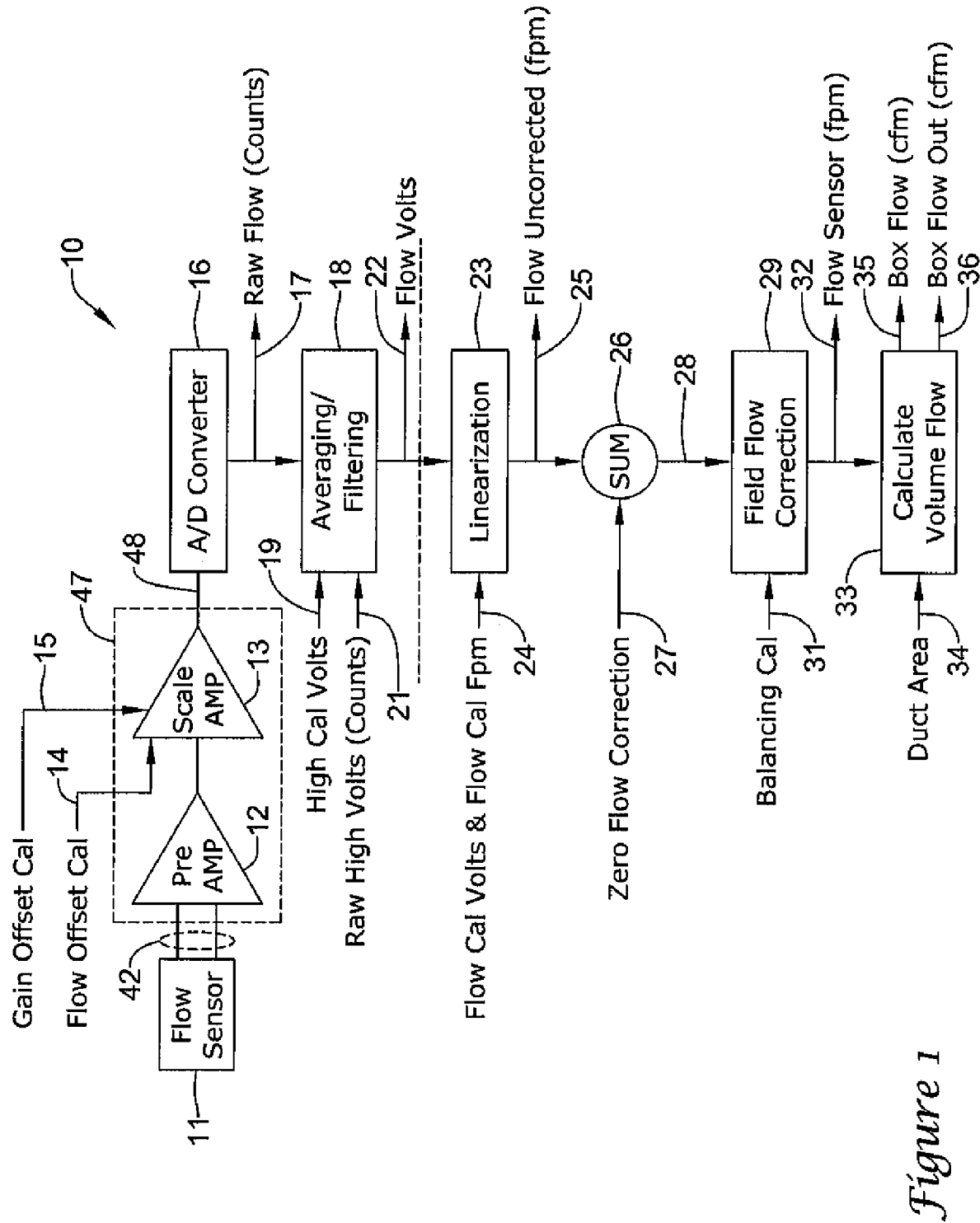
FIG. 1 is a block diagram of a flow velocity calibration and balancing system.

VAV (variable air volume) reduces the air quantity under periods of limited or no occupancy and saves both energy of air delivery and the energy involved in the heating/cooling the air. The present VAV system has an ability to have high resolution of air flow and the accurate control to an air setpoint, especially at low flow volume. The VAV air flow calibration process or field balancing is a very important part of the product delivery that allows an HVAC balancer to measure the flow very accurately and max flow and min flow and enter an adjustment to the VAV control calibration. At the high end of accuracy and resolution, ten point curves detailing the air pressure (proportional to voltage) in relation to velocity air flow may be customized and developed for the manufacture of flow pickup devices. There appears to be a need to develop an approach that can incorporate the minimum flow and calibration information in addition to the ease required for an HVAC balancer.

Advantages of present system may include the following. Function block architecture allows flexibility to accommodate new architectures, hardware, or changes in HVAC equipment due to improvements in sequences, control strategies, or communication to achieve balancing. A modular system gives ease of understanding. There is efficient use of resources—vastly simpler for balancing algorithm to implement resulting in savings of time and hardware/software resources. It takes advantage of a high point calibration technique in the present assignee's U.S. Pat. Nos. 6,549,826 and 5,479,812. This technique appears as being recognized in industry as leading in flow accuracy and low cost. The present invention facilitates this technique in a much more simple and elegant way.

The invention may result in an ability to use multi-platform, multi-purpose programmable controller algorithms that can be adapted to, combined, merged, and/or synthesized with multi-protocols (TCP/IP/Ethernet, BACnet™, LON™, and so on), other applications (RTU, CVAHU, UV, FCU, VAVAHU, and so forth), internet (T7350H, XL15B, webserver) application (HVAC, boiler control per U.S. Pat. No. 6,536,678 owned by the present assignee) and industry (security, test, OEM, and so forth).

The present invention may address the balancing issues by using software blocks to represent actual control software and connections in an HVAC application control for a VAV application. Blocks used in the description of the balancing process include the VELP or velocity pressure block which converts a velocity pressure value to a velocity, the Comparison block which takes two values and compares them to each other and outputs a true if it is matching, the conjunction block which does a logical AND and a comparison of logical outputs and sets the output to true, and override function which picks the highest priority input and a ratio box which allows multi-segment performance contouring of the resultant function for flow. The present invention solves both the ten point curve calibration issue for very accurate and non-linear flow pick-up equations and also allows for the two point balancing flow capability required for quick and accurate use in the balancing process.

The present invention has a block of input ten point linearization, zeroing and calibration through a coordination of flow velocity and balancing calibration blocks. With respect to air flow detection and measurement, following the flow signal, first, the flow sensor output voltage is amplified by a fixed-gain pre-amplifier, and then by a programmable scale amplifier. During Factory Test, the gain and offset required to correct the gain and offset of individual sensors are stored in a hardware adjustable gain circuit. The A/D converter integral with the micro-processor converts the flow sensor voltage into counts that that are inversely proportional to the flow sensor voltage. During Factory calibration, the reference voltage is tested and used to store the correct calibration in a separate digital memory or hardware circuit. A ten point curve in memory is used to adjust the linearization of the velocity pressure based on factory calibration of one or two specific pressures, including zero. The flow sensor is zero corrected in the HVAC control application before use in the final control circuit. The ZeroFlowCorrection value is subtracted from the flow pressure in the control application.

The flow sensor voltage is linearized and converted to feet per minute by applying a linearization curve stored in EEPROM (nciVoltsCal and nciFlowCal). Between stored curve points, linear interpolation is used. The linearization curve is loaded into EEPROM using a management tool. The curve takes into account the sensor variations (using measurements made in the factory and stored in EEPROM in nciFactoryCal) and the pickup device curve (unique for each model and duct size).

The flow sensor results may be further corrected by field (job site) measurements. Using a management tool, three actual measured and three apparent values of flow may be entered into EEPROM (nciFld3PtCal). Then the linearized flow is corrected to the functional flow by the three point curve using linear interpolation between the points.

The air flow sensing approach may be noted. Referring to FIG. 1 showing a flow sensor block diagram, first, the flow sensor 11 output voltage is amplified by a fixed gain pre-amplifier 12, and then by a programmable scale amplifier 13. During Factory Test, the gain 15 and offset 14 required to correct the gain and offset of individual sensors are stored in EEPROM (FlowGainCal and FlowOffsetCal). At application restart and once a second when Mode is Factory Test, the scale amplifier hardware register is loaded with the stored gain and offset from EEPROM. The A/D converter 16 may convert the flow sensor voltage into counts that are inversely proportional to the flow sensor voltage. The A/D converter 16 may also convert a reference voltage into counts. During Factory Test, the reference voltage is measured and stored in EEPROM (HighCalVolts 19). The two raw counts 17, 21 and HighCalVolts 19 may be combined using a one point reference fixed slope linear equation to calculate the flow sensor voltage (FlowVolts) 22. The latter may occur in the averaging/filtering module 18.

The flow sensor is zero corrected before linearization. The ZeroFlowCorrection value 27 may be subtracted from the flow sensor before or after the flow sensor linearization 23.

The flow sensor voltage 22 may be linearized and converted to feet per minute by applying a linearization curve stored in EEPROM (nciVoltsCal and nciFlowCal). Between stored curve points, linear interpolation may be used. The linearization curve is loaded into EEPROM using a management tool. The curve takes into account the sensor variations (using measurements made in the factory and stored in EEPROM in nciFactoryCal) and the pickup device curve (unique for each model and duct size).

The flow sensor results may be further corrected by field (job site) measurements. Using a management tool, three actual measured and three apparent values of flow may be entered into EEPROM (nciFld3PtCal)—balancing calibration. Then the linearized flow may be corrected to the functional flow by the three point curve using linear interpolation between the points. There may be more (e.g., 10) or less (e.g., 2) measured and apparent values of flow along with a corresponding multi-point (e.g., 10, 2 or other) curve.

It may be noted that FlowOffsetCal and FlowGainCal may be written from the EEPROM to the hardware registers at application_restart, and when Mode is Factory Test.

FIG. 1 is a block diagram of the present flow velocity calibration and balancing system 10. Flow sensor 11 may be of a variable air volume (VAV) module. The sensor 11 may detect flow with a pair of pneumatic tubes in an air flow vent, duct or channel. The output may be a differential pair of signals that go to a preamplifier 12. The output of amplifier 12 may go to a scale amplifier 13. A flow offset signal 14 and a gain offset signal 15 may also be input to amplifier 13 to adjust the flow pressure signal relative to flow and gain offsets, respectively. The adjusted output of the scale amplifier 13 may go to an analog-to-digital converter 16. The output of converter 16 may be a raw flow signal 17 in counts which is input to an averaging and filtering module 18. Module 18 may have a high calibration voltage signal 19 and raw high calibration volts in terms of counts signal 21 input to module 18. The output of module 18 may be a signal 22 in volts indicating an amount of flow. Signal 22 may go to an input of a linearization module 23 which provides an output signal 25 that proportionally represents uncorrected flow in terms of feet per minute (fpm). Input 24 for flow calibration volts and flow calibration in fpm may be input to module 23.

The output 25 of module 23 may go to a summer 26 to be summed with a signal 27 of zero flow correction. The sum of signals 25 and 27 may go as an input signal 28 to a field flow correction module 29. A balancing calibration signal 31 may be input to module 29. A signal 23 from module 29 may be a flow sensor output in terms of fpm. Signal 32 may go to a calculate volume flow module 33. There may be an input signal 34 containing duct area in, for example, square feet (f^2). The calculation of the inputs 32 and 34 may result in output signals 35 and 36 representing box flow and box flow out, respectively, in terms of cfm.

Figure 2:
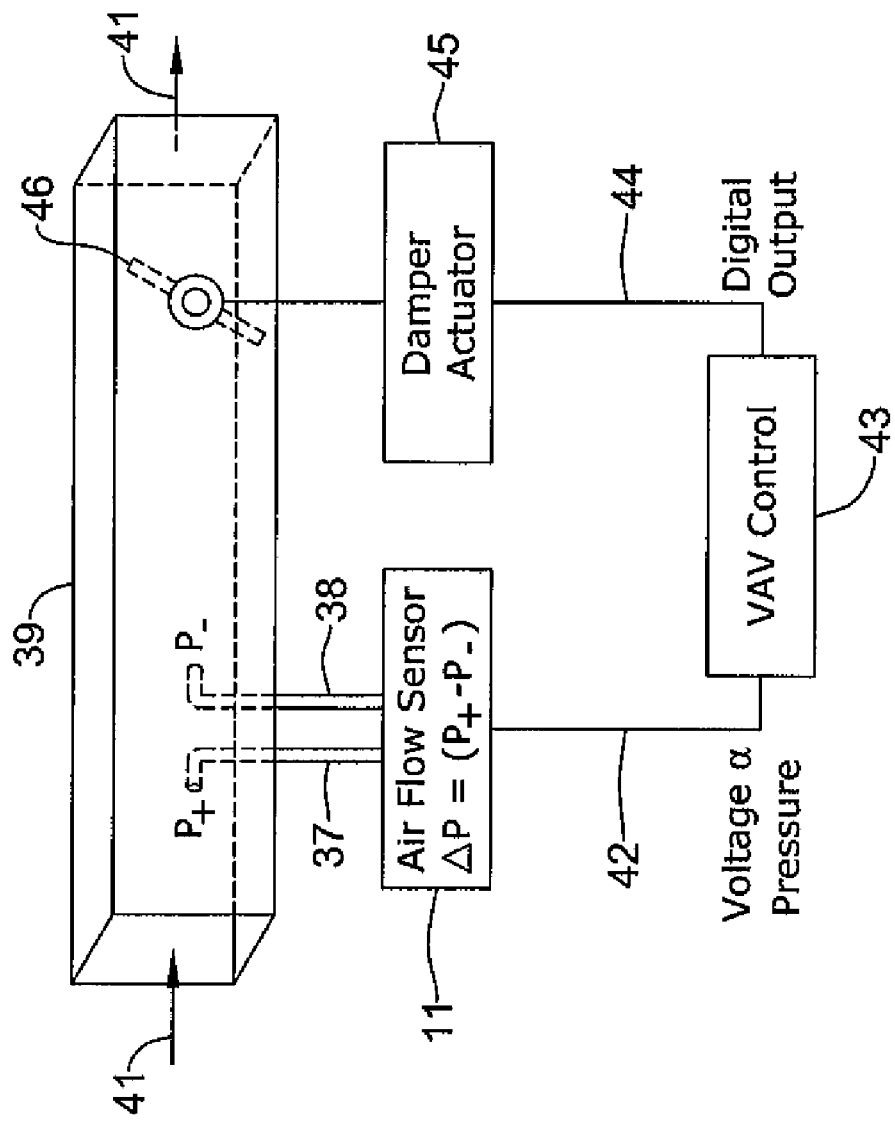
FIG. 2 is a diagram of the air flow sensor.

FIG. 2 shows the air flow sensor 11 with tubes 37 and 38 having ends situated in a duct 39 for measuring a flow of air 41 going through duct 39. Incidentally, the cross-section shape of duct 39 may be square, rectangular, round or another shape. The ends of tubes 37 and 38 may be situated upstream and downstream relative to each other in duct 39. As air 41 is flowing from left to right in the Figure, the end of tube 37 may sense a positive pressure ($P_+$) and the end of tube 38 may sense a negative pressure ($P_-$). A delta pressure ($\Delta P$) which is a difference of a $P_+$ and $P_-$ may be converted into a voltage where the voltage is proportional to the delta pressure. This voltage may be a signal 42 that goes to a variable air volume (VAV) module 43. Signal 42 may be processed between the air flow sensor 11 and VAV control module 43 or within module 43. An output signal 44 may be digital and provided to a damper actuator 45 for controlling a damper 46. Damper 46 may be incrementally closed or opened to regulate the air flow in terms of volume (cfm) through duct 39.

The following is an explanation of a Piranha™ simulator balance chart. The process may be shown in a block diagram. The flow sensor input "Flow Sensor" is a valve that comes from the A/D hardware after it has been linearized to an engineering unit in inches water (inw). In a VAV system, the pressure sensor is converted to a flow valve by use of the following equation.

$$\text{flow} = K(\Delta P - \text{offset})^{1/2}, \text{ and}$$

$$\text{vel} = \text{flow/area};$$

where K=Flow coefficient (K-Factor) representing the actual flow in ft$^3$/min corresponding to a velocity pressure sensor output of 1" w.g., $\Delta P$=flow sensor output pressure in inches water gauge (in W), Offset=a correction pressure (in W) to adjust for zero, Flow=airflow in ft$^3$/min (CFM), vel=flow velocity in ft/min; and area=duct area in ft$^2$. The K-factor is often used in terminal unit controls to calculate actual airflow.

Setting the autoSetOffset to a non-zero number results in the current pressure being stored as an offset that will be subtracted from the current pressure. The Offsetcan be cleared by setting the clear offset to a non-zero number. If the pressure is within 0.002425 inW of zero (approximately 50 fpm) then set the output flow and velocity to zero.

Consistent units should to be used. For example, if p is 1.02 inches water column, and if the offset is 0.02 inches water column, K is 1015, and the area is 0.54 square feet (10 inch diameter), then the flow will be 1015 feet per minute, and the velocity will be 1879 feet per minute.

In the preceding equation, flow is typically measured in cfm (cubic feet per minute) and $\Delta P$ is typically measured in inches water column (inw). The airflow is a pressure typically measured in inches water column. The flow sensor creates a voltage that is proportional to the pressure, $V \alpha P$ or $V$=(constant)$\times P$.

After the conversion from voltage to engineering units, the input is fed from the flow sensor of the VELP function block. The VELP function block converts the pressure in inw and converts it to a flow rate taking into account the flow zero value "offset". The value may be calculated as flow (in cfm) =$K(\Delta P - \text{offset})^{1/2}$.

Figure 3:
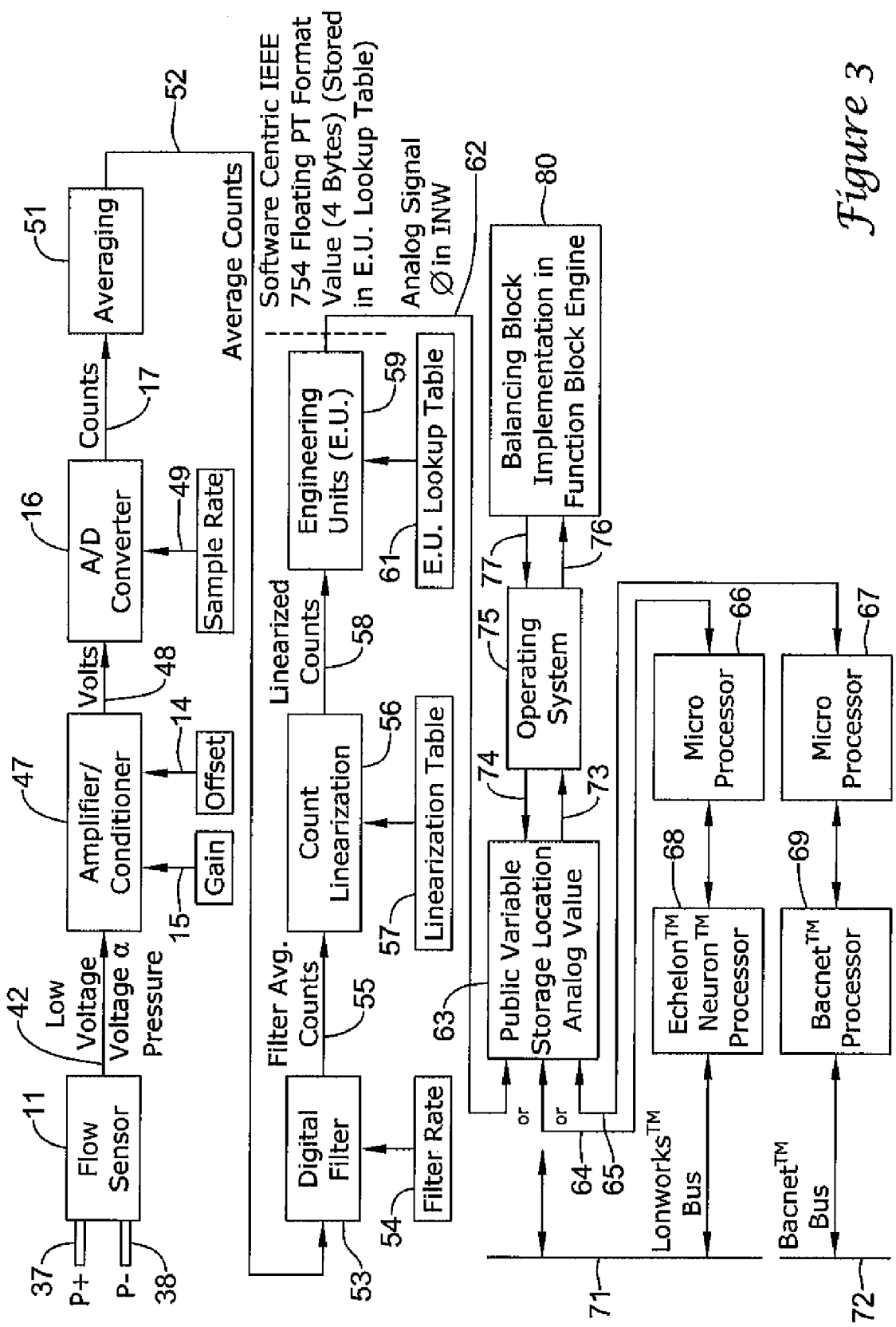
FIG. 3 is an extended block diagram of a system like that of FIG. 1.

FIG. 3 is a more detailed block diagram of the processing of signals for system 10. As in FIGS. 1 and 2, flow sensor 11 may provide a low voltage signal 42 where the voltage is proportional to the difference of sensed pressures from tubes 37 and 38. The output signal 42 may go to an amplifier/conditioner module 47. Module 47 may consist of preamp 12 and scale amp 13. Also, module 47 may have offset and gain signals 14 and 15 as inputs. An output 48 in volts may be provided by module 47 to the A/D converter 16. A sample rate input 49 may be provided to converter 16. An output 17 of counts may go to an averaging module 51 that provides averaging of signal 17. An average counts signal 52 may go to a digital filter module 53. A filter rate 54 may be input to digital filter 53. An output signal 55 of filtered average counts may be input to a count linearization module 56. Linearization by module 56 may be based on a linearization table 57 input to module 56. An output 58 of linearized counts may go to an engineering units (e.u.) module 59. Information for module 59 to provide an analog signal 62 in inw (inches of water) from linearized counts or units may be provided by an e.u. lookup table 61. Signal 61 may go to a public variable storage location analog value module 63. Alternatively, connections 64 or 65 may provide and/or receive signals between module 63 and microprocessor 66 or 67, respectively. Microprocessor 66 may be bidirectionally connected to an Echelon™ Neuron™ processor 68.

Microprocessor 67 may be bidirectionally connected to a BACnet™ processor 69. Processor 68 may be bidirectionally connected to a LonWorks™ bus 71. Processor 69 may be bidirectionally connected to a BACnet™ bus 72. Buses 71 and 72 may provide similar information as that of signal 62 ultimately from other sensors.

Module 63 may provide output signals 73 to an operating system module 75 and receive signals 74 from module 75. Operating system module 75 may provide signals 76 to a balancing block implementation in a function block engine module 80. Module 75 may receive signals 77 from module 80.

Figure 4:
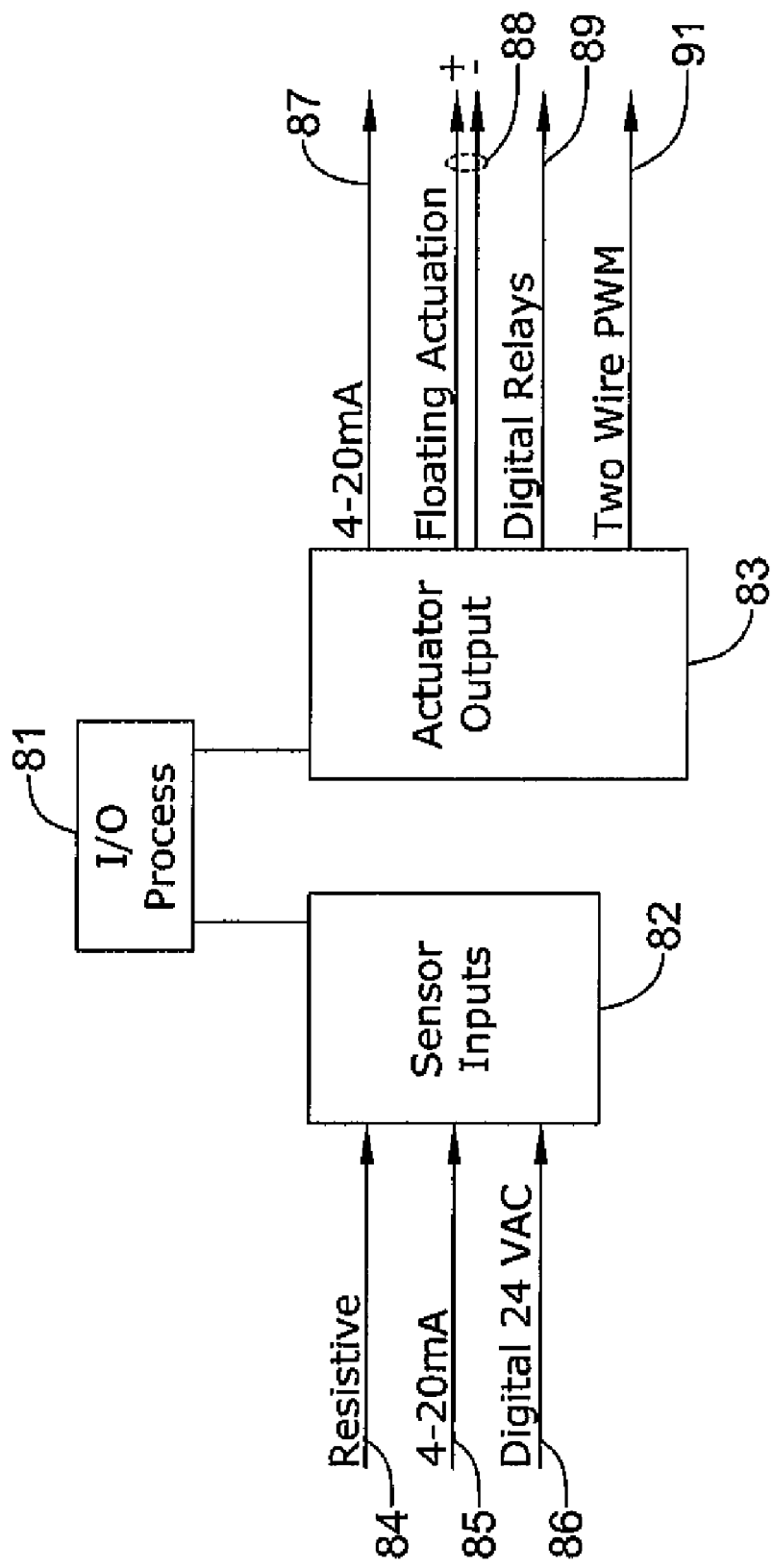
FIG. 4 is an input/output block diagram that may be associated with interacting with an operating system of a system like that in FIG. 3.

Module 63 may include an input/output processor module 81 that receives sensor inputs and provides actuator outputs. A sensor input module 82 may be connected to module 81. An actuator output module 83 may be connected to module 81. Inputs 84, 85 and 86 may receive resistive signals, 4-20 mA signals and digital 24 VAC signals, respectively. Other kinds of signals may be received by the inputs. Outputs 87, 88, 89 and 92 may provide signals for dampers, valves, and so forth. Outputs 87 may provide 4-20 mA signals. Output 88 may be a floating actuation of plus and minus signals of about 24 VAC to provide good resolution positioning of a damper at various angles relative to an air flow. Output 89 may provide digital relay signals and output 91 may be a two-wire PWM (pulse width modulated) signals. FIG. 4 is a diagram of modules 81, 82 and 83.

Figure 6:
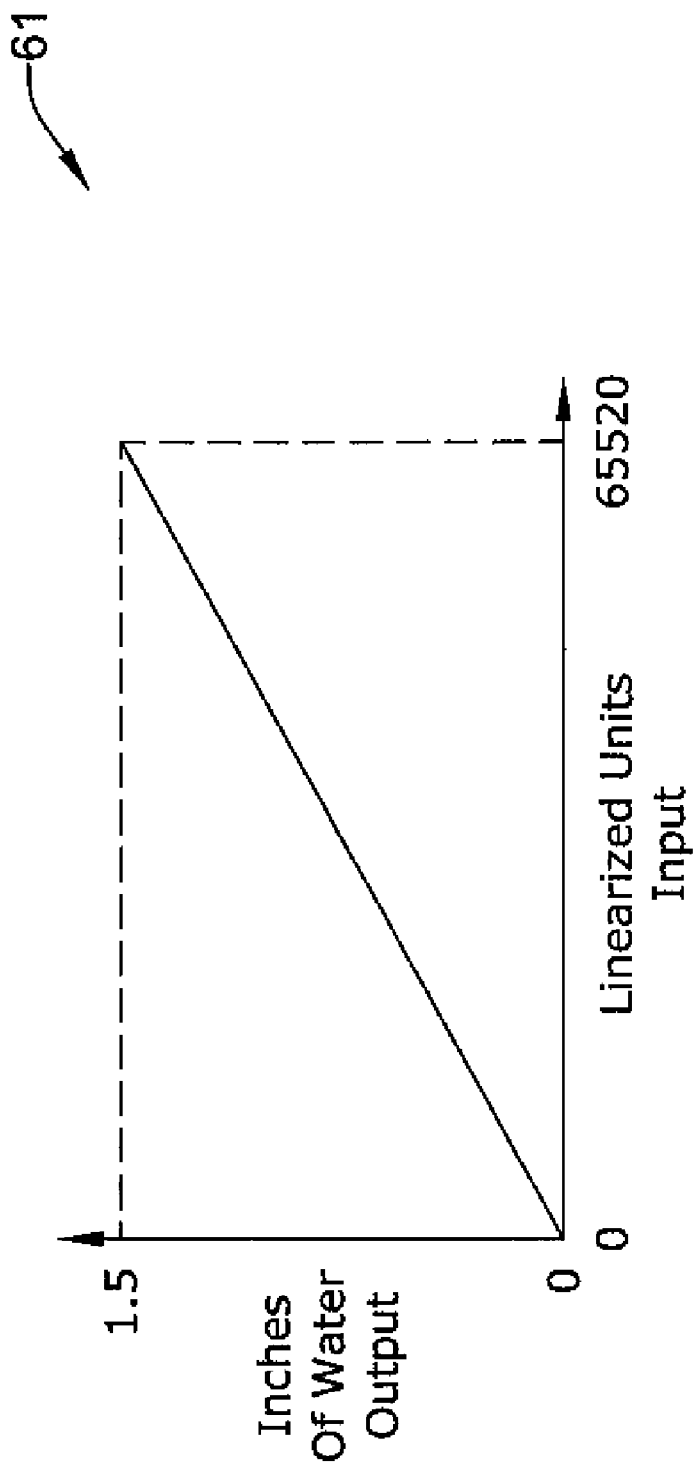
FIG. 6 shows an engineering units lookup table.

FIG. 5 shows a linearization table 57. It shows examples of linearization counts in and counts out for several pressures. The right column shows, for information, the subject pressures in Pascals. The latter information is not necessarily provided in the table. FIG. 6 shows the e.u. lookup table 61. It provides an equivalent inches of water output on the ordinate axis versus the linearized units input on the abscissa axis. The relationship appears to be linear.

Figure 7:
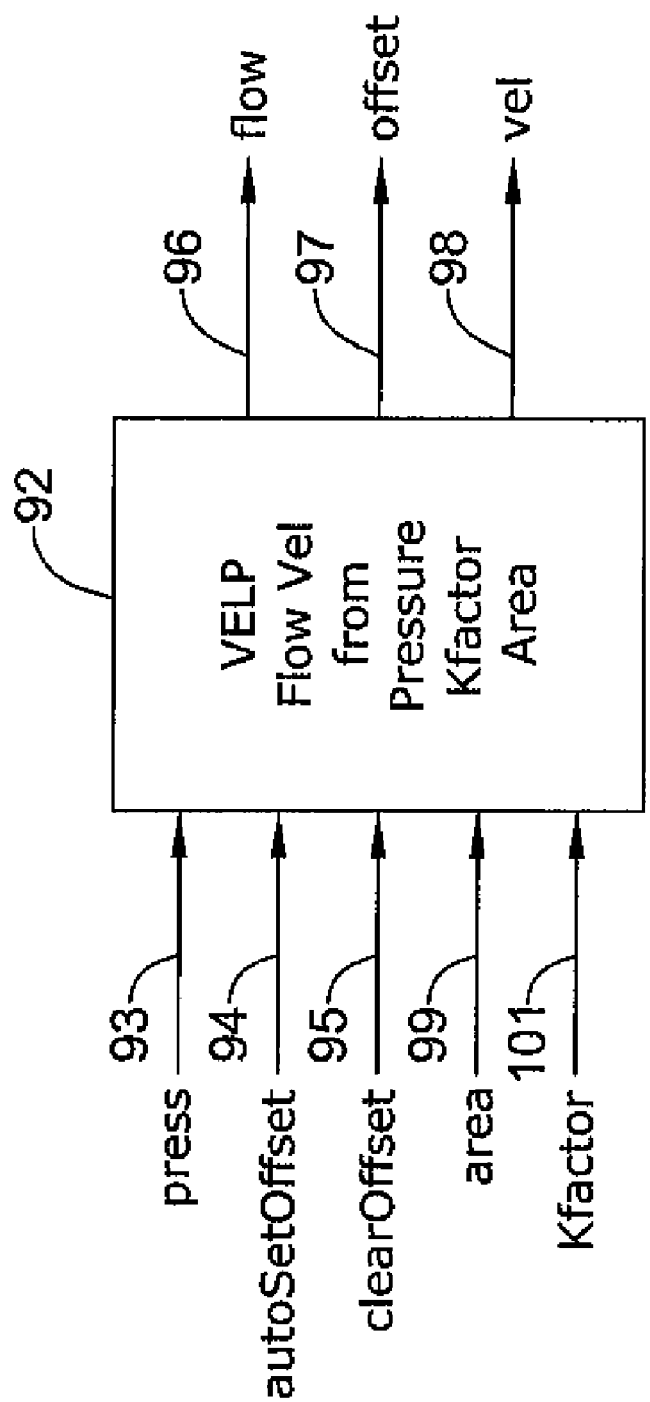
FIG. 7 shows a velocity pressure (VELP) function block.

FIG. 7 shows a velocity pressure (VELP) function block 92. It may provide a flow 96 from pressure kFactor and area. The inputs may include pressure 93, auto set offset and clear offset. The other outputs 97 and 98 may include offset and velocity, respectfully. Other inputs 99 and 100 may include area and kFactor, respectively.

FIGS. 8 and 9 show a table of analog inputs and a table of outputs for the VELP module 92, respectively. Table 102 has columns showing the input name, Cfg, low and high range, input value and description for each of the inputs 93, 94, 95, 99 and 101. Table 103 has columns showing output name, Cfg, low and high range, and description for each of the outputs 96, 97 and 98.

FIG. 10 is a list of network variables (NVs) used in the function block engine for balancing. The regular single duct VAV balancing may use the NV names.

Figure 11:
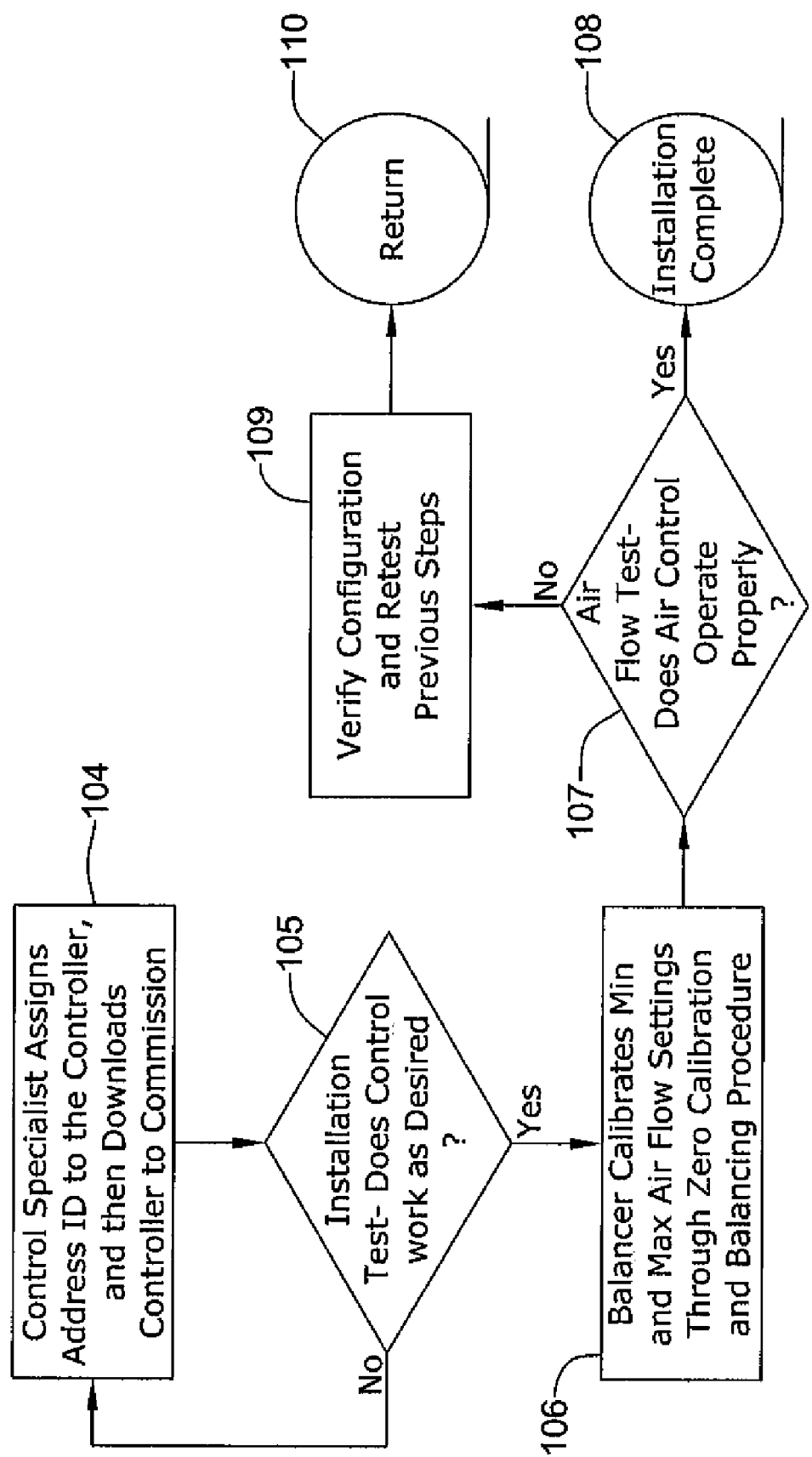
FIG. 11 is a diagram of a variable air volume balancing overview.

FIG. 11 is a diagram of a VAV balancing overview. Block 104 indicates that a control specialist may assign an address identification (ID) to a controller, and then download the controller using Evision™ or LonSpec™ to commission. The next step is an installation test question in diamond 105 of whether the control works as desired. If the answer is "no", then one may return to block 104. If the answer is "yes", then one may go to a block 106 where a balancer calibrates minimum and maximum settings through Evision™ or LonSpec™ zero calibration and balancing procedure. Other products besides Evision™ or LonSpec™ may be used in blocks 104 and 105. One may go to an air flow test question of diamond 107 which asks whether the air control operates properly. If the answer is "yes", then the installation as noted in circle 108 may be complete. If the answer is "no", then one may verify the configuration and retest items of the previous blocks as indicated in block 109. After doing such verification one or more times, without success, then one may return the air control system as indicated in circle 110.

Figure 12:
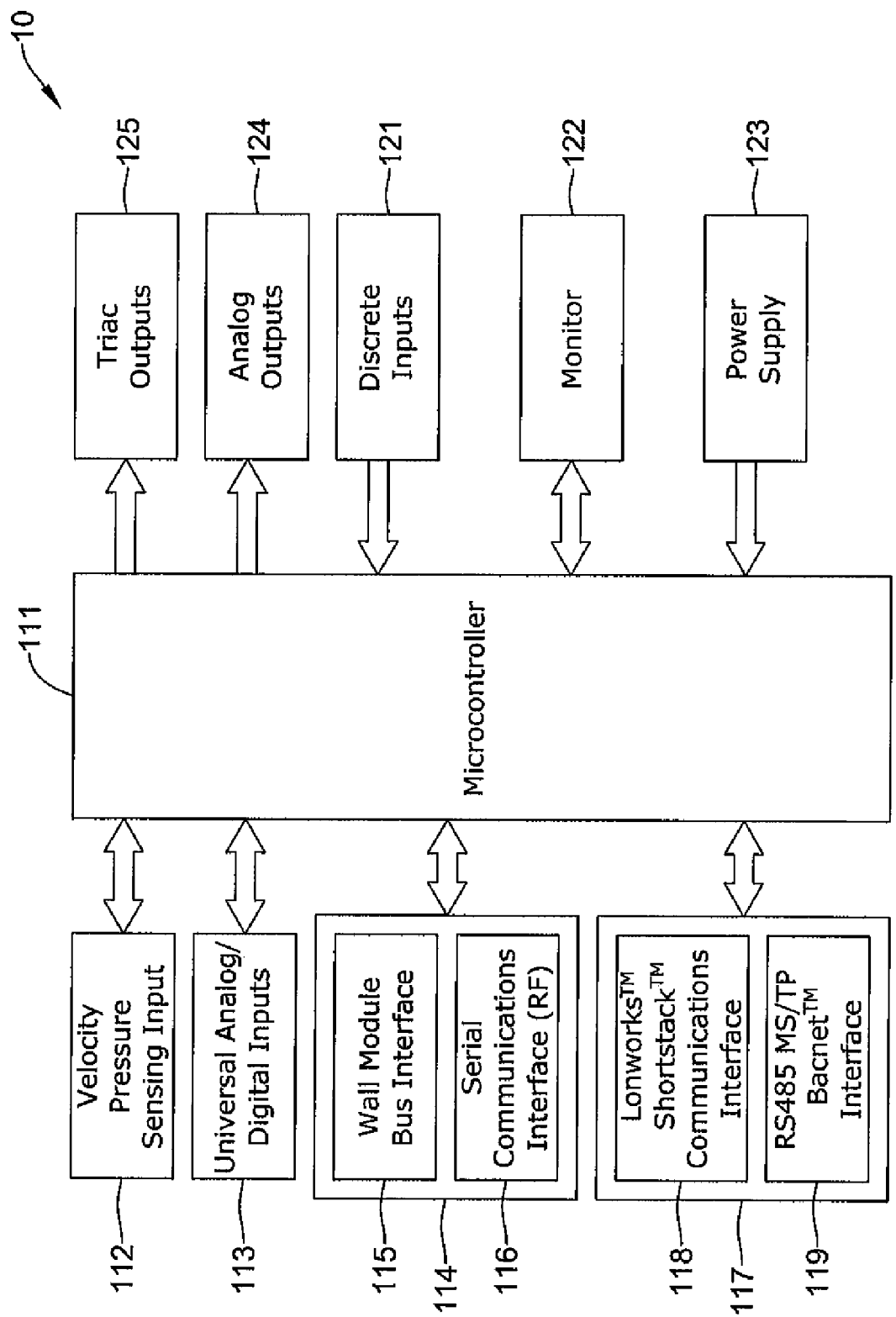
FIG. 12 is an overview block diagram of the present system with its interaction with a microcontroller.

FIG. 12 is an overview block diagram of the present system 10 with its interaction with a microcontroller. A central item may be a micro controller module 111. Microcontroller module 111 may have one or more processors. Velocity pressure sensing input module 112 may be connected to microcontroller 111. Universal analog/digital inputs module 113 may be connected to module 111. An interface module 114, having a wall module interface 115 and a serial communications interface (RF) 116, may be connected to module 111. Another interface module 117, having a LonWorks™ ShortStack™ communications interface 118 and an RS485 MS/TP BACnet™ interface 119 may be connected to module 111. A discrete inputs module 121 maybe connected to module 111. A monitor 122 may be connected to module 111. A power supply module 123 may be connected to module 111. An analog outputs module 124 and a triac outputs module 125 may be connected to module 111. Other modules, as desired, may be provided and connected to microcontroller module 111.

Figure 13:
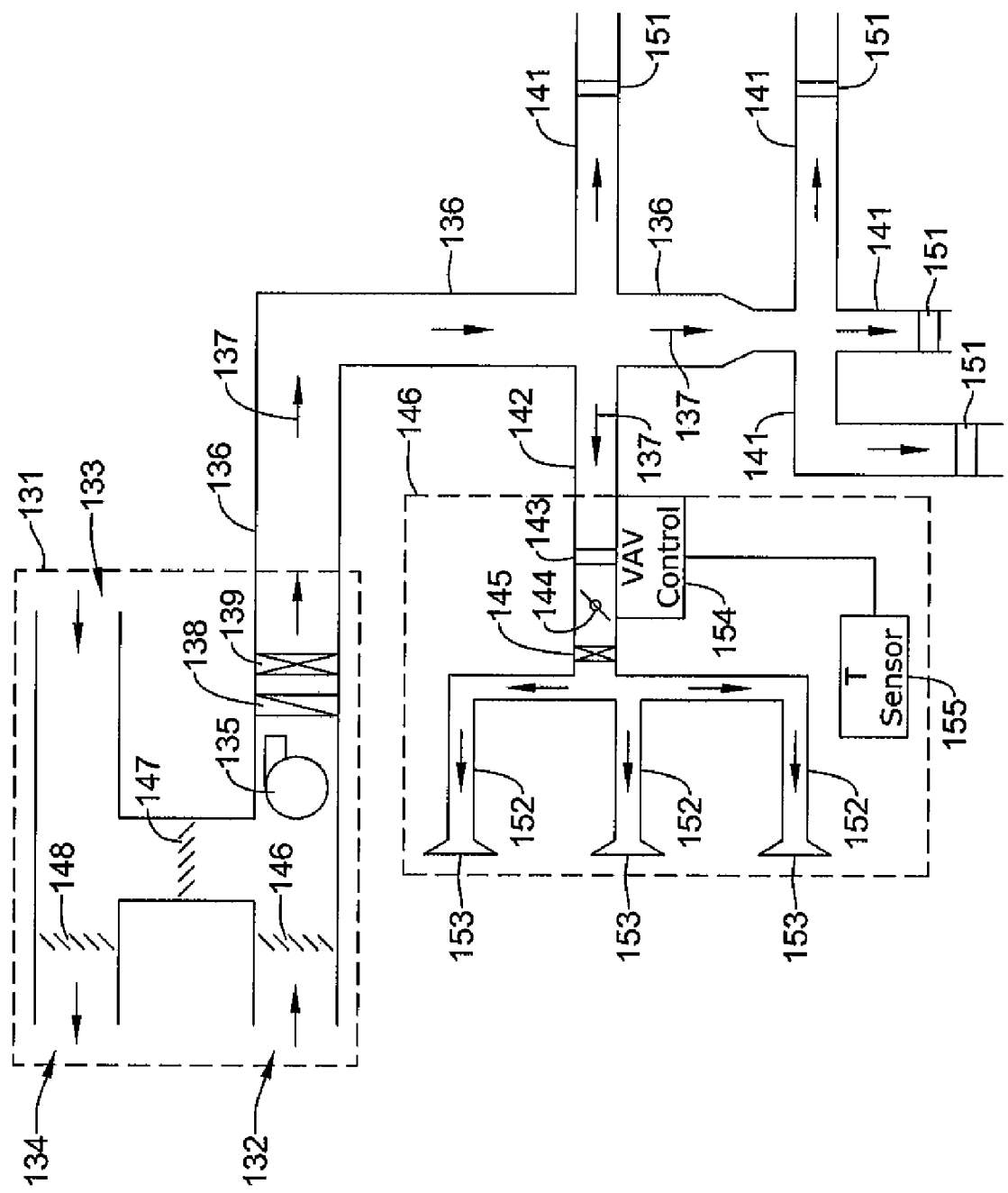
FIG. 13 shows a schematic of illustrative example of a variable air duct system.

FIG. 13 shows a schematic of example portions of a VAV duct system and connection with an air handler system. An air handler unit (AHU) 131 may bring in fresh air at intake 132, system return air at intake 133, and put out exhaust air at outlet 134. A fan 135 may push supply air 137 from AHU 131 into duct 136. Supply air 137 may be set to have a 55 degree temperature. The temperature of the air may be affected by cooler 138 and heater 139. Air 137 may be routed from the primary duct 136 to secondary ducts 141 and 142. Ducts 141 may convey air 137 various zones of a building. Duct 141 may convey air 137 into a zone through a VAV 143, a damper 144 and a heater 145.

In zone 146, air 137 may enter from duct 142 into smaller ducts 152. The air 137 may enter the space of zone 146 through diffusers 153 at the ends of ducts 152, respectively. In zone 146, there may be return vents and ducts for returning the air 137 back to the AHU 131 at the return opening 133. Similar air delivery and return may apply the other zones of ducts 141. A control 154 for VAV 142 may be connected to one or more temperature sensors 155.

AHU 131 may have a fresh air intake damper 146, a return air damper 147 and an exhaust air damper 148. If the fresh air intake damper is 100 percent open, then the return air damper 147 would 100 percent closed and the exhaust air damper 148 would be 100 percent open. If the fresh air damper 146 is partially closed, then return air damper 147 may be partially open and exhaust air damper 148 may be partially closed. If fresh air damper 132 is completely closed, then damper 147 may be completely open and damper 148 may be completely closed. However, the fresh air damper may be generally open because of certain minimum fresh air requirements. One cannot just add up percentages of openness and closure to determine a relationship among the dampers because the amount of air flow according to the percentage of openness and closure of a damper may be generally nonlinear.

Ducts 141 may have corresponding VAVs 151, controls and sensors for their respective zones. The air 137 just coming out of the AHU 131 may be at 6000 cfm. A 1000 cfm may go to each of the ducts 141 and 2000 cfm to duct 142. Or each duct may receive a different amount of cfm than another duct. However, the 1000 cfm per duct 141 may be used for illustrative simplicity.

Figure 14:
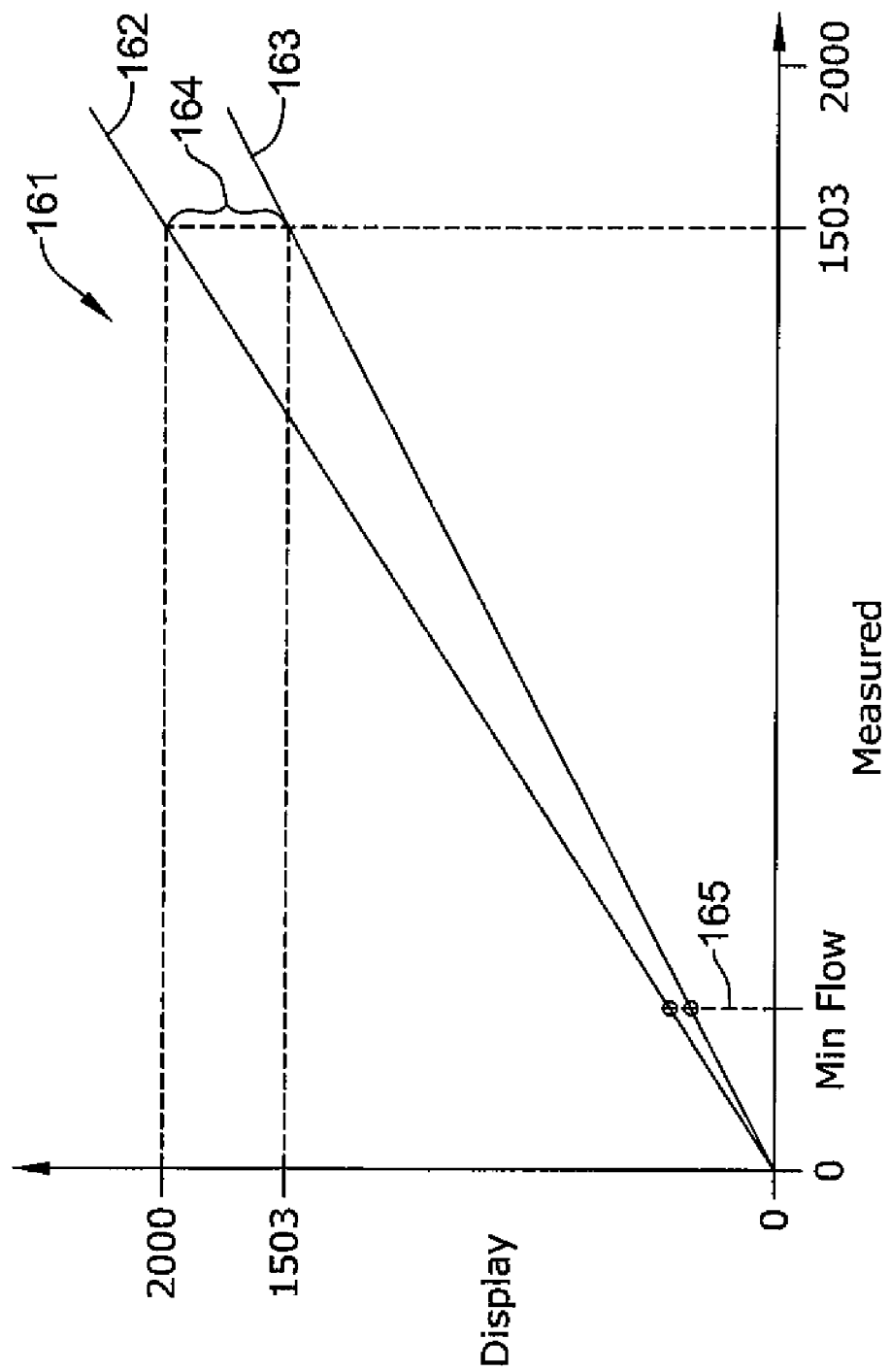
FIG. 14 is a graph of displayed air flow and measured air and a basis for correction.
Figure 15:
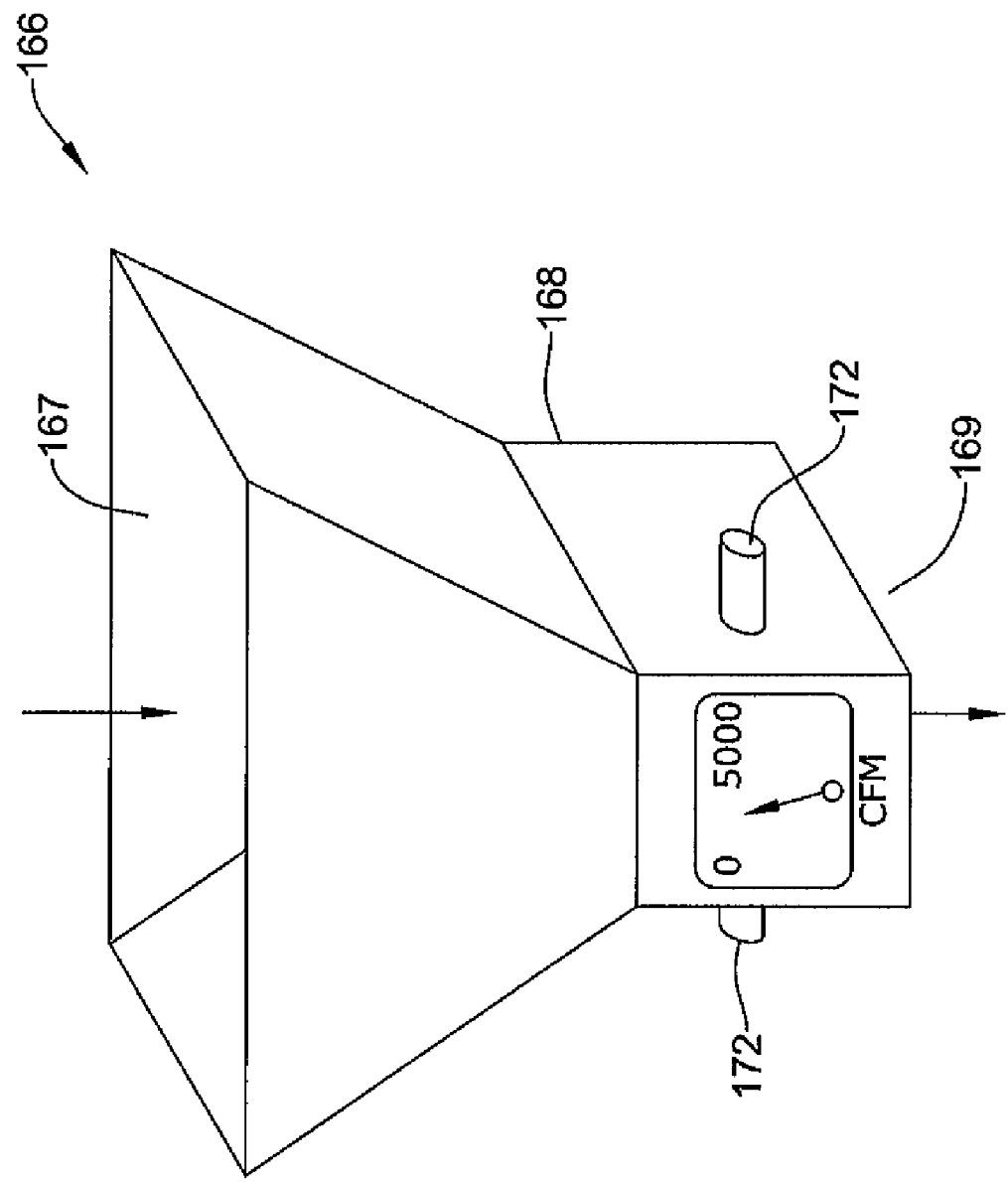
FIG. 15 is a diagram of a hood used for measuring air flow.

A display of the system 10 may indicate a certain amount of flow through a duct or ducts 137 and 152. For example, the display may indicate 2000 cfm. However, the measured amount may, for instance, be 1503 cfm. FIG. 14 shows a graph 161. The ordinate coordinate shows the displayed cfm and the abscissa coordinate shows the measure cfm. Plot 162 represents data before balancing and plot 163 represents data after balancing. The data is supposed data. The difference 164 between the plots 162 and 163 may be characterized by a "K" factor referred to as "kFactor". Line 165 represents the minimum flow. The airflow may be measured at the diffusers 153, for example in FIG. 13, with a hood 166. Opening 167 may be put up against the surface around the diffusers so that all of the air goes through the hood including the cfm sensor portion 168. The air flow may exit out of opening 169. The cfm of the air flow may be read on a meter 171. The hood may be held up against the diffuser vent with handles 172.

Figure 16:
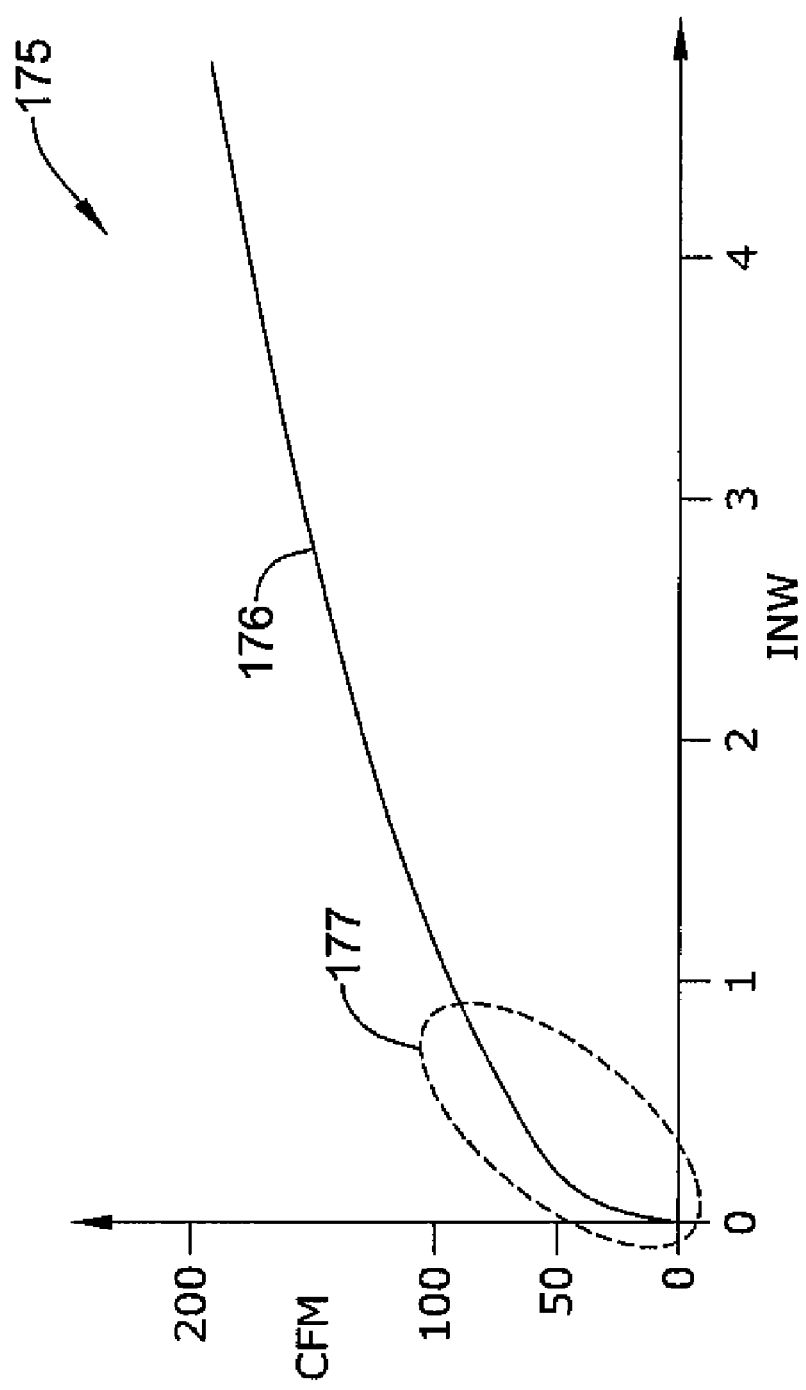
FIG. 16 is a graph showing a relationship between air flow rate and pressure.

Graph 175 of FIG. 16 shows a relationship between cfm of an air flow and the sensed delta pressure in inches of water. The relationship of the flow rate may be represented by "Flow=$k(\Delta P)^{1/2}$." The curve 176 represents that relationship. An area 177 of air flow measurement is difficult to measure and/or monitor by related art systems. The present system may provide a good resolution to sensed measurements in area 177 of curve 176.

Figure 17:
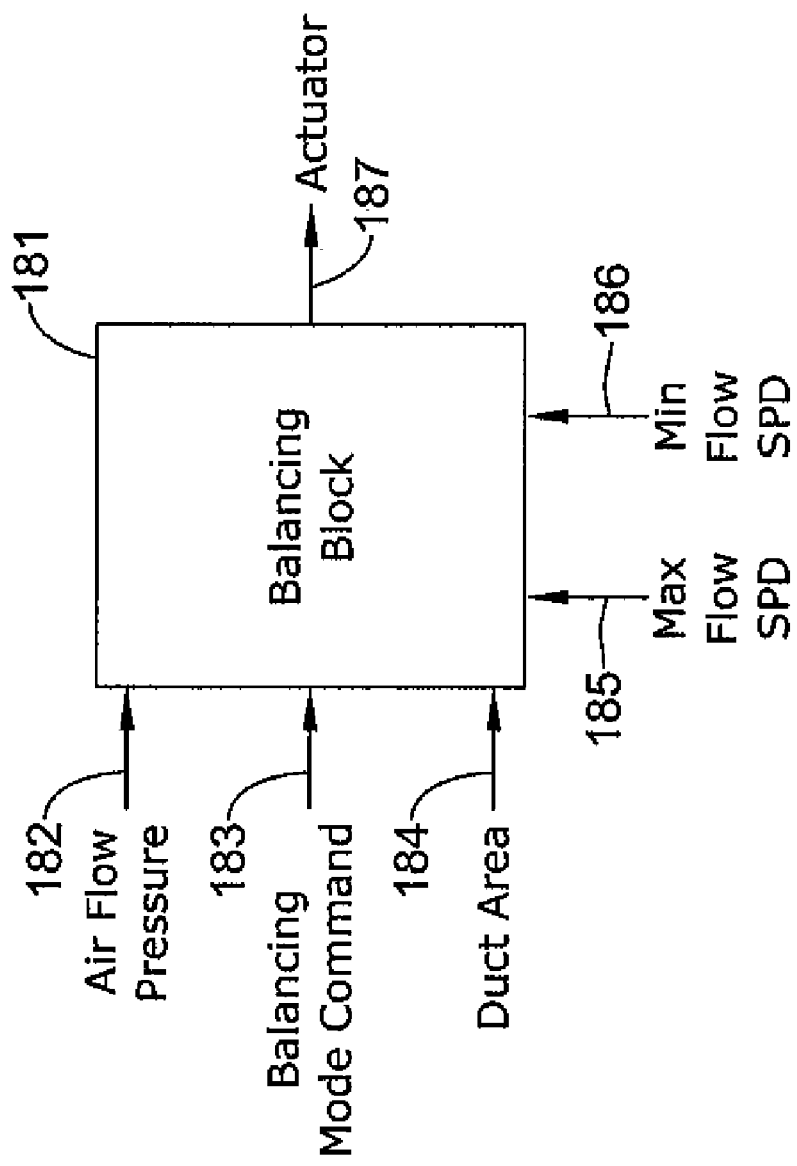
FIG. 17 is an overview diagram of a balancing block showing inputs and outputs.

FIG. 17 is an overview diagram of a balancing block 181. It shows inputs of air flow pressure 182, balancing mode command 183, duct area 184, maximum flow speed 185 and minimum flow speed 186. Block 181 has an actuator output 187.

Figure 18:
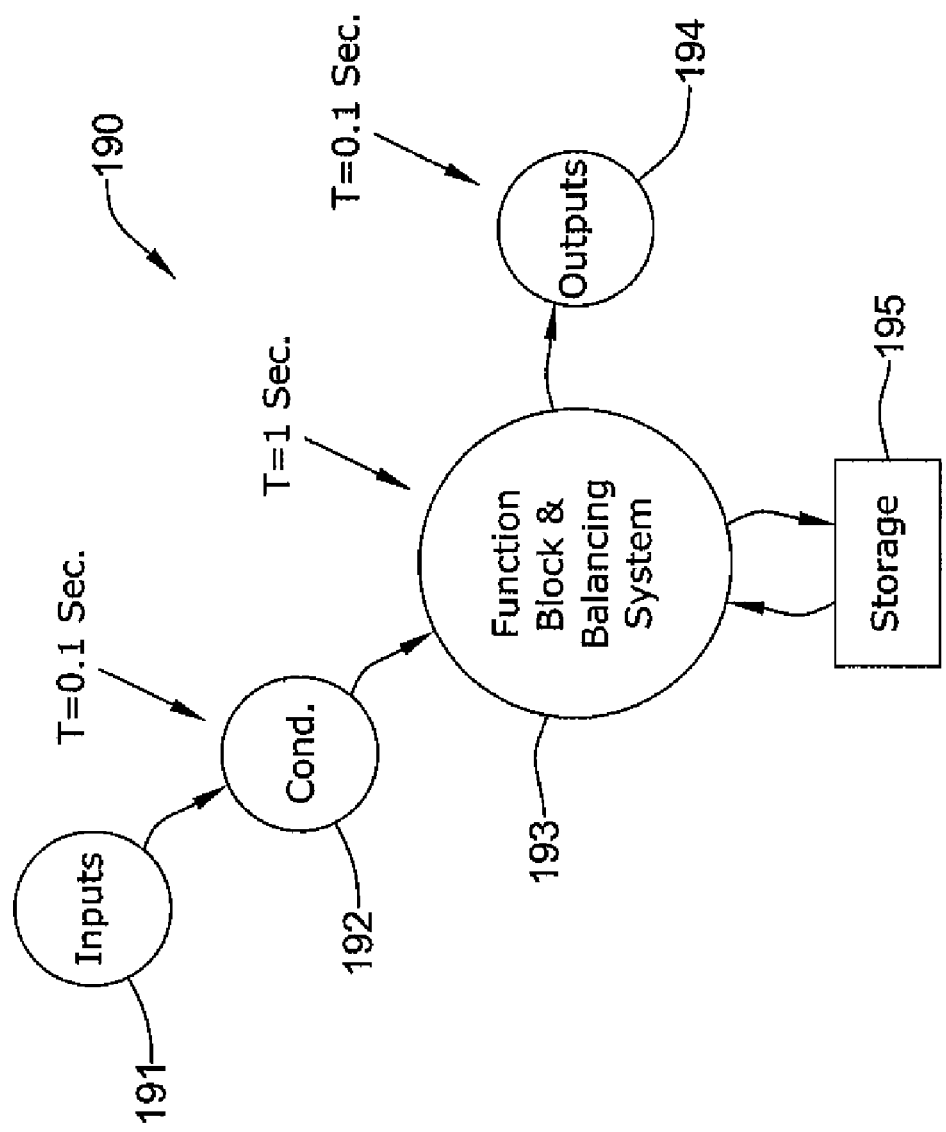
FIG. 18 shows a diagram of a balancing system and times for activity between the system and several other components.

FIG. 18 shows portions of a balancing system 190 and their times for activity among them. For signals at inputs 191 to reach the function block and balancing system 193 via the conditioning 192 of the signals may take about 0.1 second. The time for the block and system 193 to process the received signals may be about one second. To provide signals from the block and system 193 to the outputs 194 may take about 0.1 second. The interaction of the block and system 193 and storage or memory 195 may be significantly faster than 0.1 second.

Figure 19:
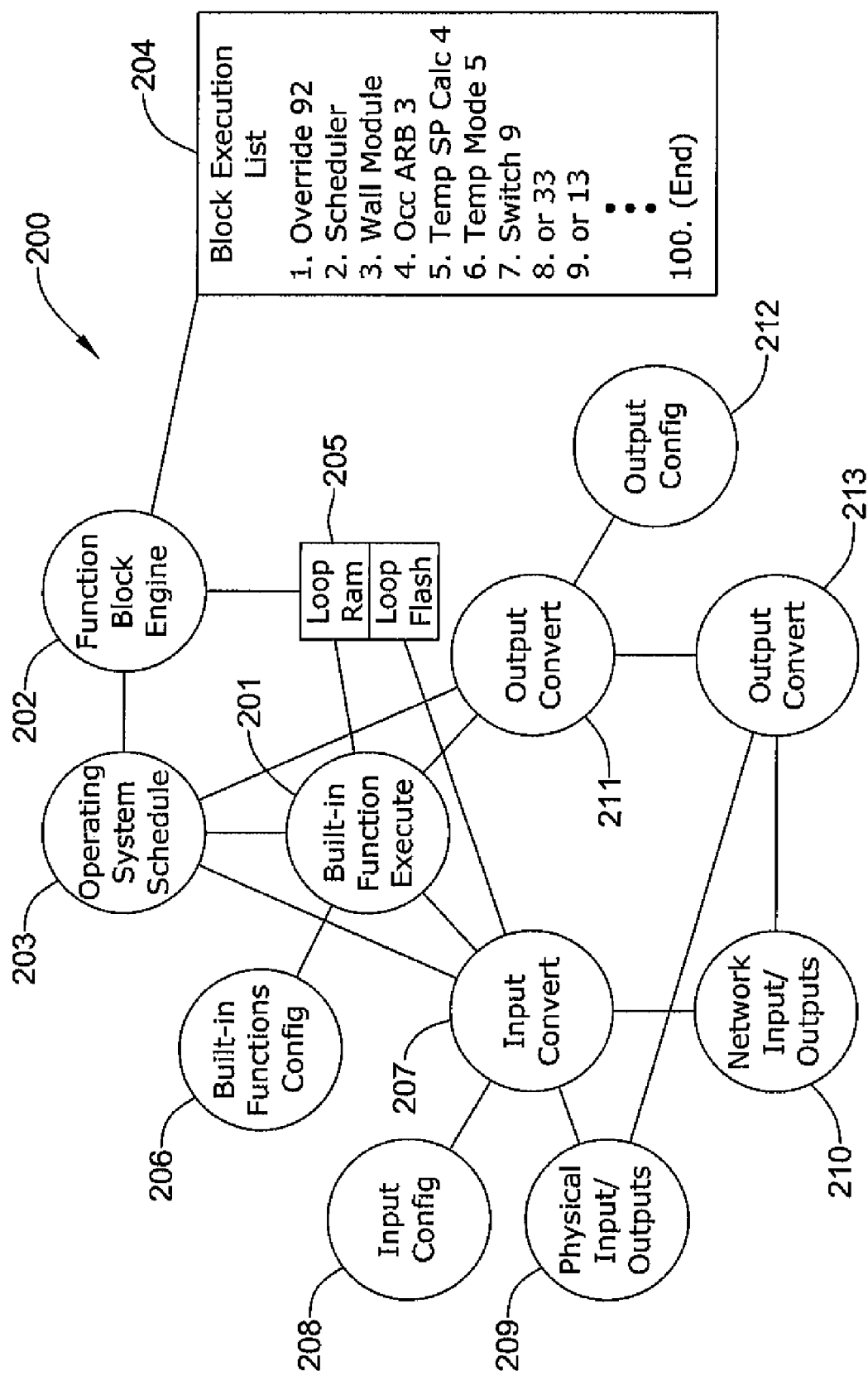
FIG. 19 is a diagram of a function block system.

FIG. 19 is a diagram of a function block system 200 which may have application to the present invention. Built-in function execute 201 may be connected to operating system schedule 203, loop RAM/FLASH 205, built-in functions configuration 206, input converter 207, and output converter 211. Function block engine 202 is connected to operating system schedule 203, block execution list 204, and loop RAM/FLASH 205. Operating system schedule 203 is connected to input converter 207 and output converter 211. Input converter 207 is connected to loop RAM/FLASH 205, input configuration 208, physical input/outputs 209, and network input/outputs 210. Output converter 211 is connected to output configuration 212 and output converter 213. Output converter 213 is connected to physical input/outputs 209 and network input/outputs 210.

Figure 20:
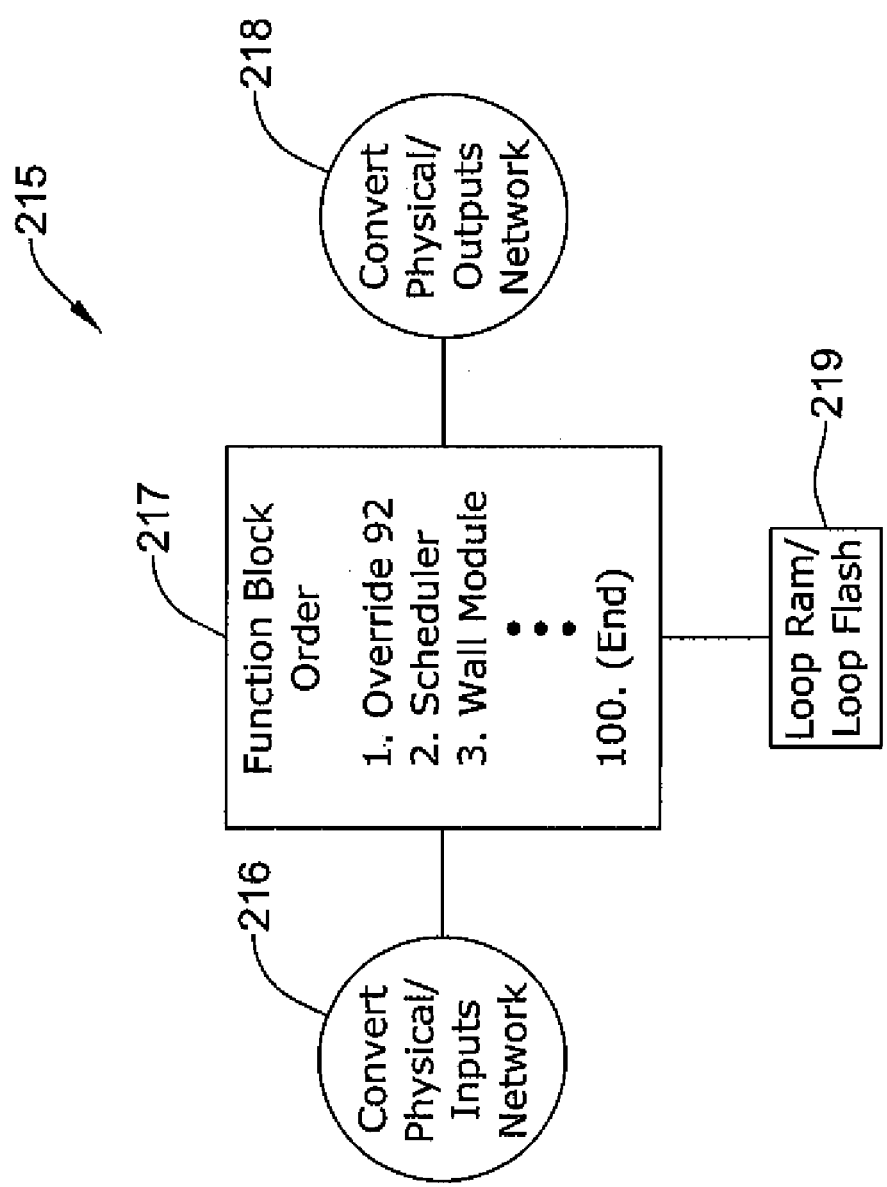
FIG. 20 is a summary variable air volume block flow diagram.

FIG. 20 is a summary VAV block flow diagram 215. A convert physical/inputs network 216 is connected to a function block order list 217. The function block order list 217 is connected to a convert physical/outputs network 218 and to a loop RAM/FLASH 219.

Figure 21:
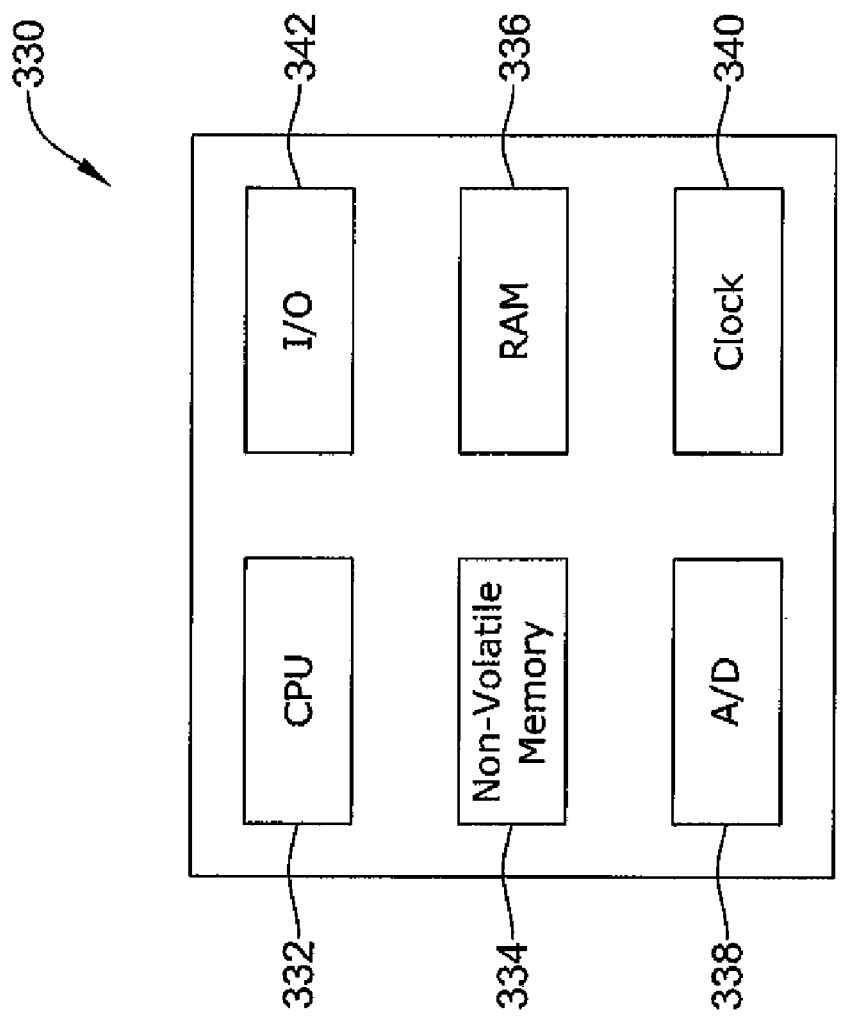
FIG. 21 is a block diagram of an illustrative programmable HVAC controller.

FIG. 21 is a block diagram of an illustrative programmable HVAC controller. The illustrative HVAC controller may be a programmable thermostat, or may be separate from the thermostat. In either case, the HVAC controller may provide one or more control signals that effect the operation of the HVAC system.

The illustrative HVAC controller may include a microcontroller 330 having a non-volatile memory 334 and a random-access memory (RAM) 336. Additionally, the illustrative microcontroller 330 may include a central-processing unit (CPU) 332, analog-to-digital converters (A/D) 338, input/outputs (I/O) 342, and a clock 340 or timer. The illustrative microcontroller 330 may include more or less than these illustrative components, depending on the circumstances. As illustrated, the aforementioned components may be provided internal to the microcontroller 330 without the need for any external components, but this is not required.

In some cases, the least expensive form of processor is a microcontroller. Microcontrollers typically contain all the memory 334 and 336 and I/O 342 interfaces, integrated on a single chip or device (e.g., microcontroller) without the need for external components. As noted above, one advantage of using a microcontroller 330 is the low cost when compared to the cost of a typical microprocessor. Additionally, microcontrollers 330 may be designed for specific tasks, such as HVAC tasks, which can help simplify the controller and reduce the number of parts needed, thereby further reducing the cost. While the use of a microcontroller may have some benefits, it is contemplated that the present system may be used in conjunction with a microprocessor or any other suitable controller, as desired.

In the illustrative microcontroller 330, the non-volatile memory 334 may be FLASH memory. However, it is contemplated that the non-volatile memory 334 may be Read Only Memory (ROM), programmable Read Only Memory (PROM), Electrically Erasable Programmable Read Only Memory (EEPROM), Random Access Memory (RAM) with a battery back-up, or any other suitable non-volatile memory 334, as desired. In the illustrative example, the amount of FLASH memory may be less than 100 Kb. In one case, the amount of FLASH memory may be about 60 Kb; however, it is contemplated that any amount of FLASH may be used depending on the requirements per application.

In some illustrative examples, the non-volatile memory 334 may be configured to have at least two portions including a first portion that is the equivalent of ROM and a second portion that is the equivalent of EEPROM. The first portion of non-volatile memory 334, often called the firmware portion, may be used to store at least in part one or more execution modules, such as, for example, a function block engine. In some cases, this portion of the non-volatile memory 334 may be programmed at the factory, and not subsequently changed. Additionally, the one or more execution modules (e.g. function block engine) stored in the firmware portion may execute, in some cases, one or more function blocks also stored in the non-volatile memory 334.

The second portion of the non-volatile memory 334 may include application configuration modules or data, including for example, a block execution list. In some cases, the non-volatile memory 334 in this second portion may be divided further to contain segments of data. This portion of the non-volatile memory 334 may be capable of being reconfigured post factory, such as during installation of the controller into an HVAC system in a building or structure. In other words, in some illustrative examples, the second portion of the non-volatile memory may be field programmable. In some cases, the amount of non-volatile memory 334 allotted for the second portion may be about 5 Kb. However, it is contemplated that any amount of field programmable memory may be provided, as desired.

It is further contemplated that the non-volatile memory 334 may also have a portion dedicated for the storage of constant values. This portion of memory may be provided in, for example, the firmware portion and/or the field programmable portion, as desired.

In the illustrative microcontroller 330, the RAM 336 may be used for variable storage. In some cases, the RAM 336 may be a relatively small repository for exchanging information during execution of the one or more programs or subroutines stored in the non-volatile memory 334. The RAM 336 may also be used for hosting the operating system of the microcontroller 330 and/or the communication capabilities, such as external interfaces. In the illustrative microcontroller 330, the amount of RAM 336 included may be about 5 Kb or less, 2 Kb or less, or any other suitable amount of RAM. In some cases, the operating system and communication capabilities may consume about 1 Kb of RAM 336, leaving about 1 Kb for other functions, such as storing variables and/or other data for the one or more programs.

The CPU 332 for the illustrative microcontroller 330 may interpret and execute instructions, and may control other parts of the microcontroller 330 as desired. In some cases, the CPU 332 may include a control unit and an arithmetic-logic unit contained on a chip. The clock 340 can provide a steady stream of timed pulses for the microcontroller 330, which may be used, for example, as the internal timing device of the microcontroller 330 upon which operations may depend. The I/Os 342 can transfer data to and from the microcontroller 330 and an external component. In some cases, for each input, there may be a corresponding output process and vice versa. The A/D 338 converter can provide transformations of an analog input into a digital input format helping to enable the microprocessor to be able to read and interpret analog input signals. In some cases, a D/A converter may also be provided to allow digital signals to be provided as analog outputs, if desired.

Figure 22:
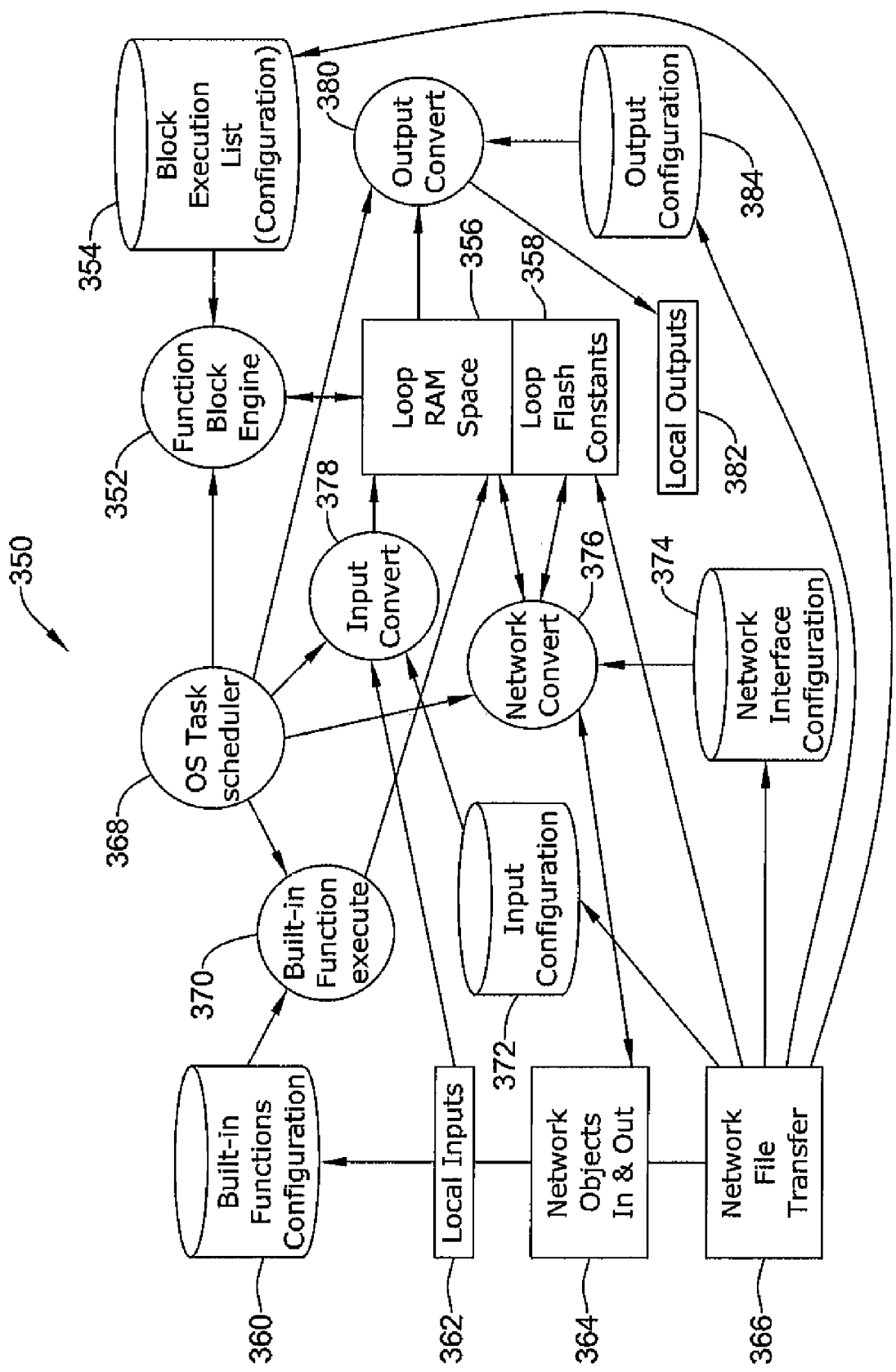
FIG. 22 is a schematic diagram of an illustrative application framework of a programmable controller.

FIG. 22 is a schematic diagram of an illustrative application framework of a programmable controller 350. The illustrative controller 350 includes one or more execution modules, one or more application configuration modules, and a parameter and variable storage space. The execution modules, as illustrated by the circles in FIG. 22, can include a function block engine 352, a built-in function execute module 370, an input convert module 378, a network convert module 376, and an output convert module 380. The application configuration modules, as illustrated by the cylinders, can include a block execution list 354, a built-in functions configuration 360, an input configuration 372, a network interface configuration 374, and an output configuration 384. The parameter and variable storage space can include a loop RAM space 356 and a loop flash constant space 358. Additionally, the illustrative controller 350 may include one or more external interfaces for communication capabilities, including a local input 362, a network file transfer 366, a network object in and out 364, and a local output 382. In some cases, the controller 350 may also include an operating system (OS) task scheduler 368.

The one or more execution modules can be resident in the non-volatile memory of the microcontroller 350, such as in FLASH memory. More specifically, in some cases, the one or more execution modules may be resident in the ROM equivalent or firmware portion of the non-volatile memory. At least one of the execution modules may include one or more programs, some of the one or more programs relating to the operation of the HVAC system. The one or more programs may include a set of sub-routines that the one or more execution modules can sequentially execute. The one or more execution modules may execute the one or more programs from the non-volatile memory.

The one or more application configuration modules can also be resident in the non-volatile memory, such as the FLASH memory, of the microcontroller 350. More specifically, the one or more application configuration modules can be resident in the EEPROM equivalent or the field programmable portion of the non-volatile memory. These modules can be pre-configured for standard HVAC applications or can be configured for custom HVAC applications, as desired. Additionally, the one or more application configuration modules can be field programmable. For example, in some cases, the one or more application configuration modules may be programmed and configured either during or after the installation of the controller into a HVAC system.

In some cases, the one or more application configuration modules can include a block execution list 354. The configuration of the block execution list 354 can direct the execution of the one or more execution modules (e.g., function blocks). In some cases, this configuration can be determined by the user or the installer. In some cases, a programming tool may be used that allows the installer to select the appropriate function blocks to create a custom block execution list 354, along with the appropriate configurations, to perform specific HVAC applications. This may help the one or more application configuration modules to be configured on a job-by-job basis, which in turn, can direct the execution of the execution modules on a job-by-job basis. In some cases, the one or more application configuration modules can include parameters or references that point to a location in memory for data, such as to the parameter and variable storage space.

The parameter and variable storage space may be provided in the controller 350 for the one or more execution modules and/or one or more application configuration modules to reference data or values to and from storage space. In an illustrative example, the variable parameter storage space, or loop RAM space 356, may be resident in RAM. This storage space can be used for the temporary storage of variables or parameters, such as function block outputs and/or temporary values from inputs, either local inputs or network inputs, of the controller 350.

Also, in the illustrative example, the constant parameter storage space, or loop flash constants 358, may be a storage space for storing constant values determined by the programmer or user. This storage space may be resident in non-volatile memory, such as the FLASH memory. Certain set points and operational parameters may be designated as constant parameter values selected by the application designer, installer, or user, and may be stored in the loop flash constants 358 storage space, if desired.

The HVAC controller 350 may also include external interfaces, such as local inputs 362 and local outputs 382. The local inputs 362 may be stored according to the input configuration 372 module executed by the input convert module 378. These modules may direct to storage the input value so that it can be used by other execution modules, such as the function block engine 352. The local outputs 382 may be configured according to the output configuration 384 as executed by the output convert module 380. This may output the value or data to an external HVAC component, such as a damper, thermostat, HVAC controller, or any other HVAC component as desired.

The OS task scheduler 368 may determine the operation and execution of the execution modules within the HVAC controller 350. For example, the execution modules may be executed in the following order: discrete inputs; including input convert 378 and network convert 376; built-in function execution 360; function block execution 352; physical output processing 380; and finally network output processing 376. However, it is contemplated that any suitable order may be used as desired.

Figure 23:
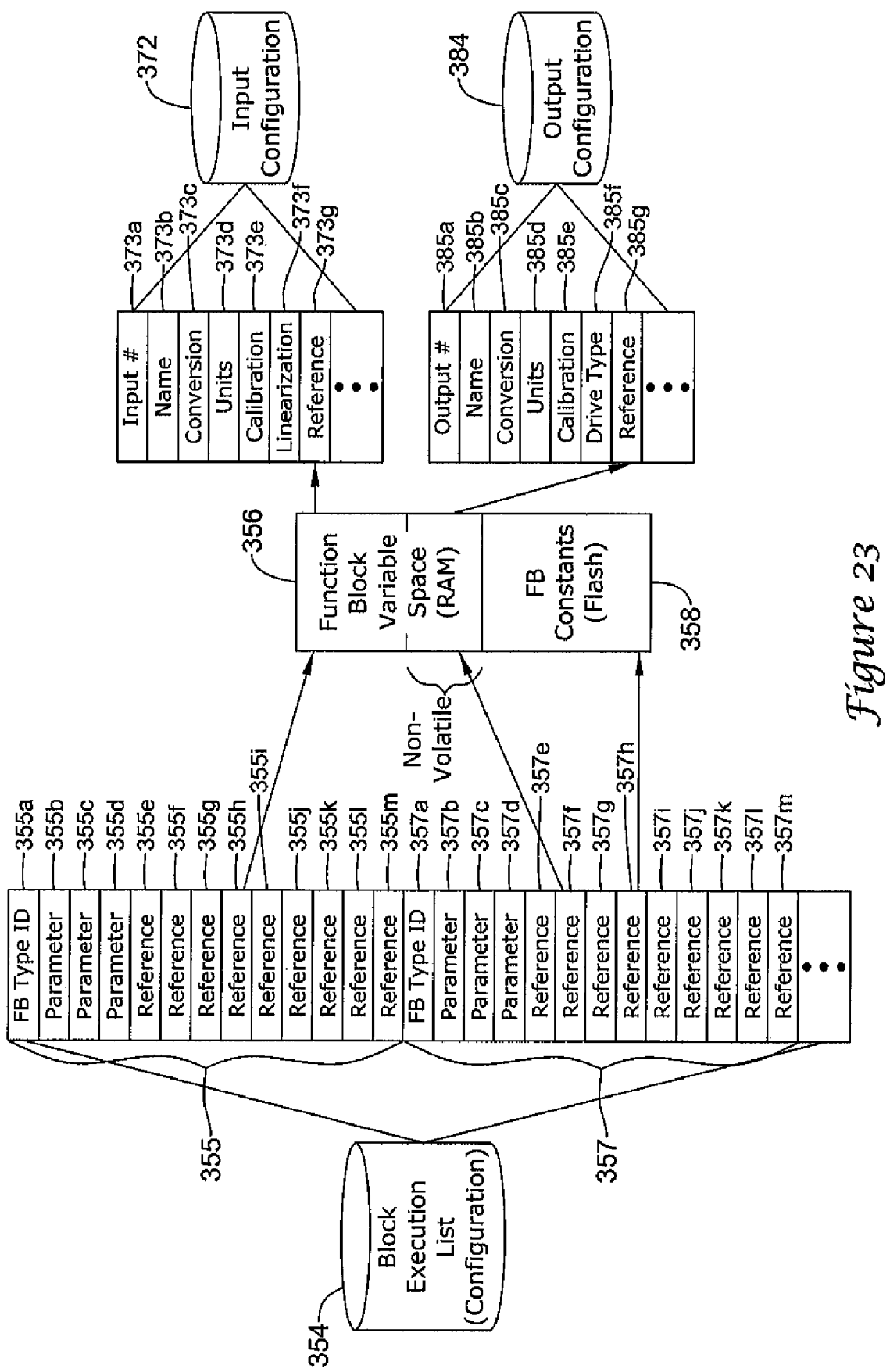
FIG. 23 is a schematic diagram of illustrative application configuration modules of FIG. 22.

FIG. 23 is a schematic diagram of some illustrative application configuration modules of FIG. 22, including an illustrative block execution list 354. As indicated above, the block execution list 354 may be resident in non-volatile memory, such as FLASH memory, and more specifically the field programmable portion of the FLASH memory, if desired. The illustrative block execution list 354 includes a listing of one or more function blocks 355 and 357, and is used to direct which function blocks and the order of execution of the function blocks, executed by the function block engine 352 according to its configuration.

The block execution list 354 may be programmed at the factory or by the user or the installer, to configure the order and type of function blocks 355 and 357 that are to be executed for the particular application. In some cases, the user or installer can have a programming tool that allows the user or installer to select the appropriate function blocks 355 and 357 and configuration to perform the desired tasks for the particular application. Thus, in some examples, the block execution list 354 configuration may be provided on a job-by-job basis for the controller. In some cases, this can allow the block execution list 354 to be programmed and configured in the field and changed depending on the desired application and function of the controller.

In the illustrative example, the Function blocks 355 and 357 are modules that perform a specific task by reading inputs, operating on them, and outputting one or more values. The function block 355 and 357 can be defined according to the block execution list 354, which can be programmed by the factory, user, installer, or application designer. In the illustrative example, function blocks 355 and 357 may be classified into 6 categories: analog function blocks, logic function blocks, math function blocks, control function blocks, zone control function blocks, and data function blocks.

The function blocks 355 and 357 may perform higher level functions, such as higher level functions for HVAC operations. Additionally, the controller may include some more generic function blocks for performing some basic applications, but, in many cases, these may be combined with other function blocks to perform higher level HVAC application.

Referring back to FIG. 23, function blocks 355 and 357 may include a number of function calls or pointers to particular locations in memory. In the illustrative example, each function block 355 and 357 may include a function block type 355a and 357a, and a number of parameter or references 355b-m and 357b-m. The references and parameter 355b-m and 357b-m may point to variables or constants that are stored in the parameter and variable storage space, such as in either the function block variable space 356 or the function block constant space 358. Additionally, in some cases, the reference and parameters 355b-m and 357b-m may relate to other function block outputs, inputs (either local or network), or pointers to any other data, as desired.

In one illustrative example, each function block may be about 22 bytes long. Each function block may include the function block type 355*a* and 357*a*, which can be one byte. Each function block can also include nine references or variables 355*e-m* and 357*e-m*, each reference or variable being allocated 2 byte WORD increments, totaling 18 bytes. Also, each function block 355 and 357 may include three parameter or configurations 355*b-d* and 357*b-d*, each being one byte, totaling 3 bytes. However, these sizes are merely for illustrative purposes and it is not meant to be limiting in any way.

It is contemplated that any size function blocks 355 and 357 may be used, and/or any number or size of function block types 355*a* and 357*a*, references or variables 355*e-m* and 357*e-m*, and parameters or configurations 355*b-d* and 357*b-d*. Furthermore, it is contemplated that the order may be the function block type 355*a* and 357*a*, then one parameter 355*b* and 357*b*, then the nine references 355*e-m* and 357*e-m*, and then the two remaining parameters 355*c-d* and 357*c-d*. More generally, it is contemplated that the function blocks 355 and 357 may be configured in any order and have any number of references and parameters, as desired.

The function block type 355*a* and 357*a* can be used to specify what function the function block 355 and 357 performs. Examples of functions that function block types 355*a* and 357*a* can perform include, but are not limited to, one or more of: determining a minimum; determining a maximum; determining an average; performing a compare function; performing an analog latch function; performing a priority select function; performing a hysteretic relay function; performing a switch function; performing a select function; performing an AND/NAND function; performing an OR/NOR function; performing an exclusive OR/NOR function; performing a one shot function; performing an add function; performing a subtract function; performing a multiply function; performing a divide function; performing a square root function; performing an exponential function; performing a digital filter function; performing an enthalpy calculation function; performing a ratio function; performing a limit function; performing a reset function; performing a flow velocity calculation function; performing a proportional integral derivative (PID) function; performing a adaptive integral action (AIA) function; performing a stager/thermostat cycler function; performing a stage driver function; performing a stage driver add function; performing a rate limit function; performing a variable air volume (VAV) damper flow control function; performing an occupancy arbitrator function; performing a general set point calculator function; performing a temperature set point calculator function; performing a set temperature mode function; performing a schedule override function; performing a run time accumulate function; performing a counter function; and performing an alarm function. More generally, any suitable function may be performed by function block types 355*a* and 357*a*, as desired.

Function block references 355*e-m* and 357*e-m* may be pointers to variables that can specify inputs, outputs and/or other data that is used by the function block 355 and 357. These variables may include data inputs that are used by the function block 355 and 357 during execution. In the illustrative example, there may be a number of variable type references that may each have a unique mapping to a memory class. In the illustrative example shown in FIG. 23, there are nine different types of variables: input, parameter, input/parameter, parameter/input, output floating point number, nonvolatile output floating point number, output digital, static floating point number, and static digital. The input variables may include an input reference for the function block 355 and 357 stored in, for example, RAM memory. The parameter variable may be a value for the function block 355 and 357 to use, which in some cases, can be stored in either RAM or FLASH memory. The input/parameter variable can be a reference to either an input or a parameter, with the default being an input and may, in some cases, be stored in either FLASH or RAM memory. The parameter/input variable can be either a parameter or an input with the default being a parameter, and in some cases, can be stored in FLASH memory. The output floating point number variable may be an output of the function block 355 and 357, which can be called up as an input to another function blocks that is later executed. In some cases, the output floating point number variables may be stored in volatile RAM memory. The nonvolatile output floating point number variable may be an output of the function block 355 and 357, which can be called up as an input to another function block. In some cases, nonvolatile output floating point number variables may be stored in non-volatile RAM memory so that it retains its value on a power outage. The output digital variable may be an output of the function block 355 and 357 that can be called up as an input to another function block. In some cases, the output digital variables may be stored in RAM memory. The static floating point number variable may allow a function block 355 and 357 to use floats as static RAM variables. The static digital variable may allows a function block 55 and 57 to use digitals as static RAM variables. Additionally, there may be unused references, indicating that these references/variables are unused. More generally, it is contemplated that there may be any number of variable type references, as desired.

The output of function blocks 355 and 357 can be stored, in some cases, in the RAM for later use by the function block engine. As indicated above, and in some cases, the outputs of a function block 355 and 357 can be used as an input reference to another function block 355 and 357. Additionally, in some cases, outputs can be referenced to the input of the same function block 355 and 357, when appropriate. However, if an input is referenced to its output, there may be a delay before receiving the output signal at the input of the function block (e.g., by one cycle or iteration) due to the sequential execution of the function blocks in one illustrative example. In some cases, it may take about one second for the execution of the function blocks 355 and 357, but this is not required.

The parameters 355*b-d* and 357*b-d* may include design time configuration information needed by the function block 355 and 357 to execute. For example, the parameters 355*b-d* and 357*b-d* may instruct a corresponding function block 355 and 357 on how to initialize itself. In the illustrative example, each function block 355 and 357 may have three parameters 355*b-d* and 357*b-d*, each including one byte of configuration information, for this purpose. However, it is contemplated that any suitable number of parameters of any suitable size may be used, as desired. In some cases, the parameter information may be entered by the application designer, the installer in the field, or the user, as desired. The parameters 355*b-d* and 357*b-d* may be configured to apply to just one specific function block type, one specific function block instance, or multiple function blocks, depending on the application. In some cases, the parameters 355*b-d* and 357*b-d* may be stored in the function block constants storage space 358, but this is not required.

The function block variable space 356 and the function block constant space 358 may be provided in the controller. For example, the function block variable space 356, which may change, may be resident in RAM memory of the controller. In some cases, the RAM may have a portion that is volatile and a portion that is non-volatile. In the volatile RAM, upon a power disruption, the data will be lost or reset, whereas in the non-volatile RAM, upon a power disruption, the data will be retained. Thus, data that is desirable to maintain upon a power disruption may be stored in the non-volatile RAM, while other data can be stored in the volatile RAM.

The function block constant space 358 may be a constant value storage space for data, such as parameters, as determined by the application designer, installer or user. The constant value storage space may be resident in non-volatile memory, such as FLASH memory. This may include certain set points and operational parameters that are designated as constant parameter values selected by the application designer at design time, by the installer, or the user. In order to change a constant parameter, and in some cases, a new function block configuration may have to be downloaded to the controller. Additionally, in some cases, a function block description, which may be available to the user, programmer, and/or installer, can provide details as to which parameters are variable and which are fixed. Providing the function block constant space 358 may help improve the efficiency of the controller by maintaining parameters and/or variables that may be used by the function blocks 355 and 357.

External interfaces, such as the network input/output and local input/output may also use the function block 355 and 357 variable space to map data in and out of the controller. To input data into the controller, an input configuration 372 may be provided to properly configure the input so that the function blocks identified in the block execution list 354 may properly reference the data. In some cases, the input configuration 372 may include an input number 373a, name 373b, conversion 373c, units 373d, calibration 373e, linearization 373f, and references 373g. The input reference may map the input to the function block variable space 356 resident in the RAM memory. An output configuration 384 may also be provided to configure outputs that may be mapped out of the controller. The output configuration 384 may include an output number 385a, name 385b, conversion 385c, units 385d, calibration 385e, drive type 385f, and references 385g. The output reference may map data from the function block variable space 56 resident in the RAM.

Figure 24:
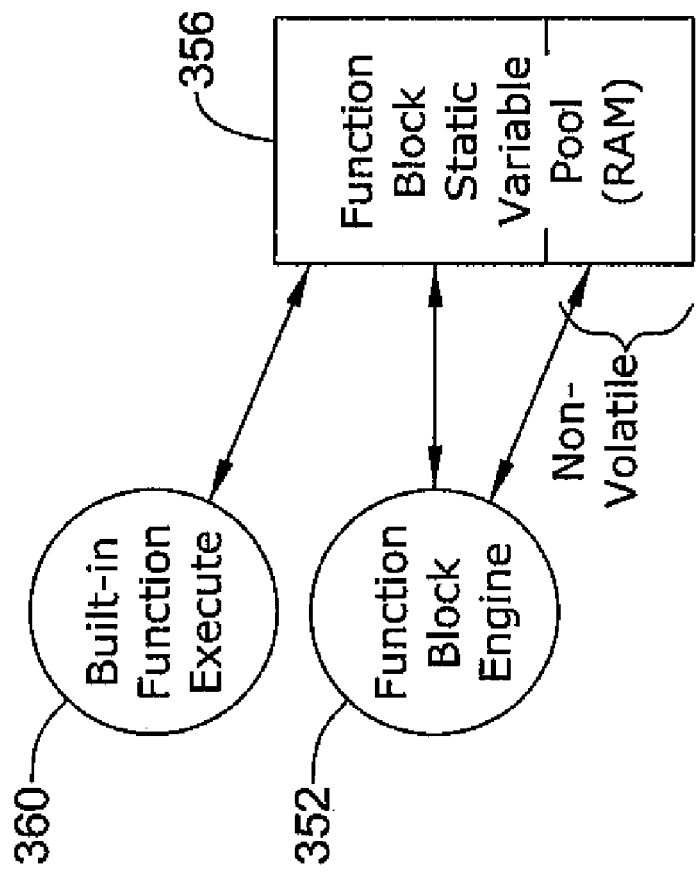
FIG. 24 is a schematic diagram of one or more execution modules of FIG. 22 including a function block engine.

FIG. 24 is a schematic diagram of the illustrative one or more execution modules of FIG. 22 including the function block engine 352. As discussed previously, the function block engine 352 may be resident in the non-volatile memory of the microcontroller, more specifically, in the firmware portion of the non-volatile memory. The function block engine 352 can include one or more programs, such as one or more HVAC application programs. The functional block engine 352 may be a set of sub-routines that can sequentially execute function blocks identified by the block execution list. In some circumstances, the function block engine 352 may execute the function blocks every second in the order provided by the block execution list.

During execution, the function block engine 352 may follow the block execution list of function blocks. This may include reading variables and/or parameters stored in the function block variable pool 356 and/or the loop flash constants 358, as directed by the function blocks and/or block execution list. The function block engine 352 may execute the function blocks from the non-volatile memory, such as FLASH memory, using the data read from the parameters and/or variables. In some cases, the function block engine 352 may also write values or data to the function block variable pool 356. In some cases, these written values are stored only temporarily in the function block variable pool 356 for use in the execution of other function blocks or as outputs of the controller.

The function block engine 352 may allow the application designer to program the controller to perform a wide variety of functions, such as HVAC functions. The function block engine 352 sequentially executes each function block that the application designer has configured in the block execution list. In some cases, the inputs to the function blocks are referenced from the function block variable pool 356 that may be resident in RAM. In some cases, there may only be a small stack space in the function block variable pool 356, which may be reused by the function blocks for local, temporary variable storage. Additionally, in some cases, local physical and network inputs may be provided with access to the variable space.

The built-in function configuration and execute block 360 may provide a means of translating inputs (both local and network), and providing the values as variables that can be used as inputs to any or selected function blocks. In other words, in some case, the function blocks are unaware that an input to a function block came from a physical input, a network input, a parameter, or as an output from another function block. The input from the built-in function execute block 360 can be stored in the function block variable pool 356, in some cases only temporarily, for use by the function block engine 352.

The following is an approach for a balancing procedure for a configuration tool that may be used. First, is a k factor method with the following steps: 1. Set nviFlowoverride from HVO_OFF_NORMAL (0) to HVO_Maximum (7); 2. Read nciMaxFlowCoolSP and nvoBoxFlowCool and compare; wait until the nvoBoxFlowCool is within 0.5% of the nciMaxFlowCoolSP; look at nvoCmdCoolDmpPos and monitor until changes stops for 5 seconds or direction changes; 3. Read nvoBoxFlowCool and nvoCmdCoolDmpPos for stability; average nvoVelSenPressC reading over a 5 sample window after stability is reached; if the Flow is unstable, ask the user, "Would you like to balance anyway?" 4. Display apparent flow (nvoBoxFlowCool) and Display Current K Factor nciKFactorCool; show the new calculated K Factor based on the equation below and ask user to proceed with new calculated K factor; (K Factor) nciKFactorCool=(user entered measured Box Plow)/sqrt([5 sample average of nvoVelSenPressC]−nvoPressoffsetC); and 5. Set nviFlowoverride from HVO_Maximum (7) to HVO_OFF_NORMAL (0); (optional) check minimum flow if desired.

Next, is a min/max method with the following steps: 1. Set nviFlowoverride from HVO_OFF_NORMAL (0) to HVO_Maximum (7); 2. Read nciMaxFlowCoolSP and nvoBoxFlowCool and compare; wait until they are within control range of algorithm; look at nvoCmdCoolDmpPos and monitor until changes stops for 5 seconds or direction changes; 3. Read nvoBoxFlowCool and nvoCmdCoolDmpPos for stability; average nvoVelSenPressC readings over a 5 sample window after stability is reached; if the Flow is unstable, ask the user "Would you like to balance anyway?" 4. Display apparent flow (nvoBoxFlowCool) and request input for actual max flow; enter in value in nciMeasMaxFlowC; 5. Set nviFlowoverride from HVO_OFF_NORMAL (0) to HVO_Minimum(7); 6. Read nciOccMinFlowCSP and nvoBoxFlowCool and compare; wait until they are within control range of algorithm; look at nvoCmdCoolDmpPos and monitor until changes stops for 5 seconds or direction changes; if the Flow is unstable, ask the user "Would you like to balance anyway?" 7. Read nvoBoxFlowCool and nvoCmd CoolDmpPos for stability; average readings over a 5 sample window after stability is reached; if the Flow is unstable, ask the user, "Would you like to balance anyway?" 8. Display apparent flow (nvoBoxFlowCool) and request input for actual min flow; enter in value in nciMeasMinFlowC; and 9. Set nviFlowoverride from HVO_Minimum(7) to HVO_OFF_NORMAL (0).

The following presents a simple work bench arrangement of the required hardware and the associated wiring connections to configure Excel™ 10 W775D, F Controllers (by Honeywell International Inc.). One may proceed as in the following. 1) With power disconnected to the housing sub-base, insert the controller circuit board (contained in the housing cover) into the subbase unit. 2) Apply power to the controller, and insert the Serial Interface cable into the jack on either the Excel 10 W7751D or F Controllers. 3) Use the CARE/E-Vision™ PC tools to configure the controller. (See the CARE E-Vision™ User's Guides, forms 74-5587 and 74-2588, for further details.) Use the ID number sticker on the controller or press the bypass button on the wall module. 4) When configuration is completed, power down and remove the W7751D, F from the subbase. Mark the controller with the Plant name or location reference so the installer knows where to install each controller in the building. 5) Repeat with next W7751D, F to be configured. 6) The data file used for this configuration must be used at the job site so the commissioning data matches the controllers.

One may do configuring in the field. If the controllers were installed at the site, the procedure to assign the node numbers to the Excel™ 10 VAV Controller may be as in the following. 1) Instruct the installer to remove the ID sticker from each controller during installation and to affix it to either the job blueprint at the appropriate location or to a tabulated list. Be sure the installer returns these prints to the application engineer after the controllers are installed. 2) Connect to the E-Bus with the CARE™ PC tool. 3) Proceed to configure the W7751 (using the job prints for location reference for the controllers) by following the standard CARE™ procedures.

One may configure a Zone Manager.

The Q7750A Excel™ 10 Zone Manager sends out a one-time LonWorks™ message containing its 48-bit Neuron™ ID after any power-up WARMSTAR™ or when the Excel™ 10 Zone Manager is reset by pressing the reset button. It may be important to note that pressing the reset button on the Excel™ 10 Zone Manager may cause all application files in the Q7751, including the C-Bus setup, to be lost. The LonWorks™ message is sent out one time and only on the E-Bus, not on the B-Port. The message will be the same as the one generated after pressing the service pin pushbutton available on Excel™ 10 VAV Controllers and also via the wall module bypass pushbutton. The CARE™ commission tool (E-Vision) can use this message to assign the node address.

The Assign ID procedure is the same as for an Excel™ 10 VAV Controller except, instead of pressing the bypass button, the reset button must be pressed or the power must be cycled (down then up) on the Q7750A Excel™ 10 Zone Manager.

The following is pertinent to Sensor Calibration. The space temperature and the optional resistive inputs can all be calibrated. The wall module setpoint potentiometer can not be calibrated. Perform the sensor calibration by adding an offset value (either positive or negative) to the sensed value using E-Vision™ menus (see E-Vision™ user's guide, form number 74-2588).

The following may be used in Air Flow Balancing for Pressure Independent applications. In addition to the ten point Flow Pickup Calibration Table, the Excel™ 10 VAV Controller provides for 3-point (Maximum, Minimum, and Zero) Air Flow Calibration. This allows the box to be adjusted so it can be certified that the box provides the flow rates specified by the consulting engineer. When balancing is complete, the actual flow from a box should be within 5 to 10 percent of the indicated air flow (as shown on the E-Vision™ screen). One may note that there are many sources of error in flow-hood measurements. Flow hood meters typically attain accuracy to within plus or minus three to five percent of full flow. The error can be due to the device being out of calibration, or that it was last calibrated with a different style of diffuser. Even the operator technique plays a role in obtaining repeatable, accurate flow readings. When working with slotted diffusers, do not use a hood, use a velocity-probe type of instrument.

One may follow the diffuser manufacturer's recommendation for a procedure of how to best measure the air flow through their products. Prior to air flow balancing for the first time, perform a zero flow calibration procedure. To do so, power the Excel™ 10 VAV Controller for one hour or more before performing the procedure. Select the controller being worked on with E-Vision™ (see the E-Vision™ User's Guide, form 74-2588, for general details on using E-Vision). Due to inconsistencies in VGA display cards and modes, be sure to maximize the E-Vision™ window on the screen (by clicking the up-arrow at the top-right corner of the E-Vision™ window). This assures that all E-Vision activities are user viewable. Refer to the Air Flow balancing section in the E-Vision user's Guide form, 74-2588 for the exact procedure. As to resetting Air Flow Calibration to Factory Defaults, one may refer to the Air Flow Balancing section in the E-Vision™ user's Guide form, 74-2588 for the exact procedure.

A VAV Zeroing Procedure may include the following. 1. Manually command Damper to Closed Position. 2. Read nvoCmdCoolDmpPos until it has closed (See step 3 in K factor Balancing Procedure). 3. Command nviAutoOffsetC to true. 4. Command nviAutoOffsetC to false. 5. Observe nvoPressOC has changed.

Figure 25:
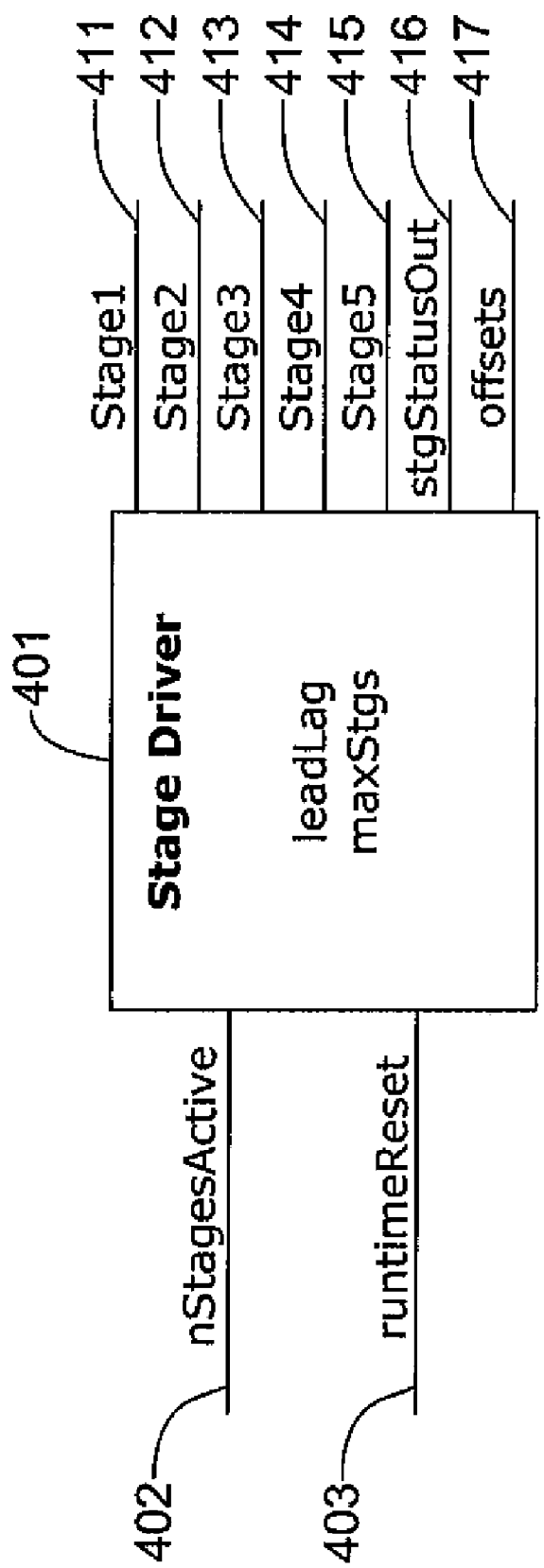
FIG. 25 is a diagram of a stage driver.

The present function block engine may have a stage driver 401 (StageDriver), as shown in FIG. 25. The StageDriverMaster function takes input number of stages active and determines which stages to energize or de-energize based on the lead/lag strategy chosen. StageDriver works with StageDriverAdd to distribute additional stages above those provided in StageDriver. StageDriver also maintains a nonvolatile runtime total and digital stage status information for each stage.

The configuration tool will set a runtime and stage stages offset in a single offsets variable. The offsets variable is not used as a Public Variable ID. The lower byte will store the offset in digital memory to reference the starting stage status memory index, and the upper byte will store the offset in nonvolatile memory to reference the starting runtime memory index. The stgStatusOut is the offset to digital stage status that is used by connected StageDriverAdd blocks.

As more stages are set up during design, the configuration tool will calculate the starting address for both stage status and runtime and allocate the memory and calculate the offset from the base index that is the starting address for the runtime area and the stage status area in their respective memories.

The runtime area is stored in non volatile floats (4 bytes). The stage status area uses a digital byte (1 bytes) so 8 bits or 1 byte of information storage is used for each 8 stages assigned. The tool must assign a 1-byte extra buffer to ensure correct stage driver add functionality.

The stage status information is accessible to drive additional stages. Additional StageDriverAdd function blocks are use to drive stages above those provided in StageDriver up to 255 stages.

The StageDriver RAM structure may be defined as:

```
IN_ONLY  nStgActive;
IN_ONLY  runtimeReset;
OUT_DIG stage1;OUT_DIG stage2;OUT_DIG stage3;OUT_DIG stage4;OUT_DIG stage5;
```

-continued

```
OUT_FLT    stgStatusOut;
OUT_FLT_SAV offsets;
```

The parameters may include:

```
UBYTE   leadLag;    //lead/lag type
UBYTE   maxStgs;    //maximum number of stages
```

The StageDriverLoopStatic structure is defined as:

UINT16 old_seconds; UINT16 oldnumstages; UINT16 seqEndPtr; UINT16 seqStartPtr

From iteration to iteration, the Function Block keeps track of theses items. On power up/reset these are cleared. The memory index for Stage Status and Stage runtimer is calculated as follows.

```
//baseStageStatus = VID_ControlDigitalBase + offsetStageStatus;
//baseStageRuntimer=VID_ControlNonVolatileBase +
    offsetStageRuntimer;
``` where offsetStageStatus is the lower byte of offsets and offsetStageRuntime is the upper byte of offsets.

The Inputs may include the following. The nStagesActive (IN_ONLY) is the input number of stages to be distributed to on/off values to individual stages.

The runtimeReset (IN_ONLY) is the stage number runtime to be reset to 0 if the lead-lag parameter is set to LL_RUNTIME. 0 or unconnected will result in no reset occurring. This value must be returned to 0 to allow the reset stage number to resume counting. It's only valid if leadLag set to LL_RUNTIME. The stage runtime values are only allocated and updated if the leadLag config is set to LL_RUNTIME. The runtime for each stage is stored as a floating point number in intervals of 1 minute. The stages are sampled once a minute and if the stage is on, then the stage runtime accumulator number for that stage is incremented by one minute. The range of values for an integer number stored as a float, is from −16,777,216 to 16,777,216. If the runtime is stored in minutes starting at 0 to 16,777,216, then the range of runtime is from 0 to 31.92 years of runtime.

The Outputs may include the following. Stage1, stage2, stage3, stage4, and stage5 (OUT_DIG) are individual outputs that represent on or off values. These are outputs that are turned on in different order depending on the leadLag strategy.

The stgStatusOut (OUT_FLT) is connected from StageDriver to the StageDriverAdd block and gives a floating point number combined to hold two pieces of information, which are an offset in the Common Memory to the StageBitStatus values and maximum number of stages available. This information is used by the StageDriverAdd to find the correct offset to command which stages to turn on or off. The floating value can be converted to an integer and ANDed with 0xFF and will give the value of the stageStatus Offset. The floating value stgStatusout converted to an integer and right shifted 8 bits will give the byte value of the maxStages. These values are needed to allow the StageDriverAdd to work properly. The values in stgStatusOut are created by the StageDriver stage and no tool calculation is required.

The Offsets (OUT_FLT_SAV) may be noted. One may Store the public Variable ID to a float a value created by the tool to allocate storage memory and reference for stage status in digital memory and stage runtime in nonvolatile memory. There are two offsets stored inside the float value, one for runtime, and one for stage status. The offset float value right shifted 8 bits gives the number of nonvolatile float values from the beginning nonvolatile index (offset) where the runtime values are stored (one runtime value offset for each stage configured), and the offset ANDED with 0xff gives the number of digital values from the base where the stagestatus is stored (one byte per up to 8 stages configured). Each digital memory location takes up 1 byte storage in calculating the offset.

For example, if 3 nonvolatiles were already assigned and 4 digital outputs were already assigned before adding a stagedriver stage of 9 stages with runtime accumulation, then the offset float value would be 256*3+4=772.0. That means the tool would have 8 nonvolatile runtime locations starting at offset 3 from the base of nonvolatile memory and the tool would allocate digital memory of two bytes for the stage status starting at offset of 4 from the base of digital memory. The tool sets this float value for offsets and allocates the memory, and then stagedriver uses this information to know where to look for stagestatus and stage runtime information. This value should not be displayed to the end user.

The Float value that stores Offsets is composed of two values. The offsetStageRuntimer (byte) is float value converted to an integer and shifted 8 bits-specifies the variable quantity offset to be applied to the beginning of nonvolatile memory variable number that indicates the starting variable number used to store the individual stage runtime values. This number is calculated by the configuration tool and is not changeable.

The offsetStageStatus (byte) is float value converted to an integer and ANDed with 0xFF-specifies the variable number offset to be applied to the beginning of digital memory area that indicates the starting variable number used to store the individual stage on/off values. This number is calculated by the configuration tool and is not changeable. This value is exported to other stages through the stageBitStatus output.

The parameters may be the following. The leadLag (Byte param:UBYTE) specifies whether the staging strategy should be first on last off (LL_STD=0—standard), first on first off (LL_FOFO=1—Rotating), run time accumulation where next on is lowest runtime and next off has highest runtime (LL_RUNTEQ=2–Runtime Accumulation). Runtime Accumulation selection requires the tool to allocate Nonvolatile memory and Set the Offsets value. For example in a boiler control system configured for a maximum stages of 4, LL_STD will take the number of stages active and activate the stages in the following order: stage 1 on, then stage1 and stage 2 on, then stage 1 on stage2 on stage3 on, then stage 1 on stage2 on stage3 on and stage 4 on. When one stage is removed then it will be stage 1 on stage 2 on stage 3 on. If one more stage is removed then it will be stage 1 on stage 2 on. If one more stage is removed then stage 1 on, and finally if one more stage is removed then there is only one stage on. And finally if one more stage is removed then no stages are on. Stage 1 always comes on first and is always the last stage to turn off. If one takes this same example and implement as a LL_FOFO which is rotating or First on first off, then the boiler keeps track of where the starting stage is from the last cycle. Say for example there are no stages on and a stage is added. Then adding one stage will turn on stage1. If another stage is added, then stage1 is on and stage2 is on. If one more stage is added then stage1 is on, stage2 is on and stage 3 is on.

Now one may say that the number of stages goes from 3 to 2 so now it is time to remove a stage. Because of LL_FOFO, the first stage one turned on is the first stage to turn off so stage 1 would go off and only stage 2 and stage 3 would be on. Then if one were to turn off one more stage then stage 2 would go off and only stage 3 would be on. Now if one added one more stage, stage 4 would turn on in addition to stage 3. If One more stage were added (numstages=3) then stage 3 is on, stage 4 is on, and now stage 1 turns on too. For a final example, one may take the example of LL_RUNTEQ for a sequence. Each stage now has a runtime accumulation in minutes. So one may assume that the 4 stages turn on for 12 minutes. Each stage for stage1, stage2, stage3, and stage 4 is on and accumulates 12 minutes of runtime. Now it is time to turn off one stage so all the "ON" stages are evaluated for the highest runtime and since they are all the same, the last stage that is on that is evaluated has the highest runtime so stage 4 is turned off so stage 1 on stage2 on and stage3=on. Now one may run the boilers for 2 more minutes. Now stage 1 has 14 minutes runtime, stage 2 has 14 minutes runtime, stage 3 has 14 minutes runtime, and stage 4 has 12 minutes runtime. Now the number of stages requested drops to 2 stages so stage 3 is turned off and now stage 1 on, stage 2 on, stage 3 off, and stage 4 off. So now the boilers are run for 2 more minutes. The runtimes are now stage 1 on=16 minutes, stage 2 on=16 minutes, stage 3=off=14 minutes, and stage 4=off=12 minutes. Now one may add one more stage so number of stages goes from 2 to 3. Now all the stages that are off are evaluated for lowest runtime. Stage 4 has the lowest runtime of 12 minutes so now stage 4 is turned on.

The maxStages (Byte param:UBYTE) specifies how many total stages nStagesActive can reach. MaxStages can go up to a total of 255 stages.

The Common Memory Resources (not accessible by user but accessible by function block) may include the following. The stageRunTimer may be (STATIC_FL) per individual stage * number of stages. If stagingType=RUNTEQ, then individual stages runtimes values are stored in nonvolatile memory. This memory is allocated by the configuration tool. The runtimes for each stage represent the accumulated ON time in hours and are stored in this separate area of nonvolatile STATIC_FL variable memory. The public variable ID for this block of timers is designated by the tool. The Parameter runtimeMemOffset specifies the variable number offset to the starting STATIC_FL memory to access this block. The total number of bytes allocated in Common memory is maxStages time 4 bytes (STATIC_FL), so for 10 stages it would be 10 floats or 40 bytes. Each runtime value is stored as a FLOAT and is sequentially stored starting with RuntimeStage1.

The stageStatus (UBYTE per 8 stages) is a set of digital memory variable allocated by the configuration tool. The total number of bytes allocated in this stagestatus memory area is the rounded up value of maxStages divided by 8, plus 8 bits so 18 stages would require 26 bits or 4 bytes rounded up. The stageStatus memory area is accessed by both StageDriver and StageDriverFollower to determine if a particular stage should be on.

As noted herein, FIG. 25 is a block diagram of the stage driver (StageDriver) 401 with leadlag maxStgs. It may have inputs nStagesActive 402 and runtimeReset 403. The stage outputs may include Stage1 411, Stage2 412, Stage3 413, Stage4 414 and Stage5 415. Other outputs may include stgStatusOut 416 and offsets 417.

Figure 26:
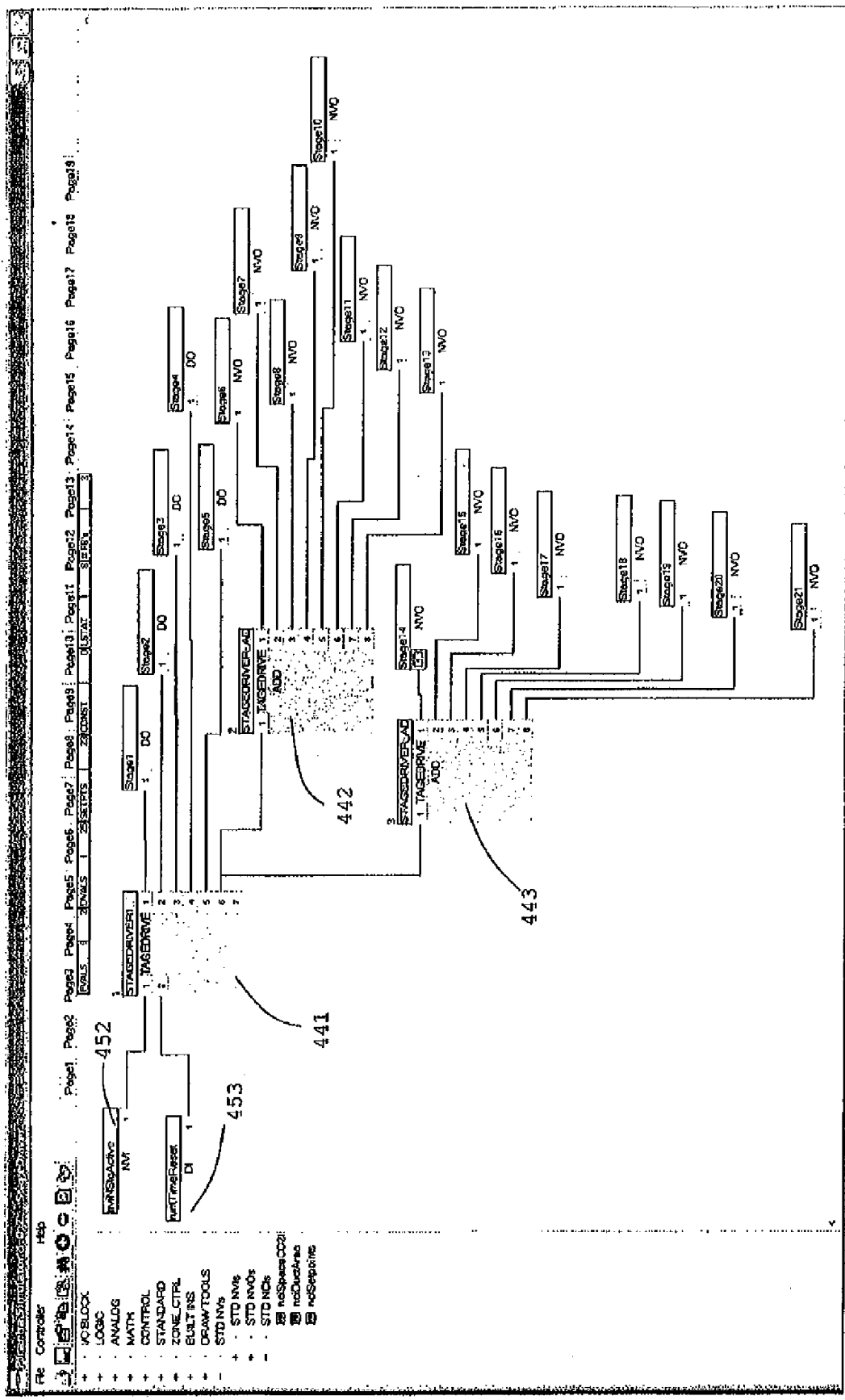
FIG. 26 is a diagram of a function block arrangement for the stage driver.

FIG. 26 is a diagram of a stage driver system 418. In the Stagedriver block 441, nvinStgActive is an input 452 that requests the number of stages to turn on. nviTimeReset is an input 453 used to reset the individual stage runtimes. A selection for the Stagedriver algorithm allows the choice of Standard, First On/First Off (Rotating), and Runtime equalization. StageDriver Block 1 (441) has individual stages outputs 1-5 on outputs labeled number 1-5. The Maximum stage parameter is set to 21 stages. Output 6 is stgStatusOut and is used to communicate the base memory location for the individual stage status (on/off) memory and also the maximum number of stages.

The algorithm for the StageDriver block 441 determines which stages should be added or deleted based on the Standard, First on/First off, and runtime equalization selection. The StageDriver block stores the results of the individual stages in the stage status memory location, using 1 bit per stage. Individual Stage Driving block such as StageDriver or Stagedriver add access the individual bit status from the stage status memory location. In the case of Runtime equalization, there is a separate nonvolatile memory area that is used by the algorithm in the StageDriver block that store the runtime total. Individual runtimes may be reset by using the reset input.

StageDriverAdd Block 2 (442) takes the StgStatusOut information and the starting stage number for this stage (set to 6 in this example) and give individual outputs for stages 6-13. StageDriverAdd Block 3 (443) takes the StgStatusOut information and the starting stage number for this stage (set to 14 in this example) and gives individual outputs for stages 14-21.

FIG. 27 is a table 431 of analog inputs for stage driver 401. It shows the input name, Cfg, a low and high of the range, the input value and the description for each input. FIG. 28 is a table 432 of analog outputs of stage driver 401. It shows the output name, Cfg, a low and high of the range, and the description for each output.

Aspects of the configuration may include the following. The user may specify the maximum number of stages (maxStgs) from 1 to 255. The user may specify the lead lag (leadlag): LL_STD=0—first on last off. LL_FOFO=1—first on first off. LL_RUNEQ=2—runtime equalization for lowest runtime. If the leadlag is outside of the range of 0-2 then Stages initialized to off and not commanded.

Figure 29:
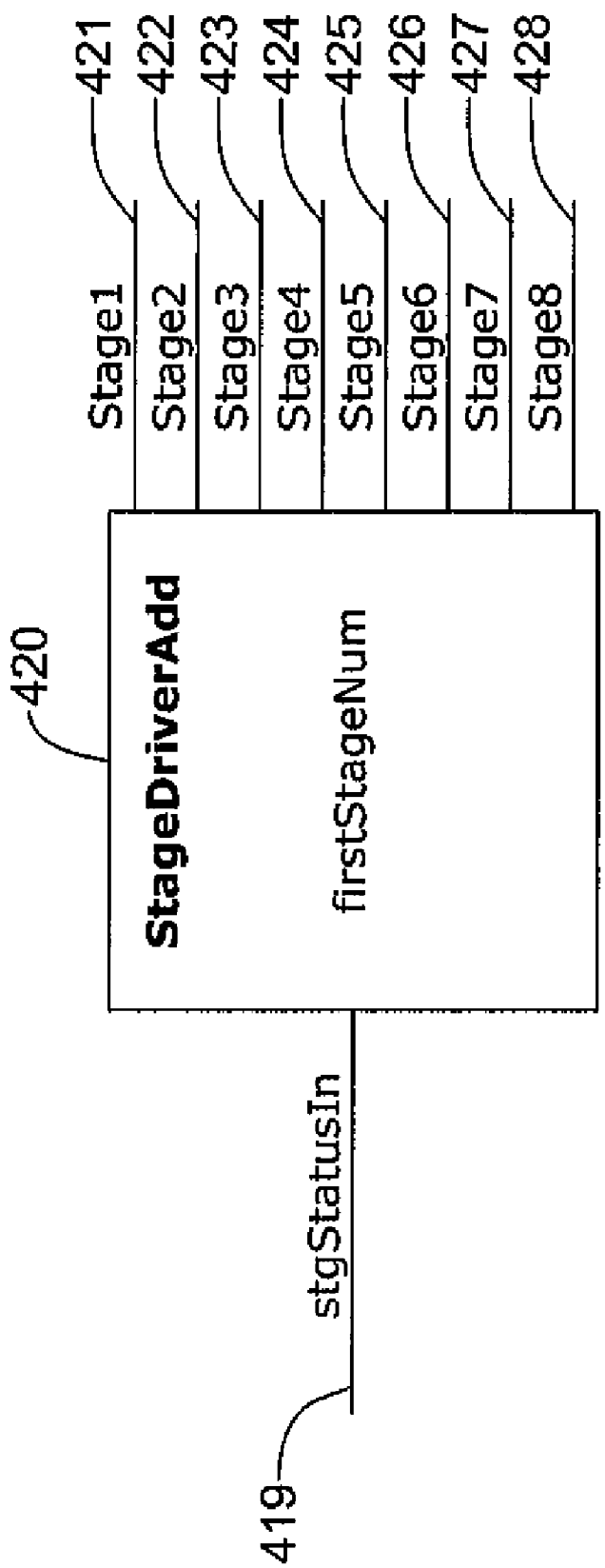
FIG. 29 is a diagram of a stage driver addition.

The stage driver addition (StageDriverAdd) 420 may be noted in FIG. 29. An input (stgStatusIn) 419 may go to the stage driver addition (firstStageNum). The outputs of block 420 may include Stage1 421, Stage2 422, Stage3 423, Stage4 424, Stage5 425, Stage6 426, Stage7 427 and Stage8 428.

The StageDriverAdd function takes input command from StageDriver and determines which stages to energize or de-energize based on the lead/lag strategy chosen. StageDriverAdd works with StageDriver to distribute stages. For example, if StageDriver controls stage 1-6, then the first connection to StageDriverAdd could be configured to handle stages 7-14 and the second StageDriverAdd could be configured to handle stages 15-22.

Inputs may be noted. The stgStatusIn (IN_ONLY) is the float value to be distributed to on/off values to individual stages. This input should come from the output of the StageDriver. The float must first be converted to a two byte unsigned integer. The upper byte (value right shifted 8 bits) gives the maximum number of stages used, and the lower byte (value times 0xff) gives the offset of number of digital values to the start of the stage status location.

Parameters may include the following. The firstStageNum (BYTE_PARAM) is the starting stage number of this block. For example if StageDriverMaster commands stages 1-5, then firstStageNum for the next connected StageDriverFollower would be 6. The default value of the first StageDriveAdd Block's parameter firstStageNum should be 6. It is possible to have the first stage number in the StageDriverAdd overlap the stages controlled by StageDriver. For example by setting firstStageNum to 1 on A StageDriverAdd would duplicate the stage 1-5 functionality of StageDriver.

Outputs may include the following items. Stage1, stage2, stage3, stage4, stages, stages, stage7, and stage8 (OUT_DIG) are individual outputs that represent on or off values. These are outputs that are turned on in different order depending on the leadLag strategy. FIG. 30 is a table 433 of the analog input. The table shows the input name, Cfg, the low and high of the range, the input value and description of the input. FIG. 31 is a table 434 of the analog outputs. The table shows the output name, Cfg, the low and high of the range, and a description of the output. An aspect of the configuration (Cfg) may be noted in that the user may specify the First Stage number (firstStageNum) from 1 to 255.

Figure 32:
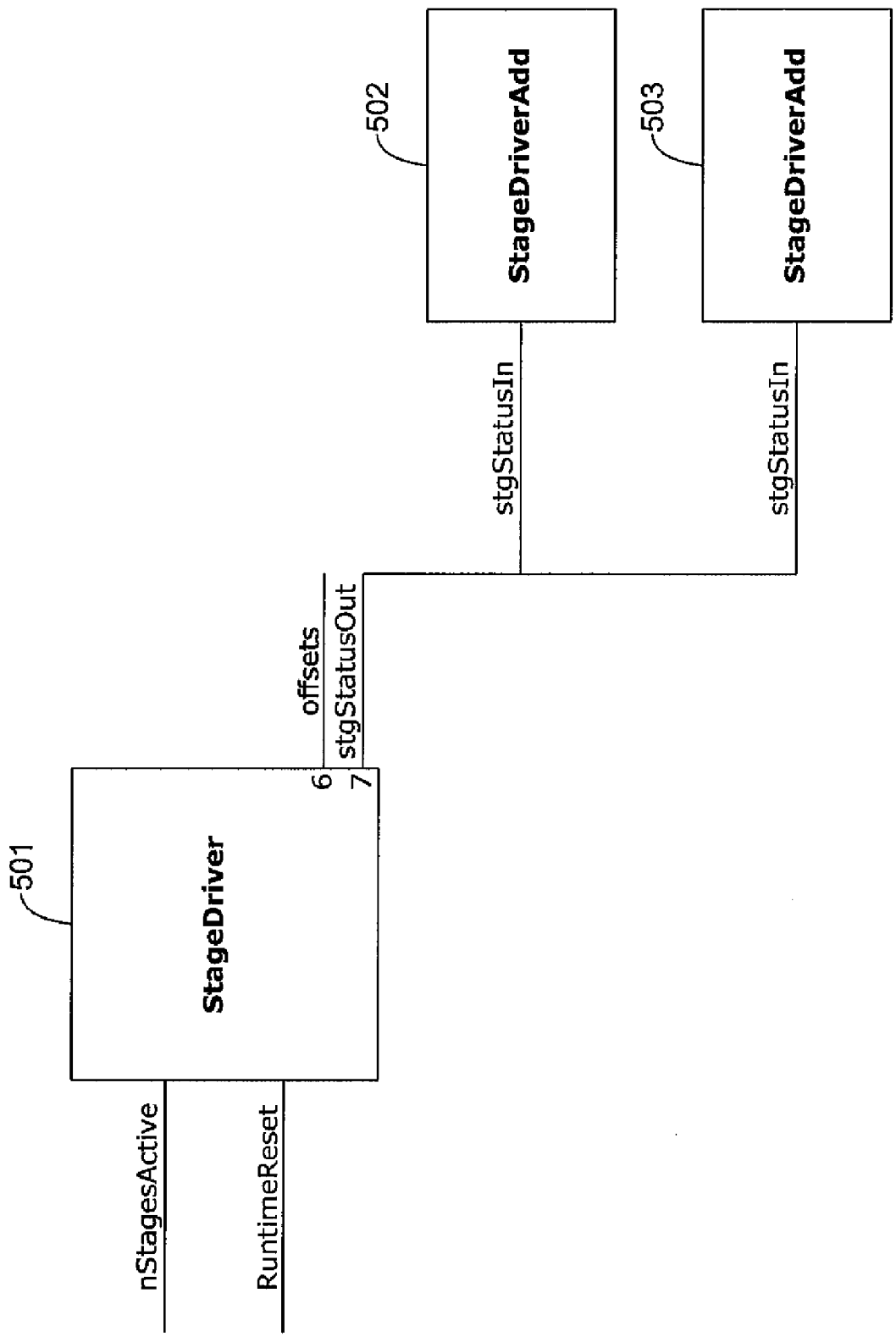
FIG. 32 shows a stage driver with several stage drivers adds.

FIG. 32 shows a stage driver 501 with outputs to at least two stage driver add blocks 502 and 503. Inputs to driver 501 may include n stages active and runtime reset. Driver 501 may include tool sets offsets with offset stage status and offset stage run timer. The outputs may include offsets. Another output may include stgStatusOut which may be inputs to stage driver add blocks 502 and 503. The stgStatusOut may equal maxStgs×256+offset Stage Status.

A block diagram of a stage driver is shown in FIGS. 33, 34, 35, 36, 37 and 38, sequentially. These Figures reveal a series of items 511, 512, 513, 514, 515, 516, 517, 518 and 519, in a serial fashion. The "no" line 545 may connect item 514 to item 516. FIG. 39 is a diagram of the stage driver add with an item 520.

FIGS. 33-39 show the components of the Stage Driver and StageDriverAdd algorithm. FIGS. 33-38 show the StageDriver routine, and FIG. 39 shows the StageDriverAdd algorithm.

Figure 33:
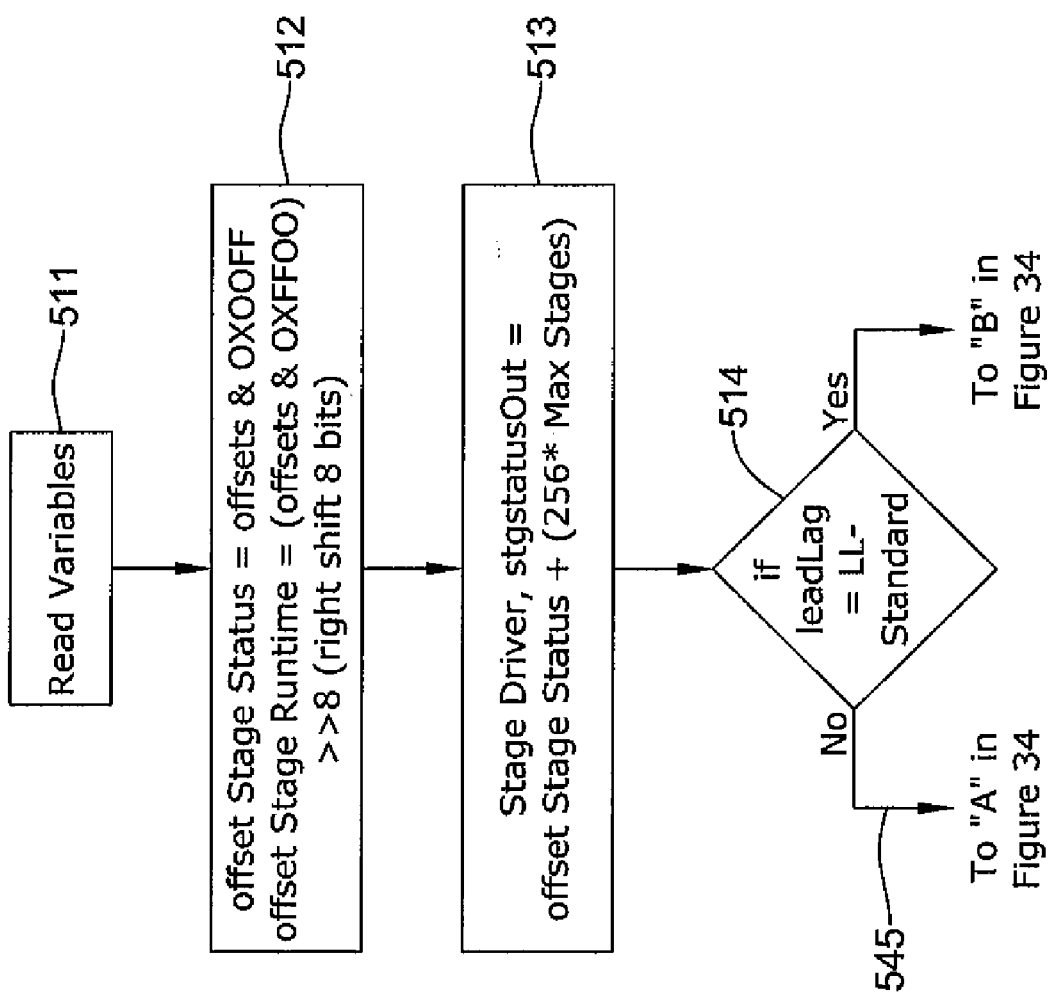

In FIG. 33, the StageDriver algorithm starts with the individual StageStatus and Stage Runtime Information pieces are extracted from the offsets variable. The value in the offsets variable is assigned by the configuration tool at design time. The stgStatusOut value used by other StageDriverAddStages is combined from the MaxStage parameter and the Offset-StageStatus derived from the previous calculation.

Figure 34:
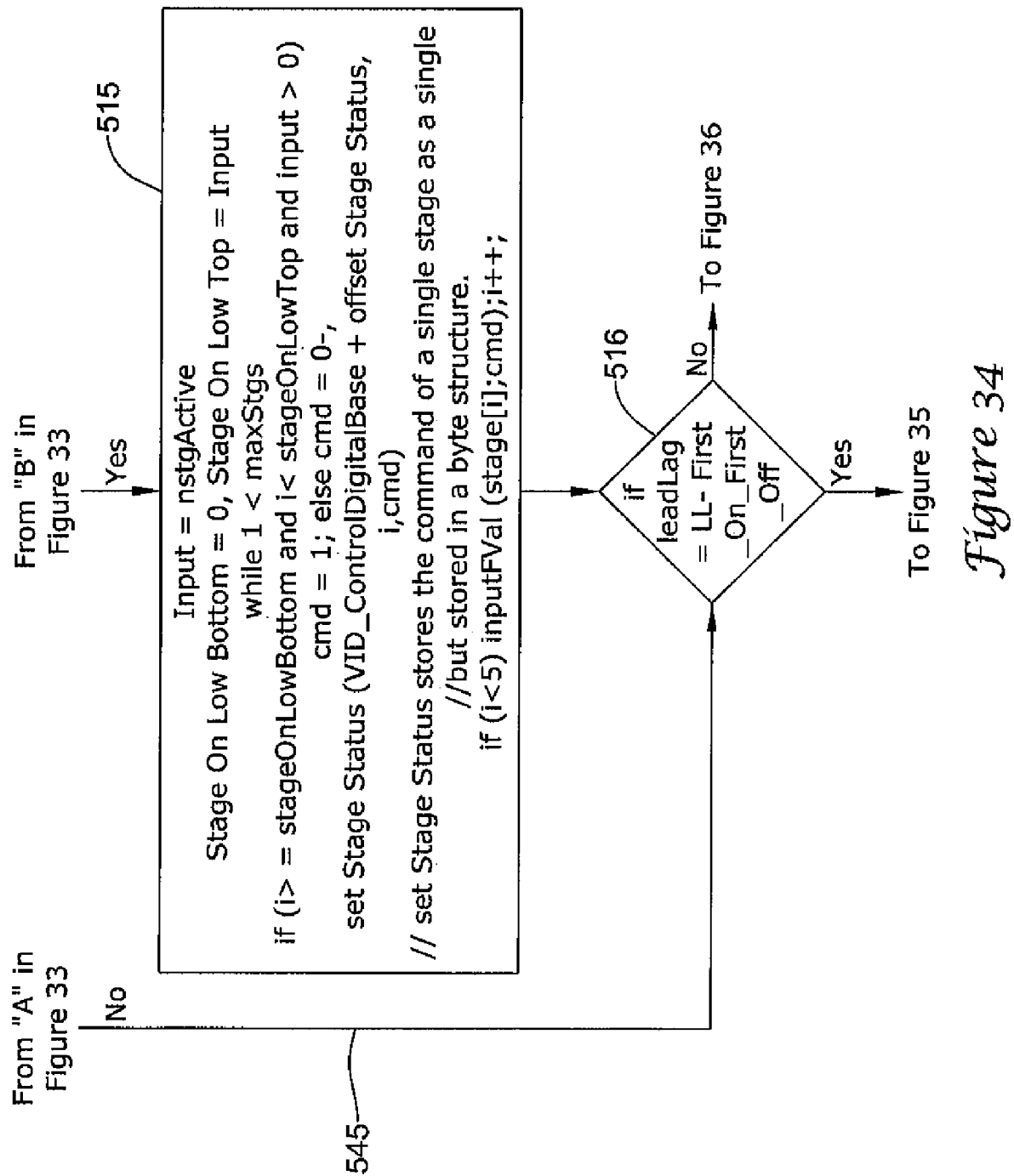

FIG. 34 shows the standard Lead/lag procedure which turns on stages up to the input number of stages and leaves the rest off. The actual on/off commands are stored in the stage status memory location with one stage stored per bit. The function SetStageStatus has the offset, stagenumber (i), and command (cmd) called for each stage. Additionally, if the value of the stages is from 1 to 5, the individual stage is commanded to the command value stored from the previous step.

FIG. 35 shows the First on/first off (rotating) algorithm. An individual Start Pointer (SeqStartPtr) is used to keep track of the first stage beginning point and as stages are added, the sequence End Pointer (seqEndPtr) goes up and as stages are deleted the SeqStartPtr goes up. The Stages between SeqStartPtr and SeqEndPtr are on, and there is wrap around behavior based on the maximum stages requested.

Figure 36:
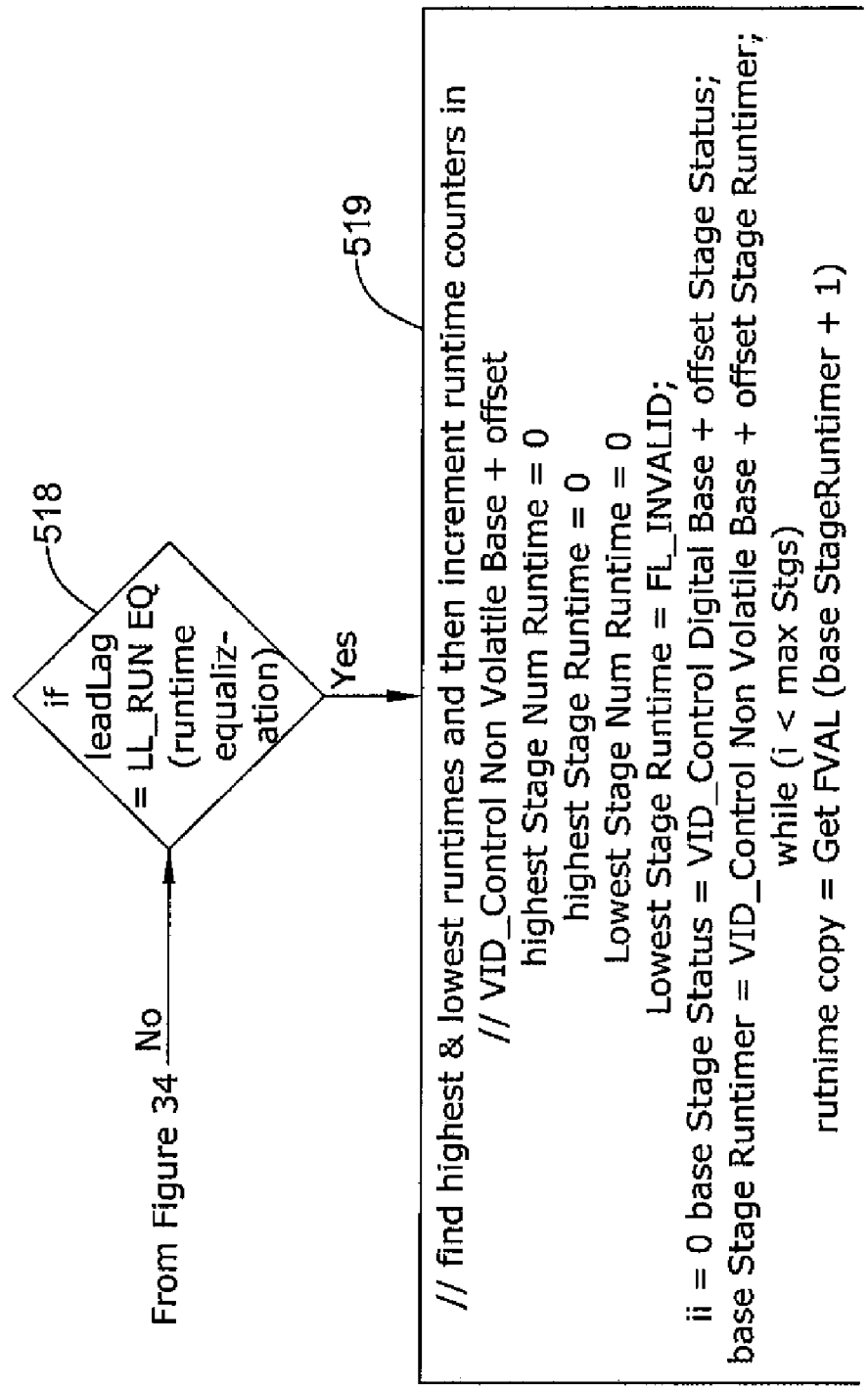

FIGS. 36-38 show the Runtime equalization algorithm. An individual runtime value is used to store the individual stage runtime value, using one float value per individual stage. As the algorithm goes through each individual stage, the value of each stage runtime is compared to the highest stage runtime and lowest stage runtime found so far. If the individual stage is on (determined by a function Get StageStatus), then the runtime for that on stage is compared against the highest stage runtime found so far. After all the stages have been cycled through, the stage with the highest runtime is the candidate to be turned on. Similarly, all the stages that are off are cycled through and each individual stage runtime is compared against the lowest stage runtime found so far. After all the stages have been cycled through, the stage with the lowest runtime is the candidate to be turned off. One stage per execution can change status with the runtime selection.

A runtime reset routine allows an individual stage to be set to zero from the function block. Other memory access methods may allow individual setting of the runtime values.

FIG. 39 shows the Stagedriver Add routine. This routine determines the individual stage status offset values where the stage information is stored and the max stages information from the stgStatusIn which is a connected valued from the StageStatus block. Individual stages on and off information is determined from the GetStageStatus Function call. Each individual stage value is commanded through the PutFVal function call.

For a stage driver block setup one may have a configuration tool. The configuration tool needs to keep track of resources allocated in the stage driver block design, such as in a present example (i.e., FIG. 26).

Stage driver 1 block may use resources as in the following.

| | |
|---|---|
| # Control Floats = 2 | FVALS = 2 |
| # Control Digitals = 25 | DVALS = 26 |
| # Control NonVolatiles = 1 | SetPoints = 1 |
| # Flash Constants = 0 | CONST 0 |
| # Bytes Loop Static = 8 | |
| # Function Blocks = 3 | LSTAT = 8 |
| # User NVIs = 1 | |
| # UserNVOs = 16 | # FB = 3 |

The following information consists of a project summary for the stage driver.
Device Name StageDriver
Resource Useage
Control Floats = 2
Control Digitals = 25
Control NonVolatiles = 23
Flash Constants = 0
Bytes RAM pool Used = 116
Bytes Loop Static = 8
Function Blocks = 3
User NVIs = 1
User NVOs = 16
Function Block Data

| Type | | Name | | |
|---|---|---|---|---|
| STAGEDRIVER | | STAGEDRIVER1 | | |
| Wrd | Name | PVID (hex) | PVID (dec) | Value |
| 0 | nStgActive | 8000 | 32768 | 0 |
| 1 | runtimeReset | 8203 | 33283 | 0 |
| 2 | stage1 | 8204 | 33284 | 0 |
| 3 | stage2 | 8205 | 33285 | 0 |
| 4 | stage3 | 8206 | 33286 | 0 |
| 5 | stage4 | 8207 | 33287 | 0 |
| 6 | stage5 | 8208 | 33288 | 0 |
| 7 | stgStatusOut | 8001 | 32769 | 0 |
| 8 | offsets | 8116 | 33046 | 0 |

| Byt | Name | Value |
|---|---|---|
| 0 | leadLag | 2 |
| 1 | maxStgs | 22 |
| 2 | spare | 0 |

| Type | | Name | | |
|---|---|---|---|---|
| STAGEDRIVER_ADD | | STAGEDRIVER_ADD2 | | |
| Wrd | Name | PVID (hex) | PVID (dec) | Value |
| 0 | stgStatusIn | 8001 | 32769 | 0 |
| 1 | stage1 | 8209 | 33289 | 0 |
| 2 | stage2 | 820A | 33290 | 0 |
| 3 | stage3 | 820B | 33291 | 0 |
| 4 | stage4 | 820C | 33292 | 0 |
| 5 | stage5 | 820D | 33293 | 0 |

-continued

| | | | | | |
|---|---|---|---|---|---|
| 6 | stage6 | 820E | 33294 | 0 | |
| 7 | stage7 | 820F | 33295 | 0 | |
| 8 | stage8 | 8210 | 33296 | 0 | |

| Byt | Name | Value |
|---|---|---|
| 0 | firstStgNum | 6 |
| 1 | | 0 |
| 2 | spare | 0 |

| Type STAGEDRIVER_ADD | | Name STAGEDRIVER_ADD3 | | |
|---|---|---|---|---|
| Wrd | Name | PVID (hex) | PVID (dec) | Value |
| 0 | stgStatusIn | 8001 | 32769 | 0 |
| 1 | stage1 | 8211 | 33297 | 0 |
| 2 | stage2 | 8212 | 33298 | 0 |
| 3 | stage3 | 8213 | 33299 | 0 |
| 4 | stage4 | 8214 | 33300 | 0 |
| 5 | stage5 | 8215 | 33301 | 0 |
| 6 | stage6 | 8216 | 33302 | 0 |
| 7 | stage7 | 8217 | 33303 | 0 |
| 8 | stage8 | 8218 | 33304 | 0 |

| Byt | Name | Value |
|---|---|---|
| 0 | firststgNum | 14 |
| 1 | | 0 |
| 2 | spare | 0 |

| User NV Configuration Data | | | | |
|---|---|---|---|---|
| NV Name | Field Name | PVID (hex) | PVID (dec) | Value |
| nviNStgActive | Field1 | 8000 | 32768 | 0 |
| Stage6 | Field1 | 8209 | 33289 | N/A |
| Stage7 | Field1 | 820A | 33290 | N/A |
| Stage8 | Field1 | 820B | 33291 | N/A |
| Stage9 | Field1 | 820C | 33292 | N/A |
| Stage10 | Field1 | 820D | 33293 | N/A |
| Stage11 | Field1 | 820E | 33294 | N/A |
| Stage12 | Field1 | 820F | 33295 | N/A |
| Stage13 | Field1 | 8210 | 33296 | N/A |
| Stage14 | | 8211 | 33297 | N/A |
| Stage15 | Field1 | 8212 | 33298 | N/A |
| Stage16 | Field1 | 8213 | 33299 | N/A |
| Stage17 | Field1 | 8214 | 33300 | N/A |
| Stage18 | Field1 | 8215 | 33301 | N/A |
| Stage19 | Field1 | 8216 | 33302 | N/A |
| Stage20 | Field1 | 8217 | 33303 | N/A |
| Stage21 | Field1 | 8218 | 33304 | N/A |

Control Constants
PVID (Hex) PVID (Dec) Value

An Appendix A provides further support of the description of the systems herein.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

Appendix A

TempControlP2
Description:

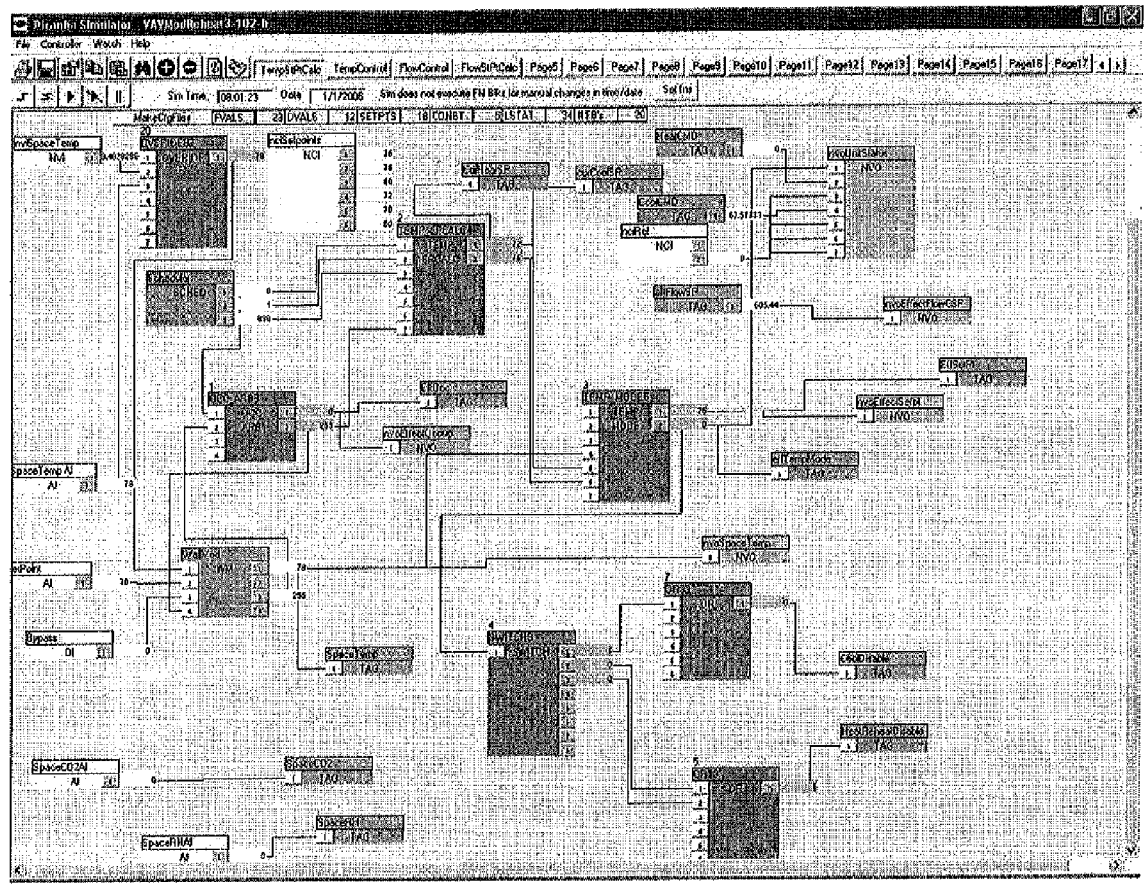

Override

*Override*

This function sets the output to the highest priority input that is not invalid. The Highest priority input is priority1Value and the Lowest priority input is cntrlInput. If All inputs are invalid or Unconnected, then the output is set to defaultValue. This function block corresponds to the BACnet priority array implementation with the replacement of the BACnet "NULL" state with "invalid".

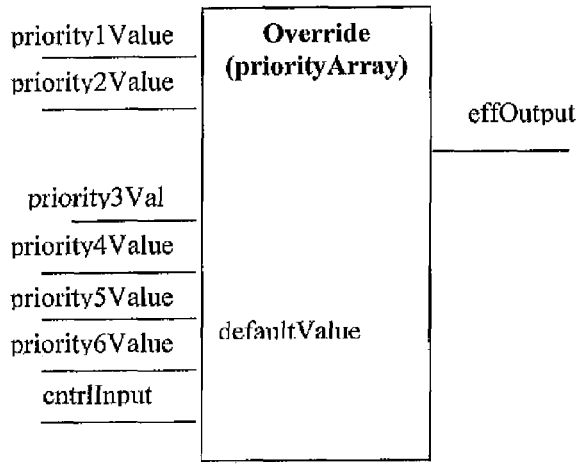

Configuration:
1) None

| | | | |
|---|---|---|---|
| In1 | priority1val | IN_PAR | priority 1 value |
| In2 | priority2val | IN_PAR | priority 2 value |
| In3 | priority3val | IN_PAR | priority 3 value |
| In4 | priority4val | IN_PAR | priority 4 value |
| In5 | priority5val | IN_PAR | priority 5 value |
| In6 | priority6val | IN_PAR | priority 6 value |
| In7 | cntrlInput | IN_PAR | controller input |
| Paramter1 | defaultValue | PAR_IN | default value |
| Out1 | effOutput | OUT_FLT | output-Override |

Explanation:
In this Example VAV application, two inputs are connected to the Override 92 function block. Input 2 (piority2val) is the nviSpaceTemp network value that is set to invalid (3.402823E+38 = invalid) so that does not propagate to the effoutput. The SpaceTemp AI (Analog input space temp) value of 78 degrees is connected to input 3 (piority3val) and since that is the highest priority value that is available, then 78 degrees is propagated to the effoutput output1. In this system, a valid value of nviSpaceTemp has priority over the physical SpaceTempAI.

Scheduler

*Scheduler*

This function calculates the current occupancy state, next state and time until next state (TUNCOS) based on the date/time and the schedule. It makes them available as public variables.

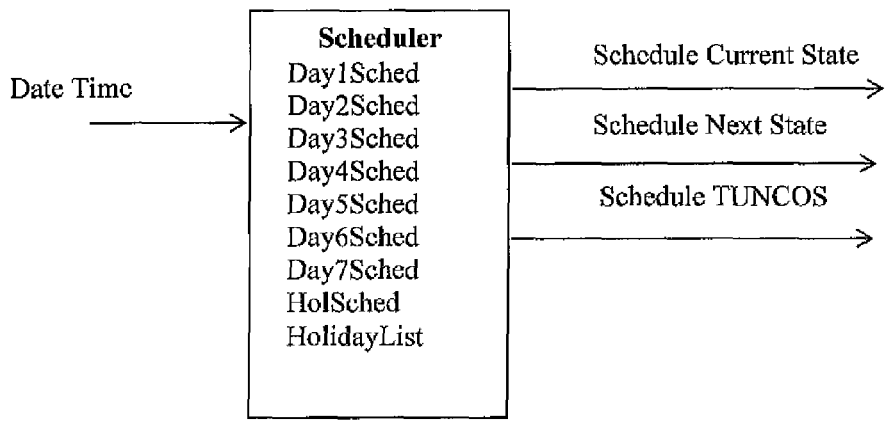

Inputs:
Date and Time from the operating system.

Outputs:
*Schedule Current State* is the occupancy state the controller should be in at this minute.
    OCC means use the occupied set point.
    UNOCC means use the unoccupied set point.
    STANDBY means use the standby set point.

*Schedule Next State* is the occupancy state the controller will go to after the current state is complete.
    OCC means the next state is occupied.
    UNOCC means the next state is unoccupied.
    STANDBY means the next state is standby.
    OCCNUL means the next state unknown.

*Schedule TUNCOS* is the time (in minutes) until the next change of state. The Piranha controller uses this to do setpoint recovery.
    Range: 0 to 11520 minutes (8 days). 11520 minutes means the time until next change of state is unknown or further in the future.

The enumeration values for all occupancy states are: Occ = 0, Unocc=1, Bypass =2, Standby = 3, Null = 255.

Configuration:
1) The user specifies up to 4 events per day for each of the 7 days a week plus a holiday. Each event has a state of OCC, STANDBY, UNOCC, or OCCNUL (not programmed). And a time of day 0-1439 minutes. Zero (0) is the first minute of the day which is midnight. 1439 is the last minute of the day, 11:59PM.
2) The user specifies up to ten (10) holidays. Each scheduled holiday has a valid start month, day and duration. Holidays are every year by definition.

Operation:
There can be one scheduler per controller. The scheduler calculates the occupancy state of the controller. It computes the current state, next state and Time until Next Change of State (TUNCOS). This built-in function is called once per second by the task scheduler. The user can create logic to select between this schedule and a schedule command coming in from the network. The user can use the Effective Occupancy Arbitrator Function Block to combine this result with other inputs to calculate effective occupancy current state.

Explanation:
The Scheduler is configured as follows: occupied 8am on Sun,Mon,Tue,Wed,Thurs,Frid,Sat and unoccupied at 10 pm on Sun,Mon,Tue,Wed,Thurs,Frid,Sat. In this example, the current time is 8:01 am and the Sched block output1 (currentOcc) state is 0=Occupied.
The enumeration values for all occupancy states are: Occ = 0, Unocc=1, Bypass =2, Standby = 3, Null = 255.
The output 2 (nextOcc) state is 1= Unoccupied and the output3 (TUNCOS or time until next change of state) is 839 minutes. These values are passed from the scheduler block to the Temp setpoint calc to assist in calculation of the current setpoint and temperature ramping.

WallModule

*Wall Module Interface*

This function automatically handles the wall module interface with the T7770. It takes the sensor, setpoint and override information from the universal and digital inputs and makes them available as public variables. It provides a feedback signal to the LED on an analog output for override indication.

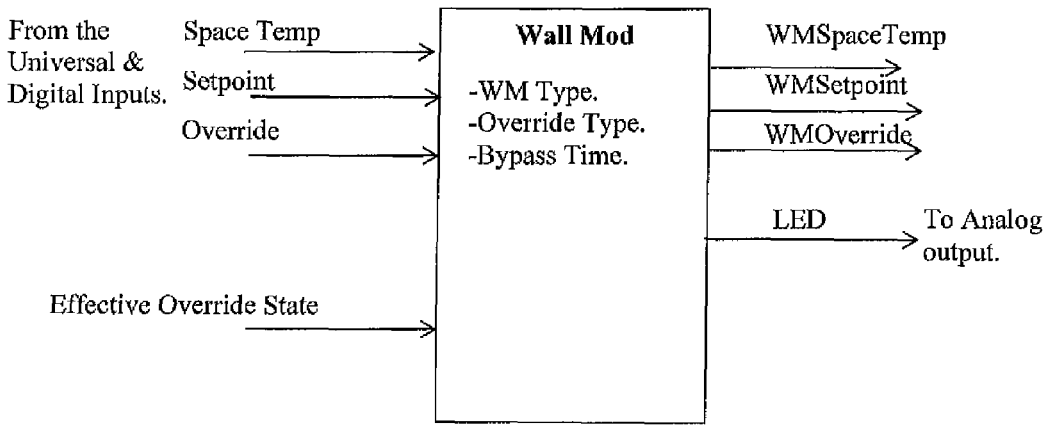

Logic Inputs:

The wall module override input must go into a digital input of the Piranha controller for proper operation.

Configuration:
1) The user specifies the override type. This mode can be "Normal (0)", "Bypass only (1)", or "Disabled (2)". Values other than these are treated as "Normal".
3) The user specifies the bypass time as a parameter or connects this input to a network output such as nciBypassTime.

Explanation:
The Wall module take the space temp input 1 as 78 degrees, the setpoint input 2 as 70 degreess, the bypass button input 3 as 0 (off). Wall module input 4 is Effective override which comes from the OCC ARB function block. 255 is Null or not used. The output 1 is space temp out equals 75 degrees and WMOverride = 255 (null).

| | | | |
|---|---|---|---|
| In1 | spaceTempIn | IN_ONLY | space temperature |
| In2 | setPointIn | IN_ONLY | setpoint |
| In3 | overide | IN_ONLY | override |
| In4 | EffOverride | IN_ONLY | effective override state |
| Out1 | spaceTempOut | OUT_FLT | output-Space temperature |
| Out2 | setPointout | OUT_FLT | output-Setpoint |
| Out3 | WMOverride | OUT_DIG | output-Wall module override |
| Out4 | LED | OUT_DIG | output-LED |

OccArb

*Occupancy Arbitrator*

This function computes the current Effective Occupancy Current State and the Manual Override State.

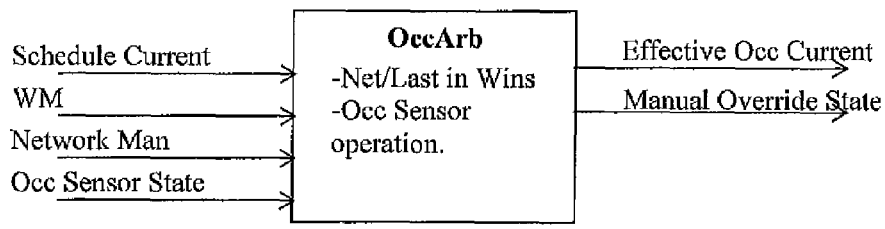

Occ = 0, Unocc=1, Bypass =2, Standby = 3, Null = 255.

| | | | |
|---|---|---|---|
| In1 | schedCurrentState | schedule current state | IN_ONLY |
| In2 | wmOverride | wall module override | IN_ONLY |
| In3 | networkManOcc | network manual occ command | IN_ONLY |
| In4 | occSensorState | occ sensor | IN_ONLY |
| Out1 | effOccCurrentState | output-Effective current occ state | OUT_DIG |
| Out2 | manOverrideState | output-Man Override | OUT_FLT_SAV |
| Param1 | netLastInWins | 0=net wins; 1=last in wins | |
| Param2 | occSensorOper | 0=cr; 1=cc; 2=tenant | |

Configuration:
1) The user specifies Net wins (0) or Last in wins (1).
2) The user specifies the occupancy sensor operation. There are 3 choices: Conference room (0), Unoccupied Cleaning Crew (1), and Unoccupied Tenant (2).

Explanation:
The Occupancy arb takes input1 schedcurrentstate from sched which is 0 = occupied and takes the input 2 wallmod override input 2 from the Wall mod output 3 wall mod override and arbitrates the current occupancy mode which is output 1 Effective Occ Current State which is 0= occupied. Occ Arb also determines if there is a manual override on output 2 = 255 = null used.

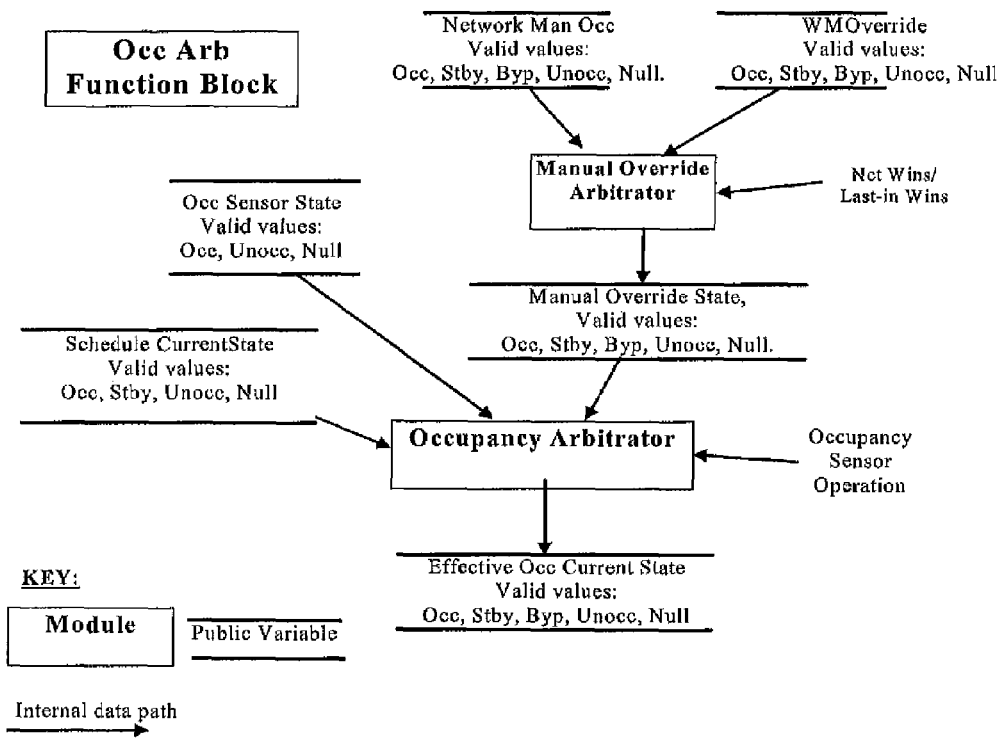

TempSpCalc

Temperature Setpoint Calculator

This function calculates the current Effective Heat setpoint and Effective Cool setpoint based on the current schedule information, occupancy override, and intelligent recovery information.

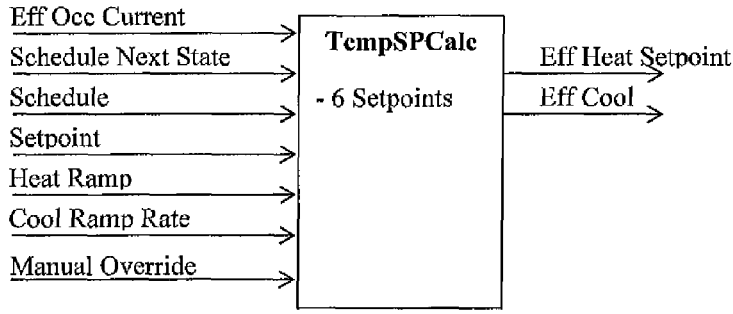

| | | | |
|---|---|---|---|
| In1 | effOccCurrentState | IN_ONLY | effective occ current state |
| In2 | schedNextState | IN_ONLY | sched next state |
| In3 | schedTuncos | IN_ONLY | sched Time until next change of state |
| In4 | setpoint | IN_ONLY | setpoint (<10 = offset) |
| In5 | heatRampRate | IN_PAR | heat ramp rate |
| In6 | coolRampRate | IN_PAR | cool ramp rate |
| In7 | manOverrideState | IN_ONLY | man override state |
| Out1 | effHeatSP | OUT_FLT | output-effective heat setpoint |
| Out2 | effCoolSP | OUT_FLT | output-effective cool setpoint |

Configuration:
1) The user specifies the 6 setpoints. When the TempSPCalc Function Block is used, nciTempSetpoints (SNVT_temp_setpt) is added by the Management Tool. nciTempSetpoints is mapped by the Tool to the first 6 Public variables under Control non-volatile. The order is Occupied Cool, Standby Cool, Unoccupied Cool Occupied Heat, Standby Heat, and Unoccupied Heat. The user may have more than one TempSPCalc Function Block, however all blocks will use the same nciTempSetpoints network variable and map to the same 6 Public variables. See below for more information.

Explanation:
The Temperature setpoint calculator takes the input1 effective occ current state (0 = occupied) and input 2 sched next state (1= unoccupied) and input 3 sched Time until next change of state (839 minutes) from the Scheduler and also input 7 man override from Occ arb (255 = null) and uses the 6 setpoints (nciSetpoints) to calculate output 1 current effective heat Setpoint = 72 and output 2 effective cool setpoint = 76. The Six setpoint are Occupied Cool=76, Standby Cool=78, Unoccupied Cool-80 Occupied Heat=72, Standby Heat=70, and Unoccupied Heat=60.

TempMode

Set Temperature Mode

This function automatically calculates the effective temperature control mode based on the control type, system switch setting, network mode command, temperature set points, supply temperature and space temperature. From iteration to iteration, the Function Block keeps track of the previous command mode and the effective temperature mode. On power up/reset these are cleared sysSwitch

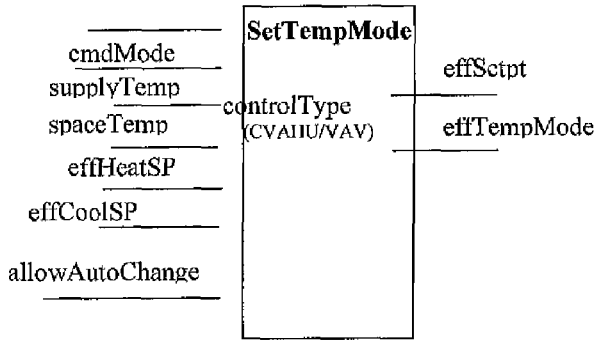

effTempMode indicates the current Mode determined by input states and arbitrated by control logic. SetTempMode does not generate all the possible Modes available. The valid enumerated values have the following meanings:

| effTempMode | Meaning |
|---|---|
| COOL_MODE=0 | Cool air is being supplied to the node via the central air supply and cooling energy is being supplied to the controlled space. |
| REHEAT_MODE=1 | Cool air is being supplied to the node via the central air supply. The air is being reheated by a local Heat source. |
| HEAT_MODE=2 | Heated air is being supplied to the node via the central air supply and heated air is being supplied to the controlled space. |
| EMERG_HEAT=3 | Emergency Heat is being supplied to the node via the central air supply. |
| OFF_MODE=255 | •Controller is commanded off. |

Input Enumerations:
sysSwitch
SS_AUTO         =   0
SS_COOL         =   1
SS_HEAT         =   2
SS_EMERG_HEAT   =   3
SS_OFF          =   255 cmdMode
CMD_AUTO_MODE = 0
CMD_HEAT_MODE = 1
CMD_COOL_MODE = 2
CMD_OFF_MODE = 3
CMD_EMERG_HEAT_MODE = 4
CMD_NUL_MODE = 255

The VAV Mode arbitration logic for controlType = 1 (VAV) is summarized by the tables below:

| Space Temp | sysSwitch | Supply Temp | cmdMode | effTempMode |
|---|---|---|---|---|
| X | X | X | CMD_OFF_MODE(3) | OFF_MODE(255) |
| X | X | X | CMD_EMERG_HEAT_MODE(4) | HEAT_MODE(2) |
| X | X | X | ENUMERATION (5) through ENUMERATION (254) | COOL_MODE(0) |
| Valid | X | <70.0 | CMD_AUTO_MODE (0), CMD_HEAT_MODE (1), CMD_NUL_MODE (255) | COOL_MODE (0) or REHEAT_MODE (1) (see note 1) |
| Valid | X | <70.0 | CMD_COOL_MODE(2) | COOL_MODE (0) |
| Valid | X | 70.0 TO 75.0 | CMD_AUTO_MODE (0), CMD_HEAT_MODE (1), CMD_COOL_MODE (2), CMD_NUL_MODE (255) | COOL_MODE (0), REHEAT_MODE (1), HEAT_MODE (2) (see note 1 for transition between cool mode and reheat mode) |
| Valid | X | >75 | CMD_AUTO_MODE (0), CMD_HEAT_MODE (1), CMD_NUL_MODE (255) | HEAT_MODE(2) |
| Valid | X | Invalid or unconnected | CMD_HEAT_MODE (1) | HEAT_MODE (2) |

| Valid | X | Invalid or unconnected | CMD_COOL_MODE (2) | COOL_MODE (0) |
|---|---|---|---|---|
| Valid | SS_COOL(1) | Invalid or unconnected | CMD_AUTO_MODE (0) | COOL_MODE(0) |
| Valid | SS_HEAT(2) | Invalid or unconnected | CMD_AUTO_MODE (0) | HEAT_MODE(2) |
| Valid | SS_EMERGENCY_HEAT(3) | Invalid or unconnected | CMD_AUTO_MODE (0) | HEAT_MODE(2) |
| Valid | SS_OFF(255) | Invalid or unconnected | CMD_AUTO_MODE (0) | OFF_MODE(255) |
| Valid | SS_AUTO(0), invalid, unconnected, or a non-listed enumeration. | Invalid or unconnected | CMD_AUTO_MODE (0), CMD_NUL_MODE (255), | COOL_MODE(0) or REHEAT_MODE(1) (see note 1) |
| InValid | SS_AUTO(0), invalid, unconnected, or a non-listed enumeration. | Invalid or unconnected | CMD_AUTO_MODE (0), CMD_NUL_MODE (255), | COOL_MODE(0) |

X means Don't Care

Note 1: If allowAutoChange = 1 then allow to switch between REHEAT_MODE and COOL_MODE. Must have valid effHeatSP and effCoolSP.

If in cool mode and spacetemp < effheat setpt and space temp < effcoolsetpt – 1.0 then go to reheat mode. If in reheat mode and spacetemp > effCoolSetpt and spacetemp > effHeatsetpt + 1.0 then go to cool mode.

Configuration:
1) The user specifies the control Type (controlType). 0 – CVAHU; 1 – VAV

| | | | |
|---|---|---|---|
| In1 | sysSwitch | IN_ONLY | system switch |
| In2 | cmdMode | IN_ONLY | command mode |
| In3 | supplyTemp | IN_ONLY | supply temp |
| In4 | spaceTemp | IN_ONLY | space temp |
| In5 | effHeatSP | IN_ONLY | effective heating setpoint |
| In6 | effCoolSP | IN_ONLY | effective cooling setpoint |
| In7 | allowAutoChange | IN_PAR | Auto changeover enable/disable |
| Out1 | effSetpt | OUT_FLT | output-Current effective setpoint |
| Out2 | effTempMode | OUT_FLT_SAV | output-Effective temperature mode |
| param | controlType | ubyte | control type (0=CVAHU; 1=VAV) |

Explanation:
The temp mode takes the input 4 space temp = 75, in5 effective heat setpoint = 72, in6 effcoolSP=76 and control type = 1 = vav and arbitrates the current command mode for the controller which is out1 effective setpoint = 76 and out 2 effective temp mode = 0 = cool nvoUnitStatus

Explanation:
nvoUnitStatus is a aggregation of values under one grouping called nvoUnitStatus. The contents of nvoUnitStatus is as follows;

Edit Output Network Variable Configuration nvoName: nvoUnitStatus

Guaranteed Periodic Refresh: ● TRUE  ○ FALSE

Output Refresh: ○ Polled  ● Unpolled

Message Service: UNACKD

Number of Data Fields in NV: 7    Select structured SNVT: SNVT_hvac_statu

| | Field Name | Category | Internal Data Type | Network Data Type | SEN Delta |
|---|---|---|---|---|---|
| 1 | mode | Unit - less | VAL-ubyte | SNVT_hvac_mode | 1 |
| 2 | heat_output_primary | Percentage | % | SNVT_lev_percent | 1 |
| 3 | heat_output_second | Percentage | % | SNVT_lev_percent | 1 |
| 4 | cool_output | Percentage | % | SNVT_lev_percent | 1 |
| 5 | econ_output | Percentage | % | SNVT_lev_percent | 1 |
| 6 | fan_output | Percentage | % | SNVT_lev_percent | 1 |
| 7 | in_alarm | Unit - less | VAL-ubyte | VAL-ubyte | 1 |

OK nciSetpoints

Explanation:
The Six Setpoints are are Occupied Cool=76, Standby Cool=78, Unoccupied Cool-80 Occupied Heat=72, Standby Heat=70, and Unoccupied Heat=60. For details, see below:

| # | Field Name | Data Category | Network Data Type | Internal Data Type | Value |
|---|---|---|---|---|---|
| 1 | occupied_cool | Temperature | SNVT_temp_p | F | 76 |
| 2 | standby_cool | Temperature | SNVT_temp_p | F | 78 |
| 3 | unoccupied_cool | Temperature | SNVT_temp_p | F | 80 |
| 4 | occupied_heat | Temperature | SNVT_temp_p | F | 72 |
| 5 | standby_heat | Temperature | SNVT_temp_p | F | 70 |
| 6 | unoccupied_heat | Temperature | SNVT_temp_p | F | 60 |

NV Name: nciSetpoints
Network Variable Class: nci (Static Data)
Fail Detect: False
Number of Data Fields in NV: 6
Select structured SNVT: SNVT_temp_setpt

Switch

This function takes an enumerated type input and subtracts a user defined offset to determine which output to set TRUE, holding all others FALSE. The valid range of the input minus the offset is 0-7. The output [0-7] is TRUE if input − offset = X, otherwise it is FALSE. Where X is the output number 0-7.

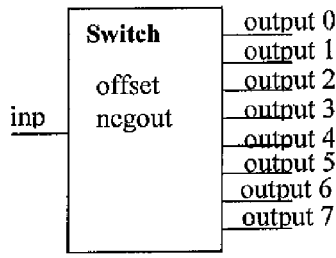

Note 1: If the output is negated, then it will be ON. Individual Outputs can be negated using the negout parmeter.
The output [0-7] is TRUE if input − offset = X, otherwise it is FALSE.

Configuration
1. The user specifies the negation of each output.

2. The user specifies the offset from 0 to 255.

| | | | |
|---|---|---|---|
| In1 | sensor | IN_ONLY | input |
| Out1 | out0 | OUT_DIG | output 1 |
| Out2 | out1 | OUT_DIG | output 2 |
| Out3 | out2 | OUT_DIG | output 3 |
| Out4 | out3 | OUT_DIG | output 4 |
| Out5 | out4 | OUT_DIG | output 5 |
| Out6 | out5 | OUT_DIG | output 6 |
| Out7 | out6 | OUT_DIG | output 7 |
| Out8 | out7 | OUT_DIG | output 8 |
| Param1 | offset | Ubyte | offset |
| Param2 | negout | NETBITOUT | individual output bit negation |

Explanation:
Switch input 1 takes output 2 from the temp mode which is the effective temp mode = 0 = cool and converts it to a single output per mode. As you will recall from the temp mode discussion the following enumerations are :

| effTempMode | Meaning |
|---|---|
| COOL_MODE=0 | Cool air is being supplied to the node via the central air supply and cooling energy is being supplied to the controlled space. |
| REHEAT_MODE=1 | Cool air is being supplied to the node via the central air supply. The air is being reheated by a local Heat source. |
| HEAT_MODE=2 | Heated air is being supplied to the node via the central air supply and heated air is being supplied to the controlled space. |
| EMERG_HEAT=3 | Emergency Heat is being supplied to the node via the central air supply. |
| OFF_MODE=255 | *Controller is commanded off. |

So therefore Switch output 1 = 1 is true (cooling mode true) if the in1 sensor is 0=cool. Output 2 = 0 (reheat mode= false) and output3 =0 (heat mode = false) as a result of input 1 = 1.

Function Block Parameters

Function Block Type: SWITCH    Brief description of FB Operation
Function Block Name: SWITCH9

| | Field | Type | Value | NOT | Comments |
|---|---|---|---|---|---|
| 1 | sensor | INPUT | | | input |
| 2 | out0 | OUTPUT | | ☐ | output 1 |
| 3 | out1 | OUTPUT | | ☐ | output 2 |
| 4 | out2 | OUTPUT | | ☐ | output 3 |
| 5 | out3 | OUTPUT | | ☐ | output 4 |
| 6 | out4 | OUTPUT | | ☐ | output 5 |
| 7 | out5 | OUTPUT | | ☐ | output 6 |
| 8 | out6 | OUTPUT | | ☐ | output 7 |
| 9 | out7 | OUTPUT | | ☐ | output 8 |
| 10 | offset | SETPT | 0 | | offset |

Help    OK

Or

*OR/NOR*

This function is a 6 input OR or NOR. Each input may be individually inverted (NOT)). Unconnected or invalid inputs default to FALSE, without negation, so as to have no effect on the result. From iteration to iteration, the Function Block keeps track of the last computed output value and the current true or false delay time. On power up/reset these are cleared.

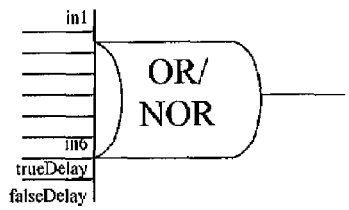

Configuration
1. The user specifies the negation of each input. Negation does not affect the invalid logic value.
2. The user specifies the negation of the output. If the output is negated, the Function Block acts like a NOR.

Explanation:
OR13 logic – if input 1= 1 or input 2 = 1 (either reheat or heat mode) then (negate ) output = 1 so heat disable is true. OR33 logic – if input 1 is true then negate output = 0 so cool disable = 0 (false) which enables the cool controls.

TempControl P2

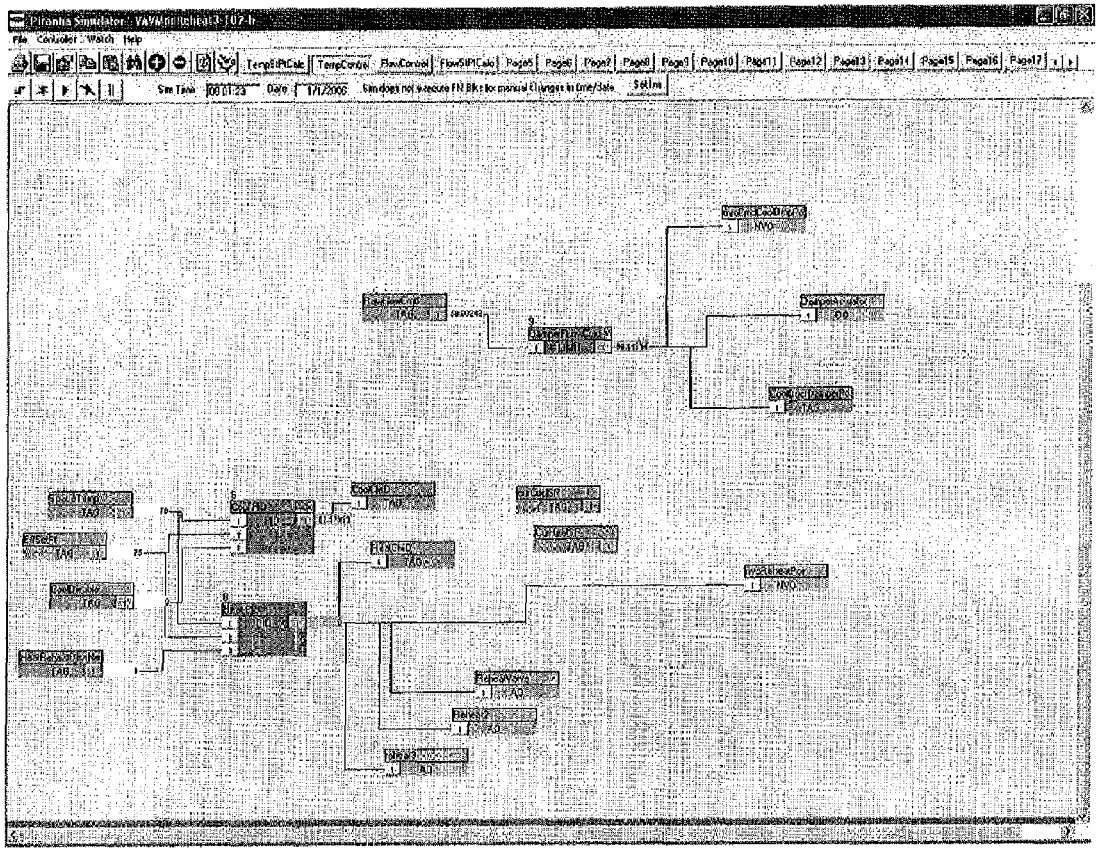

PID (Heat and Cool PID)

*PID (Proportional Integral Derivative)*

This function is a Proportional Integral Derivative controller (PID).
Err = Sensor – Set Point
Kp = 100/Proportional Band
Ti = Integral Time (seconds)
Td = Derivative Time (sec)
Bias = proportional offset (%)

$$\text{Output (\%)} = \text{bias} + Kp*\text{Err} + Kp/Ti \int_0^t (Err)dt + Kp*Td*d\text{Err}/dt$$

When Disable/Initialize input is TRUE, The Output and the integral are set to 0 and the block stops running. If Direct/Reverse is set to reverse, then Err term is set to –Err.
When Err < Dead band, Err is set to zero until Dead band Delay time has elapsed and Err is still in the dead band.
To prevent integral wind up, the integral portion of the total error output is limited to 100%.

From iteration to iteration, the Function Block keeps track of the old proportional error, integral error, and dead band timer. On power up/reset these are cleared.

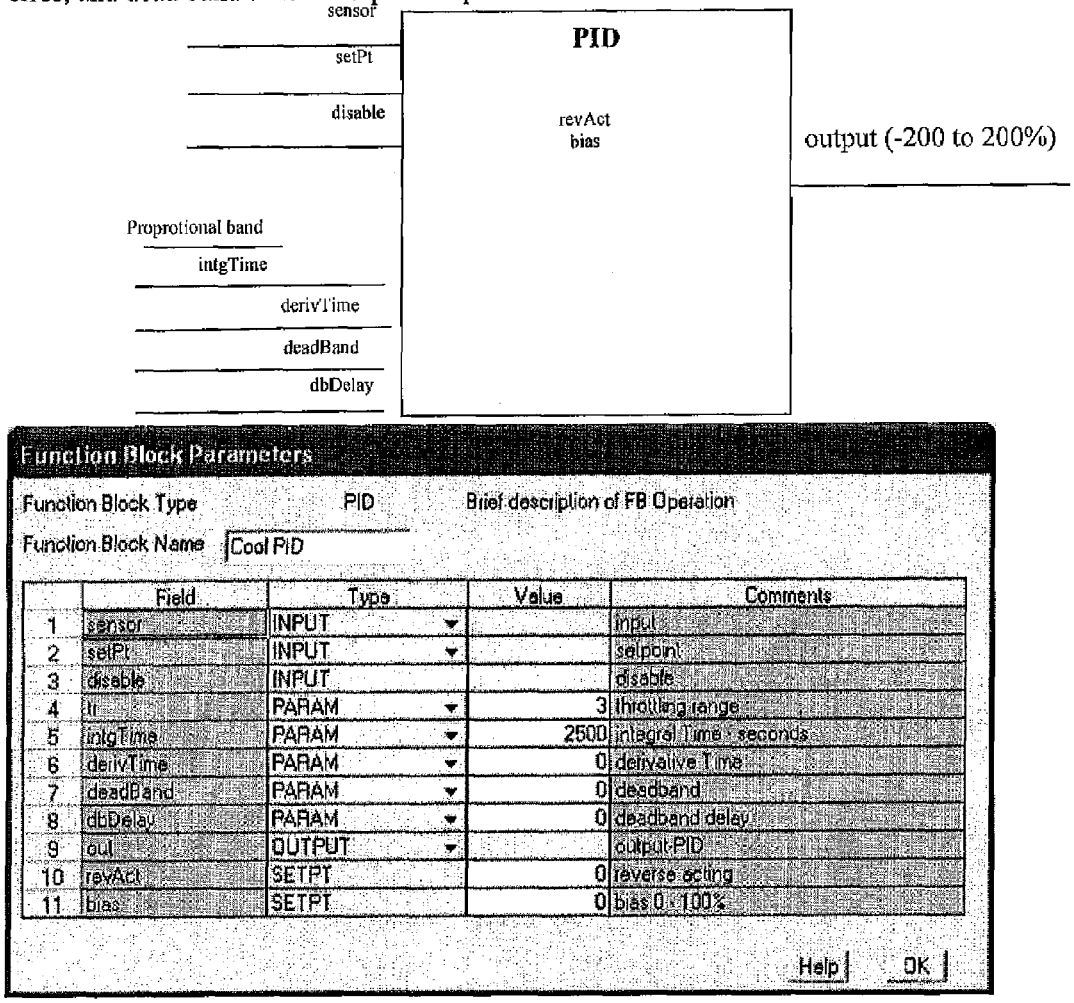

Output range -200 to +200 %

$$\text{Output (\%)} = \text{bias} + K_p * \text{Err} + K_p/T_i \int_0^t (Err)dt + K_p * T_d * dErr/dt$$

Configuration

1. The user specifies revAct: 0 = Direct acting, 1 = reverse acting.

| | | | |
|---|---|---|---|
| In1 | sensor | IN_PAR | input |
| In2 | setPt | IN_PAR | setpoint |
| In3 | disable | IN_ONLY | disable |
| Param1 | tr | PAR_IN | throttling range |
| Param2 | intgTime | PAR_IN | integral Time - seconds |
| Param3 | derivTime | PAR_IN | derivative Time |
| Param4 | deadBand | PAR_IN | deadband |

| | | | |
|---|---|---|---|
| Param5 | dbDelay | PAR_IN | deadband delay |
| Out1 | out | OUT_FLT | output-PID |
| paramByte1 | revAct | Ubyte | reverse acting |
| paramByte2 | bias | ubyte | bias 0 - 100% |

2. The user specifies the bias: 0 to 100%.

Explanation:
Cool PID takes input 1 cooling sensor value = 78, input 2 setpt = 76, and pid disable = false=0 and generates the industry accepted PID output in percent. The value is allowed to go over 100% to allow overdriving controls options. The Cooling signal output 1 is now 67%. Similarly, the Heating PID is disabled because the pid disable is true=1 and therefore the disabled pid output = 0.

Limit

This function limits the input to between the low and high limits.

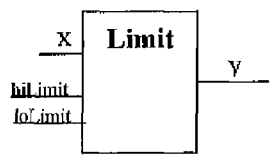

Output y = Limit (x, low limit, hi limit)

Configuration
1. None

| | | | |
|---|---|---|---|
| In1 | x | IN_PAR | input |
| Parm1 | hiLimit | IN_PAR | high Limit |
| Param2 | loLimit | IN_PAR | low Limit |
| Out1 | y | OUT_FLT | output-Limit |

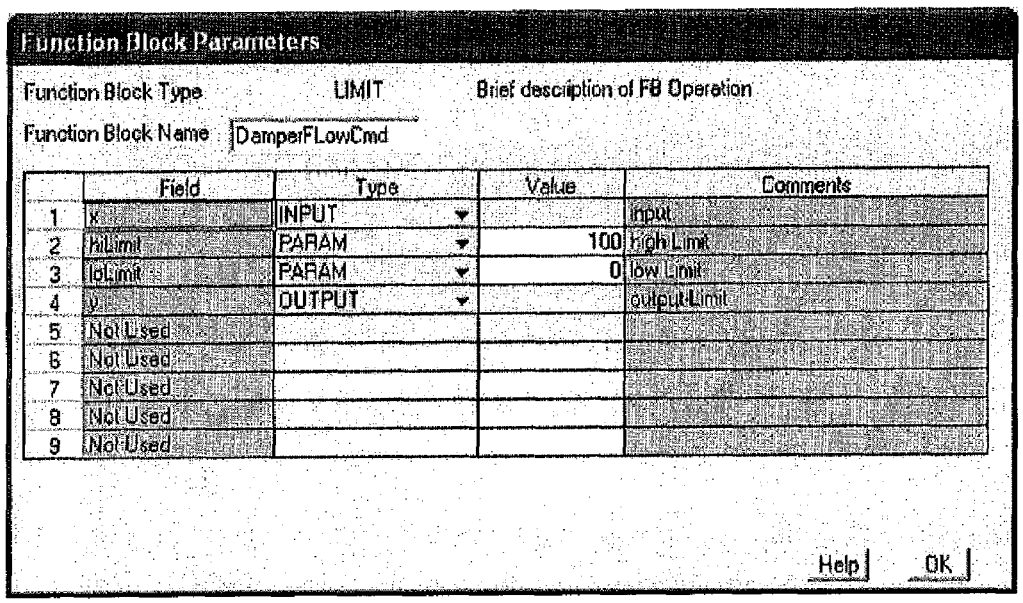
Explanation:
In this case, Hi limit=100 and low limit=0 are configured as parameters (a fixed value as opposed to an input with connectable input values). The Raw flow command is limited from 0 to 100% for display and commend purposes.
FlowControl P3

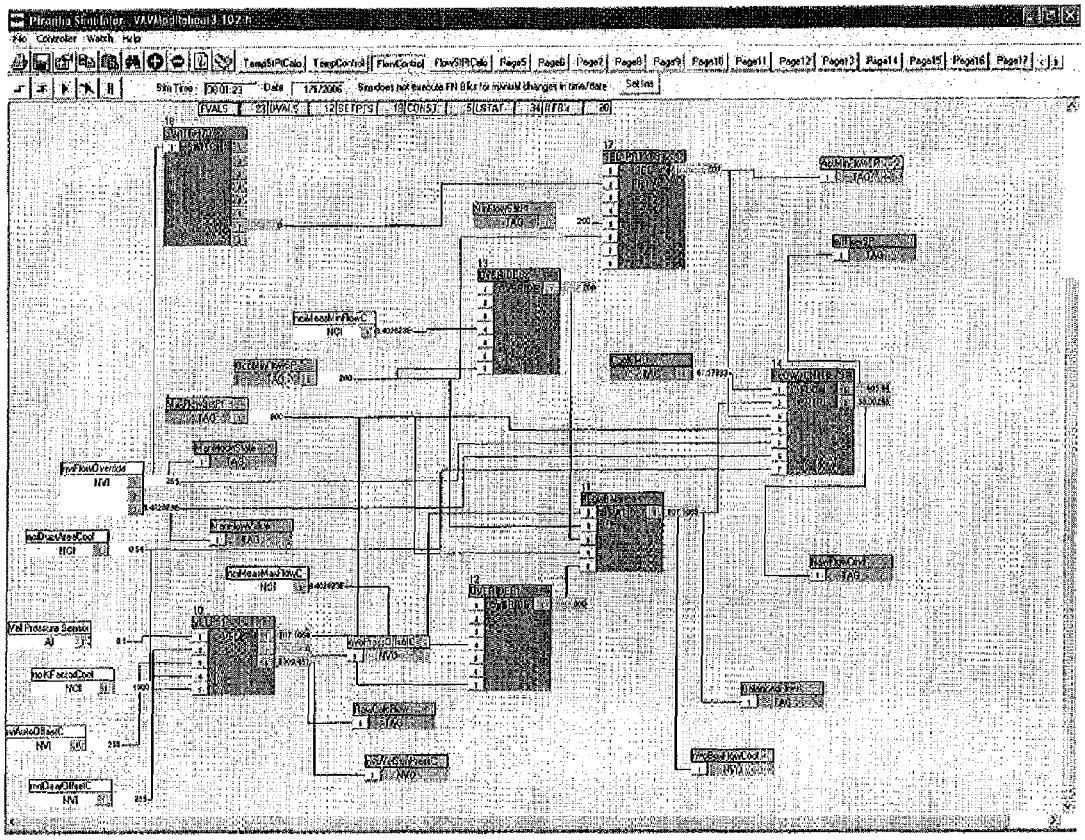

Switch-
explanation:
nviFlowOverride is defined as follows:

nviManOverride.state= hvac_overid_t ;
    enumerations are defined as follows: off=0, position=1,FlowValue=2,
    FlowPercent=3,Open=4,Close=5,minimum=6,maximum=7,nul=255.
nviManOverride.percent = percent value
nviManOverride.flow = flow value in liters/second
In this case if the balancing sets the nviFlowOverride.state to minimum=7, then output7 (which is the output #6 if the first output is ouput 0)of Switch70=1 or enable. Otherwise the output7=0 as is the case in this example.

![Edit Input Network Variable Configuration dialog]
SelPriority
Priority Select
This function allows 1 to 4 inputs in any combination to be individually enabled to override the default. The output is the input with its highest priority enable TRUE.
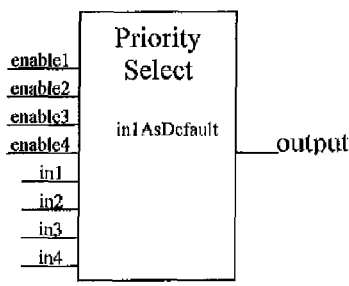
Configuration

1. The user specifies if input 1 should be used as the default (Yes/No). If none of the enable

| In1 | enable1 | IN_ONLY | enable 1 |
| In2 | enable2 | IN_ONLY | enable 2 |
| In3 | enable3 | IN_ONLY | enable 3 |
| In4 | enable4 | IN_ONLY | enable 4 |
| In5 | in1 | IN_PAR | input 1 |
| In6 | in2 | IN_PAR | input 2 |
| In7 | in3 | IN_PAR | input 3 |
| In8 | in4 | IN_PAR | input 4 |
| Out1 | out | OUT_FLT | output-Select priority |
| Param byte | In1AsDefault | byte | yes/no | inputs are true and input 1 is configured to be the default, then the output is set to input 1. If none of the enable inputs are true and input 1 is not the default, then the output is set to Invalid

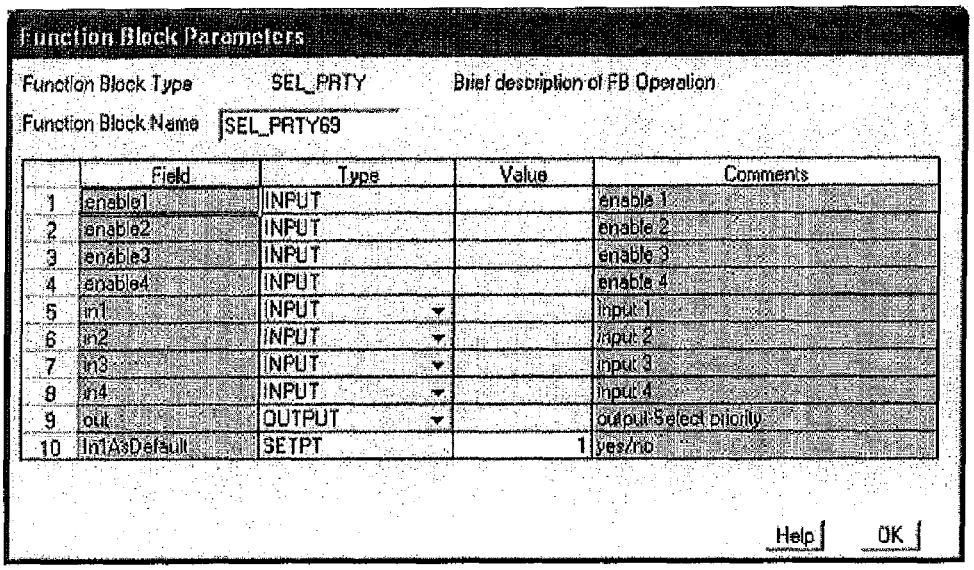

Explanation:

In this case input 2 from switch 70 is false so then we use the input1 value of MinFlowSP of 200. If in another case input 2 enable2 is true from switch 70 indicating minimum manual flow mode then the out would use input2 which is connected to OccMinFlowSP.

Override

| In1 | priority1val | IN_PAR | priority 1 value |
| In2 | priority2val | IN_PAR | priority 2 value |
| In3 | priority3val | IN_PAR | priority 3 value |
| In4 | priority4val | IN_PAR | priority 4 value |
| In5 | priority5val | IN_PAR | priority 5 value |

| | | | |
|---|---|---|---|
| In6 | priority6val | IN_PAR | priority 6 value |
| In7 | cntrlInput | IN_PAR | controller input |
| Paramter1 | defaultValue | PAR_IN | default value |
| Out1 | effOutput | OUT_FLT | output-Override |

Explanation:
In this Example input4 priority4 value is set to invalid (3.402823E+38) so the value used is the cntrlInput value of 800 cfm from the MaxFlowSetPt. Therefore output1 = effOutput = 800 cfm for the max flow setpoint. If nciMeasMaxFlowC is set to a value for balancing, that number will be used.

Velp

*Flow Velocity (from Pressure)*

This function computes the flow and velocity based on the measured pressure and the K factor.

$$flow = K\sqrt{\Delta P - offset}$$

and $$vel = \frac{flow}{Area}$$

Where:
K=Flow coefficient (K-Factor) representing the actual flow in ft^3/min corresponding to a velocity pressure sensor output of 1" w.g.
$\Delta P$=flow sensor output pressure in inches water gauge (inW).
Offset=a correction pressure (inW) to adjust for zero.
Flow=airflow in ft^3/min (CFM)
vel=flow velocity in ft/min
Area = duct area in ft^2.

K-Factor is often used in terminal unit controls to calculate actual airflow.

Setting the autoSetOffset to a non-zero number results in the current pressure being stored as an offset that will be subtracted from the current pressure. The Offset can be cleared by setting the clear offset to a non-zero number.

If the pressure is within 0.002425 inW of zero (approximately 50 fpm) then set the output flow and velocity to 0.

Consistent units must be used. For example, if p is 1.02 inches water column, and if the offset is .02 inches water column, K is 1015, and the area is 0.54 square feet (10 inch diameter), then the flow will be 1015 feet per minute, and velocity will be 1879 feet per minute.

From iteration to iteration, the Function Block keeps track of the last state of the auto set offset. On power up/reset this is set to TRUE so that auto offset cannot be executed on a reset or power up.

The following is a VELP function explanation. From iteration to iteration, the function block keeps track of the last state of the auto set offset. On power up/reset, this is set to TRUE so that the auto offset cannot be executed on a reset or power up.

```
if(press != FL_INVALID)
{
        if(autoSetOffset)
        {
                offset=press
                store offset
        }
        if (kfactor != FL_INVALID)
                {
                if(press - offset<0)   flow = sqrt(offset -press)*kfactor;
                else   flow = sqrt(press - offset)*kfactor;
                //if close to zero then set output = 0
                //value of pressure for 50 fpm calculation:
                //v=k*sqrt(p)
                //assume k=1015 and v = 50 fpm, then sqrt(p)=0.04926, and p=0.002425
                if (press<0.002425 & press > -0.002425) flow = 0.0;
                if (area = FL_INVALID || area <= 0.0)
                        vel = FL_INVALID;
                else
                        vel = flow/area;
                }
        else
                {
                vel = FL_INVALID;
                flow = FL_INVALID;
                }
        }
        else
        {
                vel = FL_INVALID;
                FLOW = FL_INVALID;
        }
//Check to see if the offset value should be cleared
        if (clearOffset)        offset=0.0;
//save last state of auto set offset
        lastSetOffset = autoSetOffset;
```

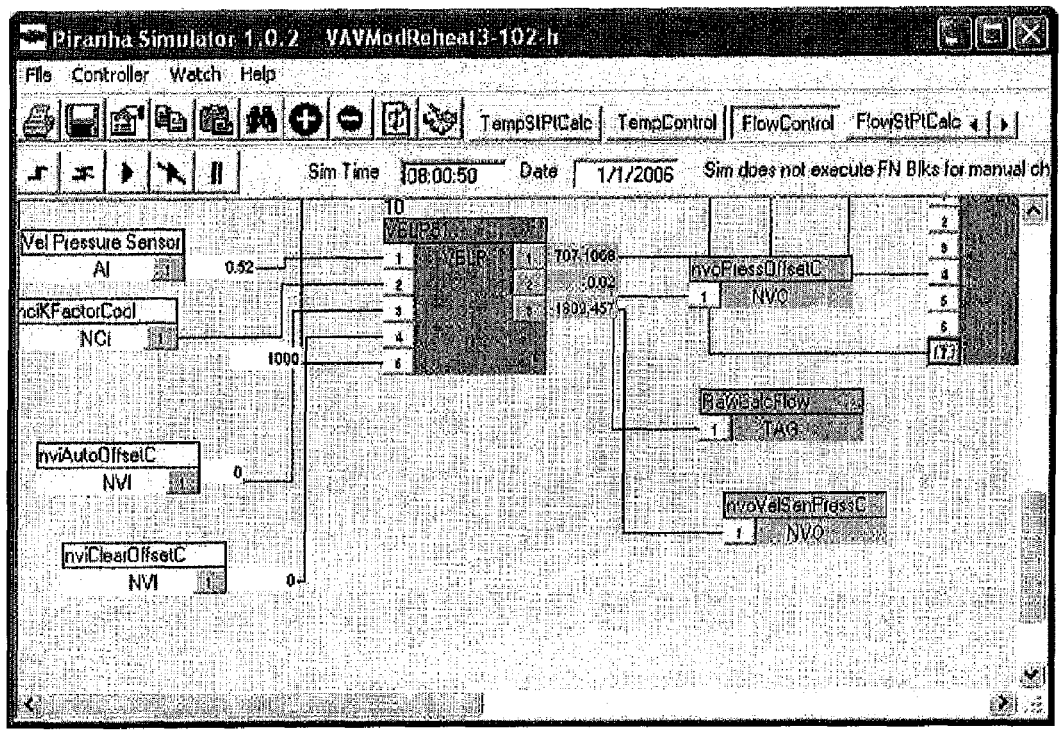

Explanation:
In this Example above, Vel Pressure sensor is 0.5 inw. Which is set to input1 press. Input 2 Kfactor is linked to nciKFactorCool which is set to 1000. Input3 is the nviAutoOffsetC which is set to 1 to set the zero offset that is stored in output 2. Since nviAutoOffsetC is set to 0, then no zero operation is being performed. nviClearOffsetC is set to 0 which clears the offset so the offset is stored as 0.02 in output 2. After the calculation of the pressure to flow equation, the output flow is 707.1068 cfm and the flow is 1309.457 feet per minute (FPM). The duct area is acquired from nciDuctAreaCool and is set to 0.54 square feet = 10 inch diameter round duct.

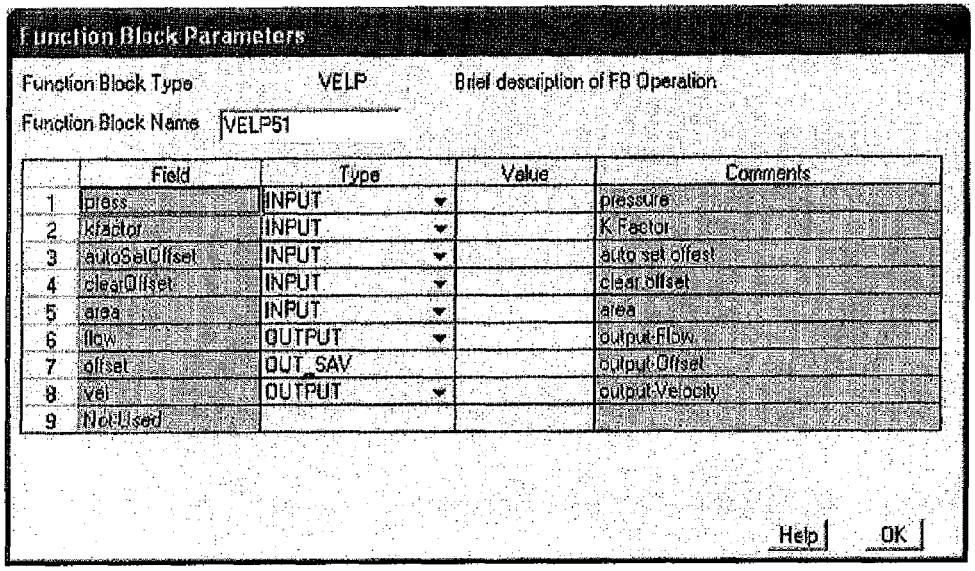

| In1 | press | IN_PAR | pressure |
| In2 | kfactor | PAR_IN | K Factor |
| In3 | autoSetOffset | IN_PAR | auto set offest |
| In4 | clearOffset | IN_PAR | clear offset |
| In5 | area | PAR_IN | area |
| Out1 | flow | OUT_FLT | output-Flow |
| Out2 | offset | OUT_FLT_SAV | output-Offset |
| Out3 | vel | OUT_FLT | output-Velocity |

Explanation:
In this Example above, Vel Pressure sensor is 0.5 inw. Which is set to input1 press. Input 2 Kfactor is linked to nciKFactorCool which is set to 1000. Input3 is the nviAutoOffsetC which is set to 1 to set the zero offset that is stored in output 2. Since nviAutoOffsetC is set to 0, then no zero operation is being performed. nviClearOffsetC is set to 0 which clears the offset so the offset is stored as 0.02 in output 2. After the calculation of the pressure to flow equation, the output flow is 707.1068 cfm and the flow is 1309.457 feet per minute (FPM). The duct area is acquired from nciDuctAreaCool and is set to 0.54 square feet = 10 inch diameter round duct.

*Ratio*

This function converts the input X to the output Y based on the line defined by x1, y1 and x2,y2.
Y =y1 + (((x - x1) * (y2 - y1)) / (x2 - x1)). If (x,x1,x2,y1, or y2 = INVALID) then y = invalid.
Operation enumerations are: UNLIMITED=0, VAV_FLOW_BAL=1,
ENDPT_LIMITED=2.
For VAV_FLOW_BAL to work correctly, (X2, Y2) must be greater than (X1, Y1), and both points must be in the first quadrant as shown in the figure below. If not, results will be as specified by the pseudo code.
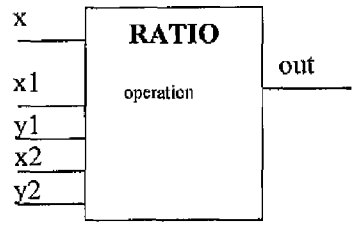
The operation selection determines how the output is computed:
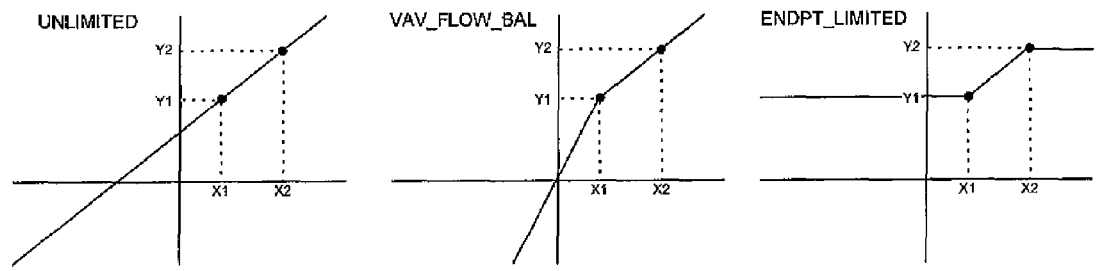
Configuration
1. The user specifies the Operation. UNLIMITED=0, VAV_FLOW_BAL=1, ENDPT_LIMITED=2.

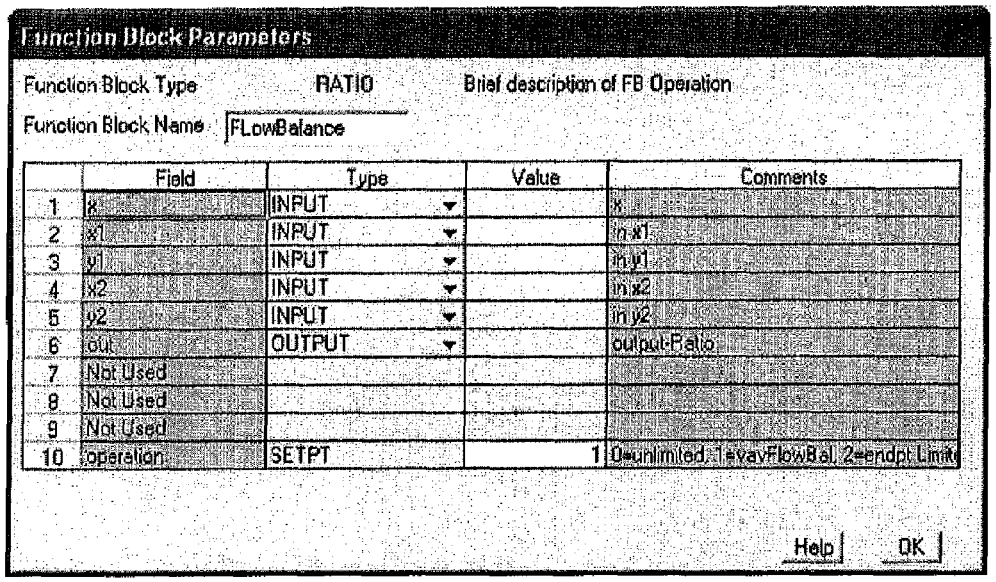

| | | | |
|---|---|---|---|
| In1 | x | IN_PAR | x |
| In2 | x1 | IN_PAR | in x1 |
| In3 | y1 | IN_PAR | In y1 |
| In4 | x2 | IN_PAR | in x2 |
| In5 | y2 | IN_PAR | in y2 |
| Out1 | out | OUT_FLT | output-Ratio |
| Param1 | operation | RatioOp | 0=unlimited, 1=vavFlowBal, 2=endpt Limited |

Explanation:
In this Example input 1 = x=707.1068 cfm from the velp which is the flow value in cfm, x1=OccMinFlowSp=200, y1=OccMinFlowMeasSP or nciMeaseMinFlowC if it is available from the override 62, y2 is the MaxFlowSetpt or nciMeasMaxFlowC if it is available from override 61. the output is calculated to be 707 cfm.

FlowStPtCalc Page 4

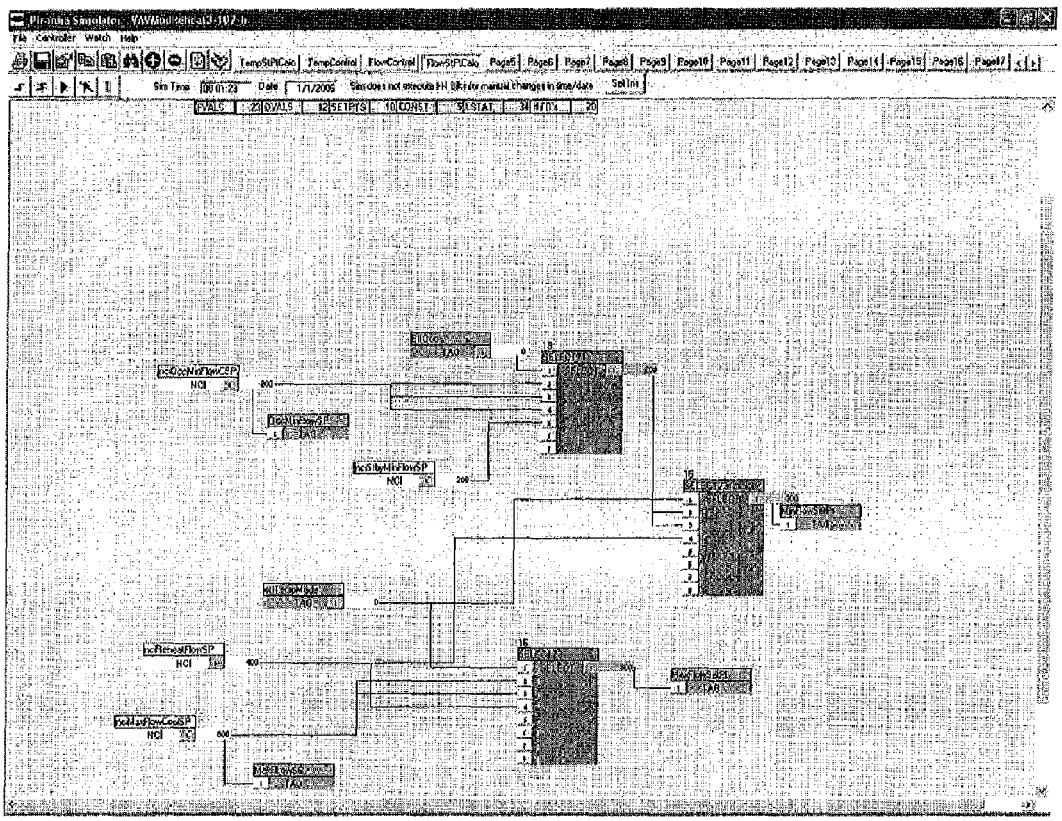

Select

Select

This function selects one of the 6 input values to be transferred to the output. The input selected depends on the values of x and the offset. The default input allows multiple Select function blocks to be tied together by chaining the output of one block to the default input of the next. When Select function blocks are chained, all chained blocks receive the same input, but different offsets, so they examine different ranges of the input value. When [x-offset] selects one of the 6 inputs, the output equals the value on input[x-offset]. Otherwise, the output equals the value on the default input. If nothing is connected, the output is invalid

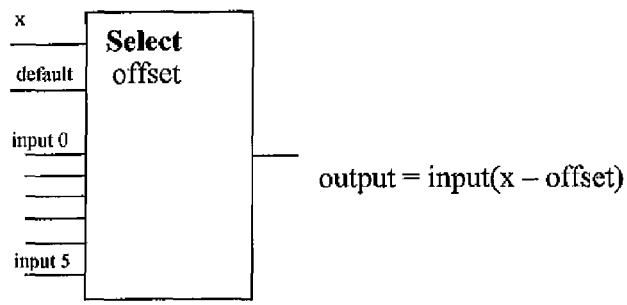
output = input(x − offset)
Configuration
1. The user specifies the offset from 0 to 255.
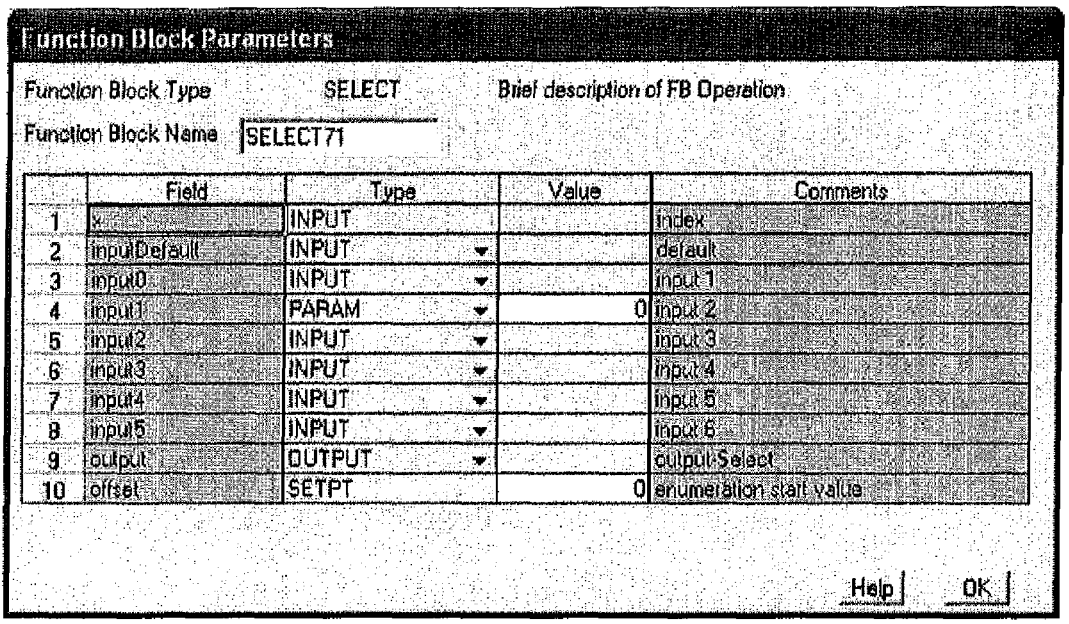
| Input1 | x | IN_ONLY | index |
| In2 | inputDefault | IN_PAR | default |
| In3 | input0 | IN_PAR | input 1 |
| Param1 | input1 | IN_PAR | input 2 |
| In4 | input2 | IN_PAR | input 3 |
| In5 | input3 | IN_PAR | input 4 |
| In6 | input4 | IN_PAR | input 5 |
| In7 | input5 | IN_PAR | input 6 |
| Out1 | output | OUT_FLT | output-Select |
| config | offset | ubyte | enumeration start value |

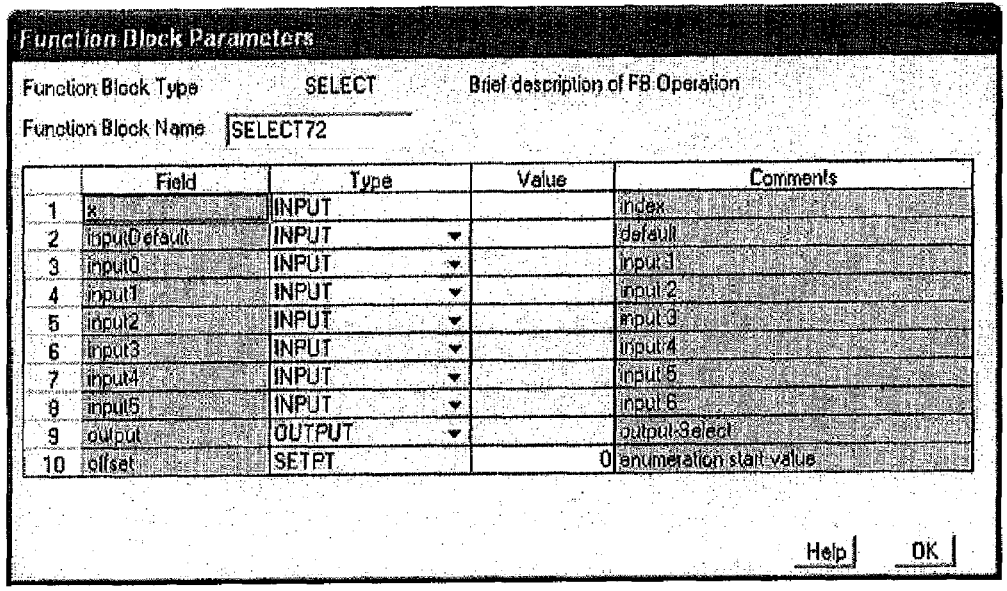

| | | | | |
|---|---|---|---|---|
| Input1 | x | IN_ONLY | index | Expl |
| In2 | inputDefault | IN_PAR | default | anati |
| In3 | input0 | IN_PAR | input 1 | on: |
| In4 | input1 | IN_PAR | input 2 | 5 |
| In5 | input2 | IN_PAR | Input 3 | Selec |
| In6 | input3 | IN_PAR | input 4 | t |
| In7 | input4 | IN_PAR | input 5 | picks |
| In8 | input5 | IN_PAR | input 6 | the |
| Out1 | output | OUT_FLT | output-Select | 10 corre |
| config | offset | ubyte | enumeration start value | ct | minFlowSetpoint or MaxFlow setpoint based on effective occ.

FlowControl

*Damper Flow Control*

This function is a Variable Air Volume (VAV) Damper Flow Controller. Traditionally this is the second half of a pressure independent VAV box cascade control strategy where typically the input would come from the output of a PID block controlling space temperature.

This function calculates an effective flow control set point (effFlowSetPt) and outputs a 0-100% command to drive a VAV box damper. The commanded flow set point (in percent) from a temperature control signal is mapped into the effective flow set point such that 0% maps to the min flow set point and 100% maps to the max flow set point. The sensedFlowVol input is the volumetric flow into the box, if it is invalid (sensor fails) the damper will be driven in a "pressure dependant" mode where the output = 100%*(minSP/maxSP)+ (1-minSP/maxSP)*cmdPercent. If either flow MinSP, MaxSP is invalid, the output = 20% + .8*cmdPercent.

The Units parameter sets the units being used for the flow sensor, set points, and duct area where $0 = cfm(flow)$ and $ft^2$ (area), $1 = L/s(flow)$ and $m^2$(area), $2 = m^3/hr(flow)$ and $m^2$(area). The cmdFlowPercent input is the input in percent from the temperature control logic. DuctArea is the duct area in units per the Units parameter selection. DuctArea is required for the control algorithm. The control loop is implemented in air velocity in order to simplify loop tuning. The motorSpeed parameter is the time the actuator being used takes to travel a full 90 deg stroke in seconds (this is used to automatically adjust the control gains). The manFlowOverride input allows the flow set point to be selectively overridden based the following codes: (taken from snvt_hvac_overid)

0 and all others not listed = no override (normal operation)
    2 = effFlowSetPt is set to the ManFlowValue input
    6 = effFlowSetPt is set to the minFlowSetPt input
    7 = effFlowSetPt is set to the maxFlowSetPt input Manual flow override is particularly useful when trying to make the box easy to be balanced.

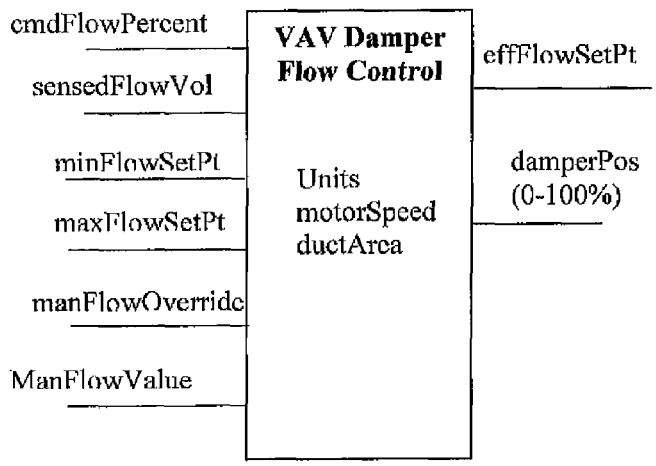

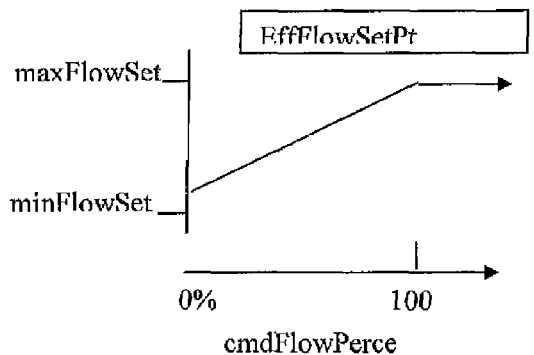

Configuration
1. The user specifies the units from 0 to 2. 0 = flow (cfm), area(ft2); 1 = flow (Lps), area (m2); 2 = flow (cmh), area (m**2). Default is zero (0).
2. The user specifies the motor speed from 1 to 255 seconds per 90 degrees. Default is 90.

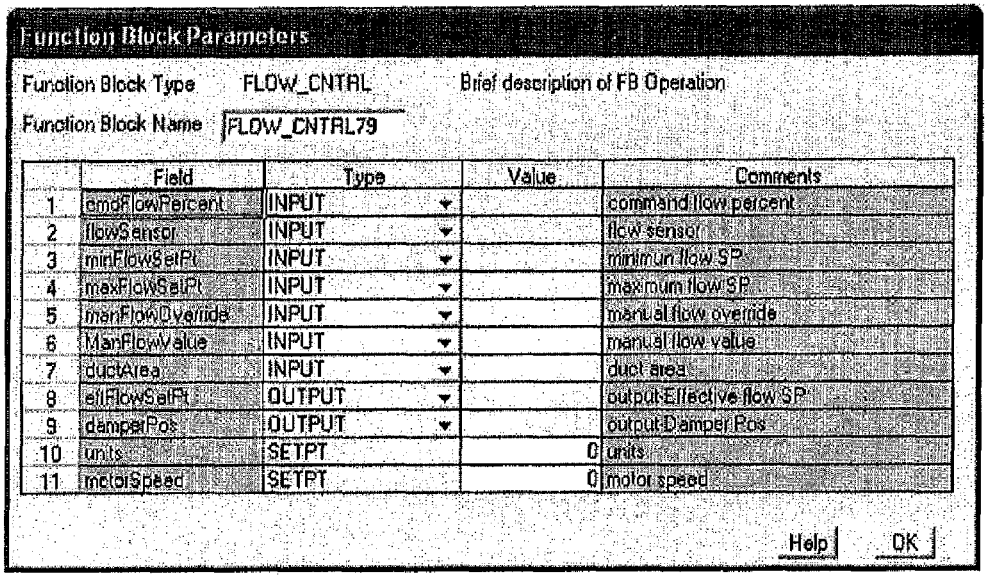

| In1 | cmdFlowPercent | IN_PAR | command flow percent |
| In2 | flowSensor | IN_PAR | flow sensor |
| In3 | minFlowSetPt | IN_PAR | minimun flow SP |
| In4 | maxFlowSetPt | IN_PAR | maximum flow SP |
| In5 | manFlowOverride | IN_PAR | manual flow override |
| In6 | ManFlowValue | IN_PAR | manual flow value |
| In7 | ductArea | PAR_IN | duct area |
| Out1 | effFlowSetPt | OUT_FLT | output-Effective flow SP |
| Out2 | damperPos | OUT_FLT | output-Damper Pos |
| Parambyte1 | units | Ubyte | units |
| Parambyte2 | motorSpeed | ubyte | motor speed |

Explanation:
Flow control controls a damper position based on a flow sensor input and a setpoint bounded by min and max flow and other parameters.

Example Analog Function Blocks-

Minimum

This function calculates the minimum of 8 inputs. The output is set to the smallest input.

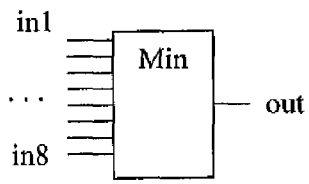

Maximum

This function calculates the maximum of 8 inputs. The output is set to the largest input.

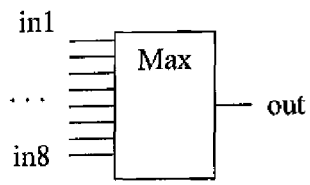

Average

This function calculates the average of 8 inputs. The output is set to the average of the inputs.

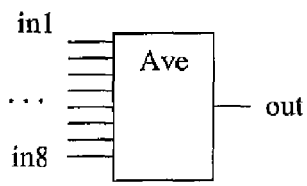

Compare

This function compares two inputs to each other. Input1 is compared to input2 as EQUAL, LESS_THAN or GREATER_THAN. There is an optional on and off hysteresis. Note it is possible to create invalid numbers by combining large values of input 2 and on and off hysteresis. The behavior is dependant on the operation selected, value of input 1, and the compiler.

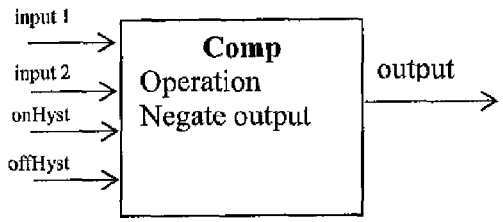

Compare Less Than
Output is set TRUE if input1 < input2 - onHyst.
Output is set FALSE if input1 >= input2 + offHyst.
Output does not change if (input2 – onHyst) <= input1 < (input2 +offHyst)

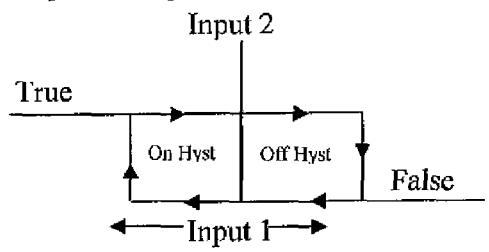

Compare Greater Than
Output is set TRUE if input1 > input2 + onHyst.
Output is set FALSE if input1 <= input2 - offHyst.
Output does not change if input1 <= input2 + onHyst && input1 > input2 - offHyst.

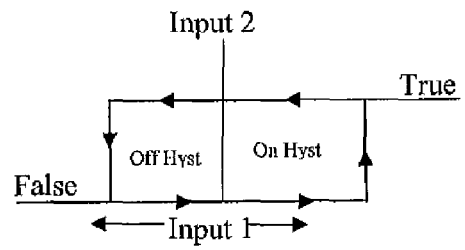

Compare Equal To
The output is set TRUE if: ( (in1 <= in2+OffHyst) && (in1 >= in2-OnHyst) )

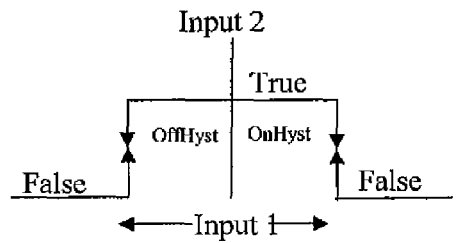

Regardless of the compare function type, there is an optional negate of the output. When negout is TRUE, the output is negated after performing the logic as specified above. The sense of the hysteresis settings does not change. When negation is selected, the old output (from the previous cycle) is determined by negating the current value of the output.

Analog Latch

This function latches the Y output to the value on the X input when the latch input transitions from FALSE to TRUE. The output is held at this value until the next FALSE to TRUE transition. At each FALSE to TRUE transition the Y output is latched to the current X input. If both the X and latch inputs are unconnected, the output Y will be zero (0). If the input is invalid, the output will transition to invalid when the latch input goes from FALSE to TRUE. The latch input can be negated to cause a TRUE to FALSE transition to latch X to Y. From iteration to iteration of the Function Block, the Analog Latch keeps track of the last state of the latch input so that it knows when a FALSE to TRUE transition occurs. On power up/reset the last latch value is set to FALSE, regardless of the negation configuration.

Priority Select

This function allows 1 to 4 inputs in any combination to be individually enabled to override the default. The output is the input with its highest priority enable TRUE. If no enables are TRUE, the output is set to the default.

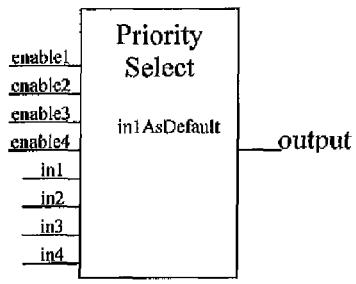

Hysteretic Relay

This function takes analog input in and sets the output TRUE at OnVal and FALSE at OffVal while honoring min on and off times. From iteration to iteration, the Function Block keeps track of the current minimum on or off time. On power up/reset this timer is cleared.

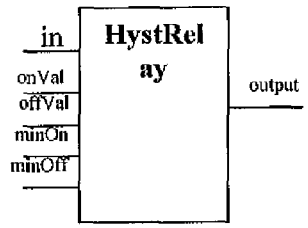

Switch

This function takes an enumerated type input and subtracts a user defined offset to determine which output to set TRUE, holding all others FALSE. The valid range of the input minus the offset is 0-7. The output [0-7] is TRUE if input − offset = X, otherwise it is FALSE.

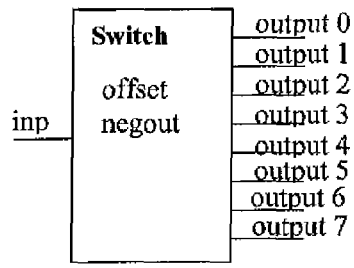

Select

This function selects one of the 6 input values to be transferred to the output. The input selected depends on the values of x and the offset. The default input allows multiple Select function blocks to be tied together by chaining the output of one block to the default input of the next. When Select function blocks are chained, all chained blocks receive the same input, but different offsets, so they examine different ranges of the input value. When [x-offset] selects one of the 6 inputs, the output equals the value on input[x-offset]. Otherwise, the output equals the value on the default input. If nothing is connected, the output is invalid

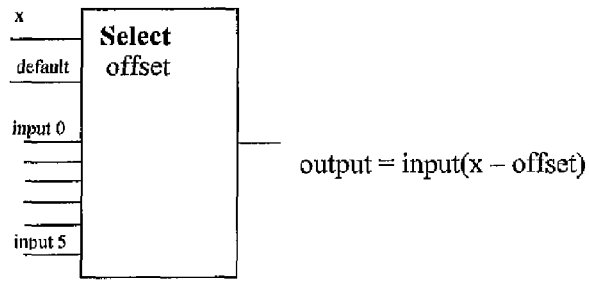

output = input(x − offset)

Example Logic Function Blocks

AND/NAND

This function is a 6 input AND or NAND. Each input may be individually inverted (NOT). Unconnected or invalid inputs default to TRUE, without negation, so as to have no effect on the result. From iteration to iteration, the Function Block keeps track of the last computed output value and the current true or false delay time. On power up/reset these are cleared.

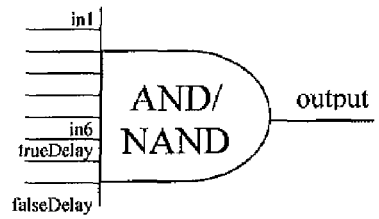

OR/NOR

This function is a 6 input OR or NOR. Each input may be individually inverted (NOT)). Unconnected or invalid inputs default to FALSE, without negation, so as to have no effect on the result. From iteration to iteration, the Function Block keeps track of the last computed output value and the current true or false delay time. On power up/reset these are cleared.

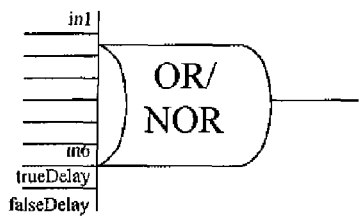

Exclusive OR/NOR

This function is a 6 input XOR or XNOR. Each input may be individually inverted (NOT). Unconnected or invalid inputs default to FALSE, without negation, so as to have no effect on the result. From iteration to iteration, the Function Block keeps track of the last computed output value and the current true or false delay time. On power up/reset these are cleared.

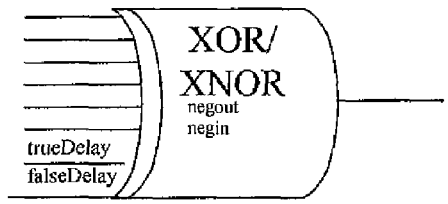

One Shot

This function is a one shot. When x transitions from FALSE to TRUE, y will be set to TRUE (1) for OnTime seconds. OnTime is limited to 0-65535 seconds. An OnTime of zero will keep the output OFF no matter what changes occur at the X input. Both the X input and Y output have an option to be negated. From iteration to iteration, the Function Block keeps track of the last input and the on time. On power up/reset these are cleared.

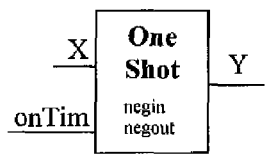

Example Math Function Blocks

Math functions operate on and produce single precision floating point numbers. In the absence of any other restrictions, if the result overflows the range of a single precision floating point number (approx -3.4e38 to 3.4e38) the result returned is invalid.

Add

This function adds the values on inputs. If the result overflows the range of a single precision floating point number (approx -3.4e38 to 3.4e38) the result returned is invalid.

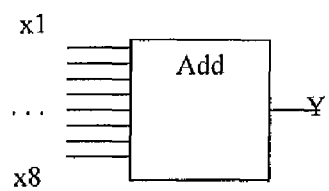

Subtract

This function subtracts one input from the other. Y = x1 − x2. If the result overflows the range of a single precision floating point number (approx -3.4e38 to 3.4e38) the result returned is invalid.

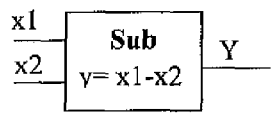

Multiply

This function multiplies one input with the other. y = x1 * x2. If the result overflows the range of a single precision floating point number (approx -3.4e38 to 3.4e38) the result returned is invalid.

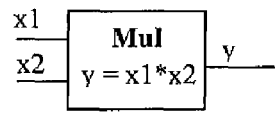

Divide

This function divides one input by the other. Y = x1 / X2. Division by 0 result in invalid output. If the result overflows the range of a single precision floating point number (approx -3.4e38 to 3.4e38) the result returned is invalid

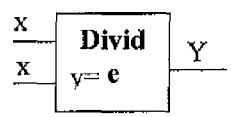

Square Root

This function takes the square root of the input. Y = √X. The behavior of a negative X input is controlled by the parameter negInvalid.

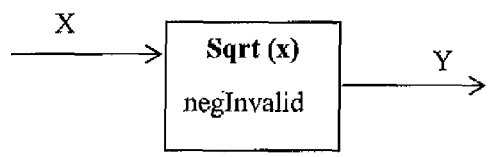

Exponential (a.k.a. Power)

This function raises y to the power of x. x and y are floating point numbers. The application designer is limited to two of these function blocks per device. Unassigned inputs are treated as 0. Invalid inputs result in an invalid output. The negInvalid input determines whether the operation should proceed with a negative base and non-integer exponent, operating on the absolute value of the base, or return invalid.

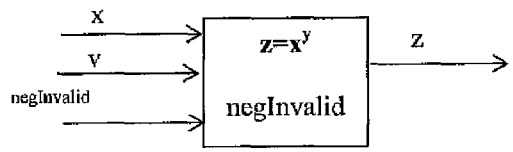

Digital Filter

This function digitally filters the input. $Y_{new} = Y_{old} + (X - Y_{old})*(1-\exp(-t/Tau))$. Where t = 1 sec and Tau is in seconds. The output can be initialized to zero (zeroInit=TRUE) or the first valid input value (zeroInit=FALSE). From iteration to iteration, the Function Block keeps track of the tau multiplier (1-exp(-t/Tau). On power up/reset this is recalculated.

Enthalpy

This function computes the enthalpy (BTU/LB) based on the temperature (°F) and relative humidity (%). inputs. Relative humidity (rh) is limited to 0 to 100%. Temperature is in °F and is limited to 0-120°F.

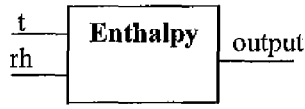

Ratio

This function converts the input X to the output Y based on the line defined by x1, y1 and x2, y2.
Y = y1 + (((x - x1) * (y2 - y1)) / (x2 - x1)). If (x,x1,x2,y1, or y2 = INVALID) then y = invalid.
Operation enumerations are: UNLIMITED=0, VAV_FLOW_BAL=1,
ENDPT_LIMITED=2.

For VAV_FLOW_BAL to work correctly, (X2, Y2) must be greater than (X1, Y1), and both points must be in the first quadrant as shown in the figure below. If not, results will be as specified by the pseudo code.

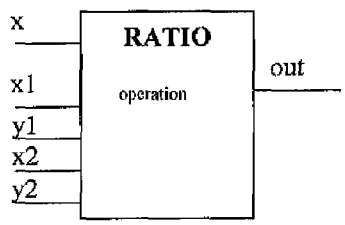

The operation selection determines how the output is computed:

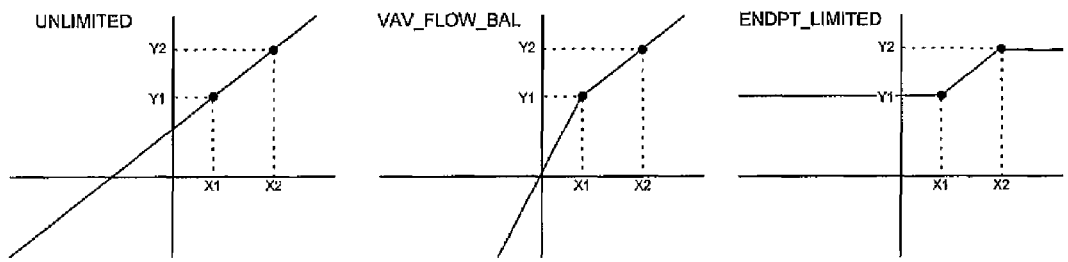

Limit

This function limits the input to between the low and high limits.

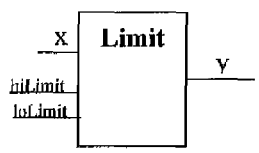

Reset

This function computes the reset value based on the relation of the input to the reset parameters.

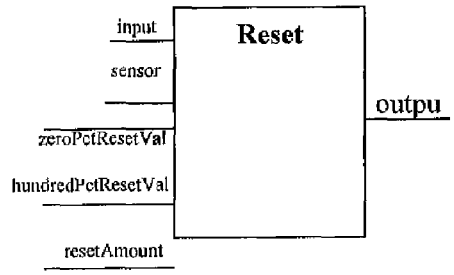

```
// reset sensor value between the zeroPctResetVal and the hundredPctResetVal
//
// restAmt __|          _____Max
//           |        /
//           |       /
//           |      /
//           |     /
//           |    /
//           |   /
//           |  /
// 0 reset __|/_____> sensor
//           |      |
//    zeroPctResetVal  hundredPctResetVal
```

Flow Velocity (from Pressure)

This function computes the flow and velocity based on the measured pressure and the K factor.

$$flow = K\sqrt{\Delta P - offset}$$

and $$vel = \frac{flow}{Area}$$

Where:

K=Flow coefficient (K-Factor) representing the actual flow in ft^3/min corresponding to a velocity pressure sensor output of 1" w.g.
$\Delta P$=flow sensor output pressure in inches water gauge (inW).
Offset=a correction pressure (inW) to adjust for zero.
Flow=airflow in ft^3/min (CFM)
vel=flow velocity in ft/min
Area = duct area in ft^2.

K-Factor is often used in terminal unit controls to calculate actual airflow.

Setting the autoSetOffset to a non-zero number results in the current pressure being stored as an offset that will be subtracted from the current pressure. The Offset can be cleared by setting the clear offset to a non-zero number. If the pressure is within 0.002425 inW of zero (approximately 50 fpm) then set the output flow and velocity to 0.

Consistent units should be used. For example, if p is 1.02 inches water column, and if the offset is .02 inches water column, K is 1015, and the area is 0.54 square feet (10 inch diameter), then the flow will be 1015 feet per minute, and velocity will be 1879 feet per minute.

From iteration to iteration, the Function Block keeps track of the last state of the auto set offset. On power up/reset this is set to TRUE so that auto offset cannot be executed on a reset or power up.

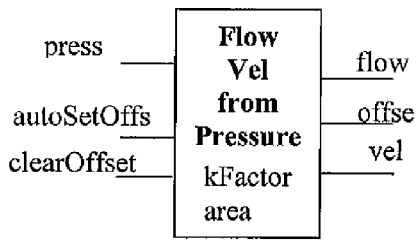

Example Control Function Blocks

All Control function blocks may have a default initialization behavior that will occur during power up. PID and others have an initialization input so that they can initialize under function block control.

*PID (Proportional Integral Derivative)*

This function is a Proportional Integral Derivative controller (PID).
Err = Sensor – Set Point
Kp = (Proportional Band)/100
Ti = Integral Time (seconds)
Td = Derivative Time (sec)
Bias = proportional offset (%)

$$\text{Output (\%)} = \text{bias} + K_p*\text{Err} + K_p/T_i \int_0^t (Err)dt + K_p*T_d*dErr/dt$$

When Disable/Initialize input is TRUE, The Output and the integral are set to 0 and the block stops running. If Direct/Reverse is set to reverse, then Err term is set to –Err.
When Err < Dead band, Err is set to zero until Dead band Delay time has elapsed and Err is still in the dead band. To prevent integral wind up, the integral portion of the total error output is limited to 100%.

From iteration to iteration, the Function Block keeps track of the old proportional error, integral error, and dead band timer. On power up/reset these are cleared.

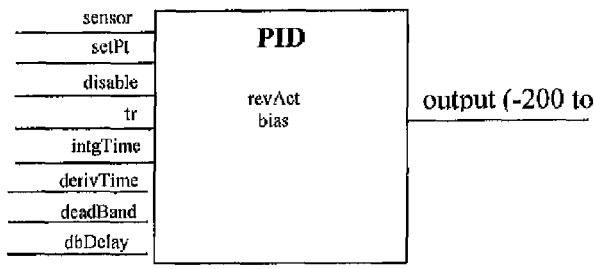

AIA (Adaptive Integral Action)

This function is an Adaptive Integral Action controller (AIA). In some cases, this can be used in place of PID. This control works better than PID when delays in the process being controlled cause integral wind-up resulting in under or overshoot that leads to instability. Err = Sensor − Set Point. If Direct/Reverse is set to reverse, then Err term is set to −Err. Tr(throttling range) is Error value that results in an Output change of the maximum value (MaxAOchange) from one step to the next. MaxAOchange is the maximum amount (%) that Output will change for a single cycle of the control (1 sec). This is typically set to 100%/ (actuator speed(sec/full stroke)). Deadband is the absolute value that Error must be greater than before the output will change.

EffErr = Err − dead band
If Err > 0 , ErrSign = 1 else ErrSign = -1
If |Err| < dead band, then AbsErr = 0.
Otherwise( |Err| > dead band), AbsErr = |Err| - deadband
Output = output + ErrSign*NonLin(AbsErr,ThrottlingRange,MaxAOchange,MinAOchange) .

From iteration to iteration, the Function Block keeps track of the old proportional error. On power up/reset this is cleared.

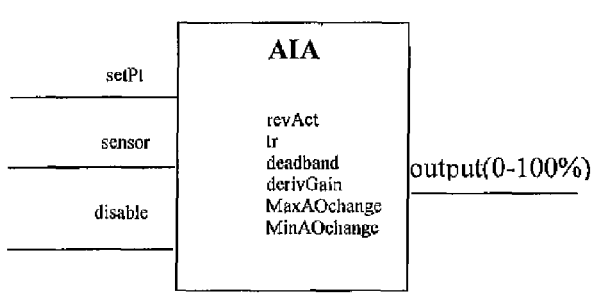

Stager/Thermostat Cycler

This function is a generic stage driver or a Thermostat Stage Cycler dependant on the value of the CPH parameter (cph=0 means stager functionality, and cph=1-60 gives thermostat cycler functionality).

The Cycler function is the traditional anticipator cycling algorithm used in Honeywell thermostats. Input is ether P or PI space temperature error in % (0-100). Standard (recommended) settings are cph=3 for cooling, cph = 6 for heating, anticAuth = 100%, hyst = 100%/maxstages/2. Also note that for multiple stage cyclers, the PID block feeding this function block should have an appropriately large throttling range to achieve smooth behavior.

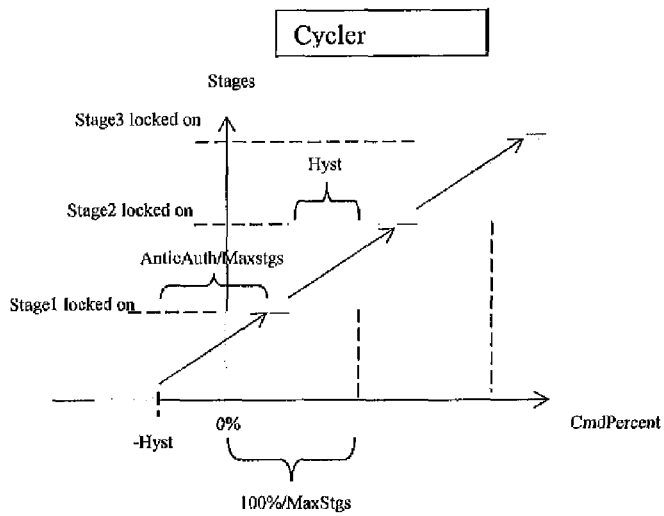

The Stager Function takes a 0-100% (typically PID error) input and determines how many stages to turn on. The 0-100% input range is divided evenly between how many stages are configured in MaxStages. The first stage is turned on at CmdPercent > 0 and off at CmdPercent < - Hyst. As shown in fig 18.1 below the general criterion for turning on stage N is:

CmdPercent > (N -1)*100%/MaxStages.
For turning off stage N the criterion is:
CmdPercent < (N -1)*100%/MaxStages – Hyst.

From iteration to iteration, the Function Block keeps track of the on timer, off timer, anticipator, and CPH multiplier. On power up/reset, the off timer and anticipator are cleared, the on timer is set equal to the inter-stage on time and the CPH multiplier is recalculated.

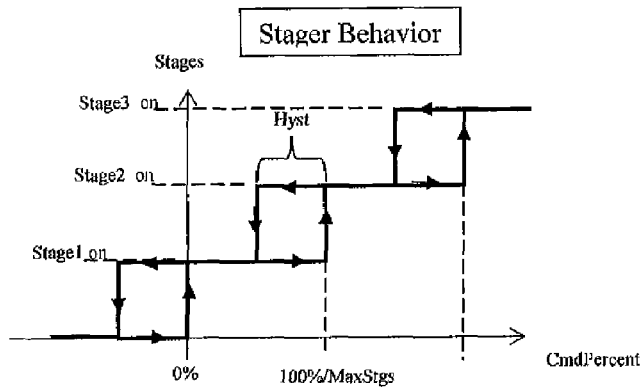

When override is true, active stages are shed (turned off) based on min on and interstage timers regardless of the CmdPercent input. Output is number of stages active (0-MaxStages) which can be sent to the StageDriver function block. Configuration parameters include:
- MaxStages is the maximum stages available to turn on.
- CPH (non-zero) is max cycle rate in Cycles Per Hour when input is halfway between stages available and AnticAuth is at default value (100%). CPH = 0 means the Stager logic is performed and has no other effect.
- Hyst is the switching differential around the switch points in % error. (Range: 0 < Hyst < 100/Maxstgs.)
- AnticAuth (cycler only (CPH != 0)) is the anticipator authority, which allows adjustment of the cycling behavior. It represents the max amount of "fake" error in % that is input into the switching logic when MaxStages are turned on. (Range 0 < AnticAuth < 200.)
- MinOnTime is minimum time a stage must be on once it is turned on.
- MinOffTime is minimum time a stage must be off once it is turned off.
- InterstageOn is minimum time before the next stage can be turned on after the previous one is turned on.
- InterstageOff is minimum time before the next stage can be turned off after the previous one is turned off.

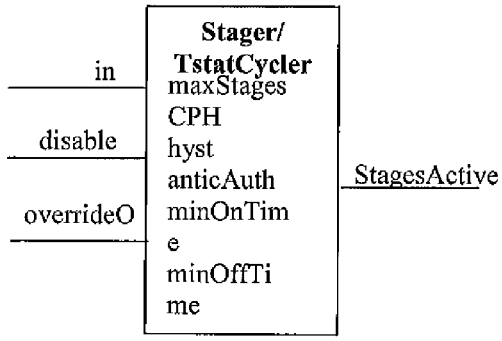

StageDriver

The StageDriverMaster function takes input number of stages active and determines which stages to energize or de-energize based on the lead/lag strategy chosen. StageDriver works with StageDriverAdd to distribute additional stages above those provided in StageDriver. StageDriver also maintains a nonvolatile runtime total and digital stage status information for each stage.

Stage Driver Add

The StageDriverAdd function takes input command from StageDriver and determines which stages to energize or de-energize based on the lead/lag strategy chosen. StageDriverAdd works with StageDriver to distribute stages. For example if StageDriver controls stage 1-6, then the first connection to StageDriverAdd could be configured to handle stages 7-14 and the second StageDriverAdd could be configured to handle stages 15-22.

Rate Limit

This function creates an output that follows the input but prevents the output from changing faster that the specified rates depending on direction.

The value StartInterval (sec) limits the output after the rate limit function is enabled (disable input set to 0) and the StartInteval time is still in process. Ratelimit uses the startVal input as the default output during disable.

If the rate limit function is disabled (disable input set to 1) the output will be set to StartVal.

After rateLimit is enabled (disable set to 0) then the StartInterval timer will count down from the StartInterval number of seconds and during this time the output will be rate limited..

When the timer is expired (and ratelimit is enabled) the out value will be exactly what the in is set to and there will no longer be rate limiting.

If the StartInterval seconds is set to 0 (and ratelimit is enabled), then the output will be Ratelimited.

During Ratelimit the output will move at a maximum allowed rate toward the new input value each second.

UpRate controls the rate in a more positive direction, and DownRate controls the rate in a more negative direction. UpRate set to zero means the uprate limit is not enforced. DownRate set to zero means the downrate limit is not enforced..

Out is set to StartVal before rate limiting is enabled (disable set to 0).

From iteration to iteration, the Function Block keeps track of the start timer On power/up/reset, this is set to the StartInterval.

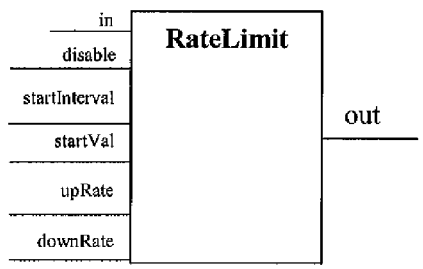

*VAV Damper Flow Control*

This function is a Variable Air Volume (VAV) Damper Flow Controller. Traditionally this is the second half of a pressure independent VAV box cascade control strategy where typically the input would come from the output of a PID block controlling space temperature. This function calculates an effective flow control set point (effFlowSetPt) and outputs a 0-100% command to drive a VAV box damper. The commanded flow set point (in percent) from a temperature control signal is mapped into the effective flow set point such that 0% maps to the min flow set point and 100%% maps to the max flow set point. The sensedFlowVol input is the volumetric flow into the box, if it is invalid (sensor fails) the damper will be driven in a "pressure dependant" mode mapping cmdFlowPercent directly to the output. The Units parameter sets the units being used for the flow sensor, set points, and duct area where 0 = cfm(flow) and $ft^2$ (area), 1 = L/s(flow) and $m^2$(area), 2 = $m^3$/hr(flow) and $m^2$(area). The cmdFlowPercent input is the input in percent from the temperature control logic. DuctArea is the duct area in units per the Units parameter selection. The motorSpeed parameter is the time the actuator being used takes to travel a full 90 deg stroke in seconds (this is used to automatically adjust the control gains). The manFlowOverride input allows the flow set point to be selectively overridden based the following codes: (taken from snvt_hvac_overid)

0 and all others not listed = no override (normal operation)
    2 = effFlowSetPt is set to the ManFlowValue input
    6 = effFlowSetPt is set to the minFlowSetPt input
    7 = effFlowSetPt is set to the maxFlowSetPt input Manual flow override is particularly useful when trying to make the box easy to be balanced.
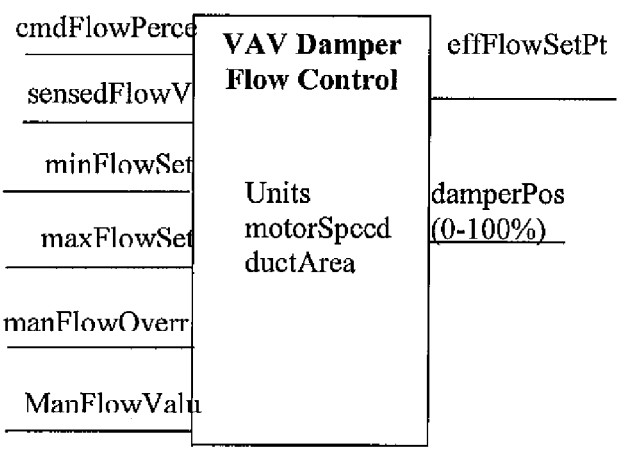
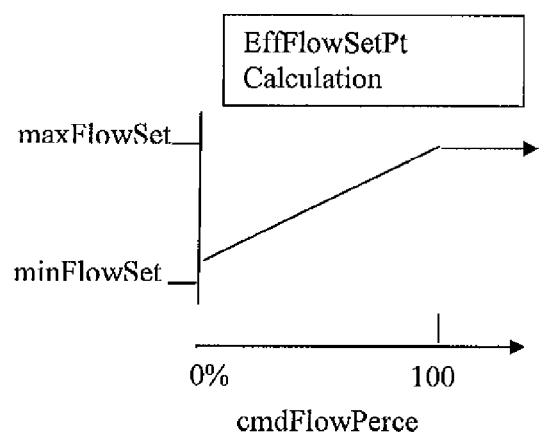

Example Zone Control Function Blocks

Occupancy Arbitrator

This function computes the current Effective Occupancy Current State and the Manual Override State.

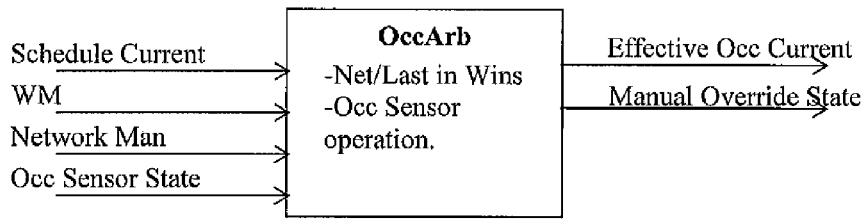

General Setpoint Calculator

This function does generic setpoint calculation, including reset. It uses the 3 configuration parameters, effective occupancy, current state, and reset input to calculate the effective setpoint.

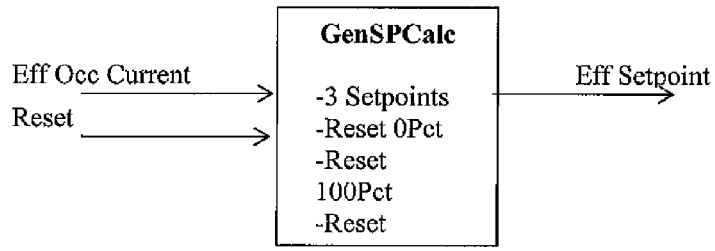

Temperature Setpoint Calculator

This function calculates the current Effective Heat setpoint and Effective Cool setpoint based on the current schedule information, occupancy override, and intelligent recovery information.

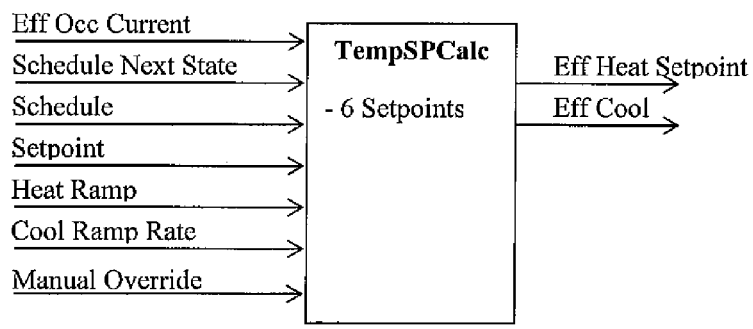

Set Temperature Mode

This function automatically calculates the effective temperature control mode based on the control type, system switch setting, network mode command, temperature set points, supply temperature and space temperature. From iteration to iteration, the Function Block keeps track of the previous application mode and the effective temperature mode. On power up/reset these are cleared.

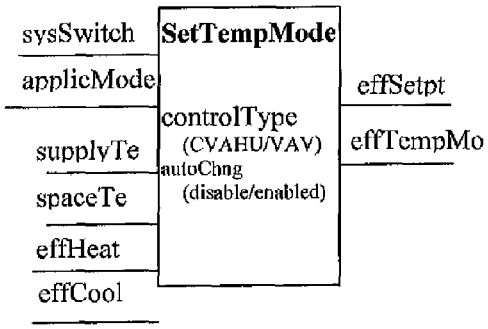

effTempMode indicates the current Mode determined by input states and arbitrated by control logic. SetTempMode does not generate all the possible Modes available. The valid enumerated values have the following meanings:

| effTempMode | Meaning |
|---|---|
| COOL=0 | Cool air is being supplied to the node via the central air supply and cooling energy is being supplied to the controlled space. |
| REHEAT=1 | Cool air is being supplied to the node via the central air supply. The air is being reheated by a local Heat source. |
| HEAT=2 | Heated air is being supplied to the node via the central air supply and heated air is being supplied to the controlled space. |
| EMERG_HEAT=3 | Emergency Heat is being supplied to the node via the central air supply. |
| OFF_MODE=255 | •Controller is commanded off. |

Example Data Function Blocks

Override

This function sets the output to the highest priority input that is not invalid. The Highest priority input is priority1Value and the Lowest priority input is cntrlInput. If All inputs are invalid or Unconnected, then the output is set to defaultValue. This function block corresponds to the BACnet priority array implementation with the replacement of the BACnet "NULL" state with "invalid".

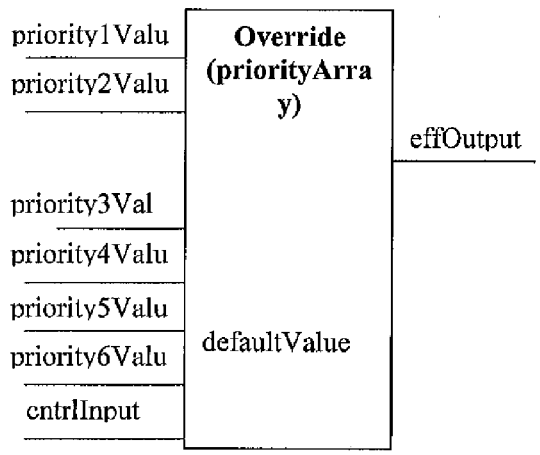

Run Time Accumulate

This function accumulates runtime whenever the input is TRUE (non zero) and the enable is TRUE. If Preset is TRUE, then runtime is set equal to the Preset Value. Runtime is provided in 4 outputs of seconds, minutes, hours and days. From iteration to iteration, the Function Block keeps track of the run time seconds. On power up/reset this is cleared.

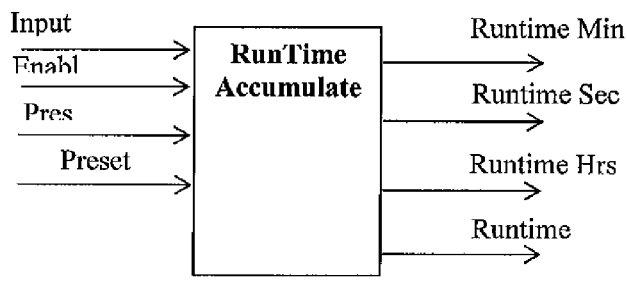

Counter

This function counts leading edge transitions of the input. If the enable is TRUE and the input transitions from FALSE to TRUE, then count is incremented or decremented by the count Value.

Positive values on count value increment the count. Negative values decrement the count. If preset is TRUE, then count is set to the Preset Value. From iteration to iteration, the Function Block keeps track of the previous state of the input so that it can detect a transition. On power up/reset this is cleared.

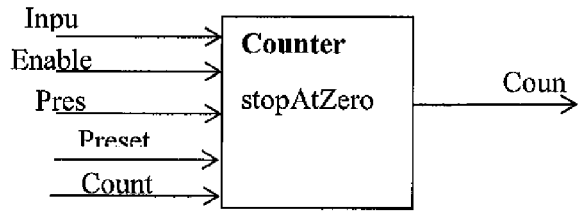

*Alarm*

This function creates an alarm based on the value of the input compared to the high and low limits. The user may create up to 32 alarm Function Blocks that will map into nvoError. From iteration to iteration, the Function Block keeps track of the alarm status and delay timer. On power up/reset these are cleared.

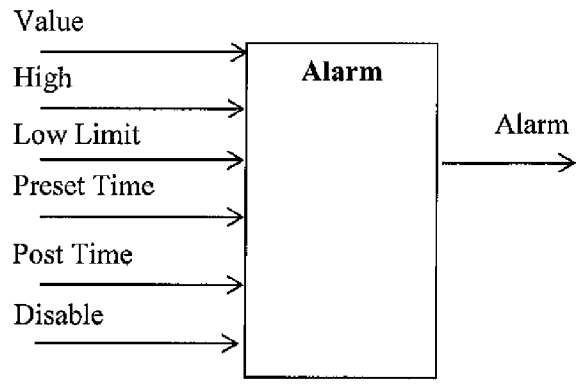

FUNCTION BLOCK TABLE

| FBID | FBName | FieldType | Description | IOCfg |
|---|---|---|---|---|
| 7 | AND | 01LoopType | type | |
| 7 | AND | 02LoopStaticID | spare | |
| 7 | AND | 03Variable1 | in1 | IN_ONLY |
| 7 | AND | 04Variable2 | in2 | IN_ONLY |
| 7 | AND | 05Variable3 | in3 | IN_ONLY |
| 7 | AND | 06Variable4 | in4 | IN_ONLY |
| 7 | AND | 07Variable5 | in5 | IN_ONLY |

| FBID | FBName | FieldType | Description | IOCfg |
|---|---|---|---|---|
| 7 | AND | 08Variable6 | in6 | IN_ONLY |
| 7 | AND | 09Variable7 | trueDelay | PAR_IN |
| 7 | AND | 10Variable8 | falseDelay | PAR_IN |
| 7 | AND | 11Variable9 | out | OUT_DIG |
| 7 | AND | 12EndByte1 | negin | |
| 7 | AND | 13EndByte2 | negout | |
| 9 | OR | 01LoopType | type | |
| 9 | OR | 02LoopStaticID | spare | |
| 9 | OR | 03Variable1 | in1 | IN_ONLY |
| 9 | OR | 04Variable2 | in2 | IN_ONLY |
| 9 | OR | 05Variable3 | in3 | IN_ONLY |
| 9 | OR | 06Variable4 | in4 | IN_ONLY |
| 9 | OR | 07Variable5 | in5 | IN_ONLY |
| 9 | OR | 08Variable6 | in6 | IN_ONLY |
| 9 | OR | 09Variable7 | trueDelay | PAR_IN |
| 9 | OR | 10Variable8 | falseDelay | PAR_IN |
| 9 | OR | 11Variable9 | out | OUT_DIG |
| 9 | OR | 12EndByte1 | negin | |
| 9 | OR | 13EndByte2 | negout | |

| FBID | FBName | FieldType | Description | IOCfg |
|---|---|---|---|---|
| 11 | XOR | 01LoopType | type | |
| 11 | XOR | 02LoopStaticID | spare | |
| 11 | XOR | 03Variable1 | in1 | IN_ONLY |
| 11 | XOR | 04Variable2 | in2 | IN_ONLY |
| 11 | XOR | 05Variable3 | in3 | IN_ONLY |
| 11 | XOR | 06Variable4 | in4 | IN_ONLY |
| 11 | XOR | 07Variable5 | in5 | IN_ONLY |
| 11 | XOR | 08Variable6 | in6 | IN_ONLY |
| 11 | XOR | 09Variable7 | trueDelay | PAR_IN |
| 11 | XOR | 10Variable8 | falseDelay | PAR_IN |
| 11 | XOR | 11Variable9 | out | OUT_DIG |
| 11 | XOR | 12EndByte1 | negin | |
| 11 | XOR | 13EndByte2 | negout | |
| 13 | ONESHOT | 01LoopType | type | |
| 13 | ONESHOT | 02LoopStaticID | spare | |
| 13 | ONESHOT | 03Variable1 | in | IN_ONLY |
| 13 | ONESHOT | 04Variable2 | onTime | PAR_IN |
| 13 | ONESHOT | 05Variable3 | out | OUT_DIG |
| 13 | ONESHOT | 06Variable4 | unused1 | UNUSED |
| 13 | ONESHOT | 07Variable5 | unused2 | UNUSED |
| 13 | ONESHOT | 08Variable6 | unused3 | UNUSED |
| 13 | ONESHOT | 09Variable7 | unused4 | UNUSED |
| 13 | ONESHOT | 10Variable8 | unused5 | UNUSED |
| 13 | ONESHOT | 11Variable9 | unused6 | UNUSED |
| 13 | ONESHOT | 12EndByte1 | negin | |
| 13 | ONESHOT | 13EndByte2 | negout | |

| FBID | FBName | FieldType | Description | IOCfg |
|---|---|---|---|---|
| 20 | MIN | 01LoopType | type | |

| | | | | |
|---|---|---|---|---|
| 20 | MIN | 02LoopStaticID | spare | |
| 20 | MIN | 03Variable1 | in1 | IN_PAR |
| 20 | MIN | 04Variable2 | in2 | IN_PAR |
| 20 | MIN | 05Variable3 | in3 | IN_PAR |
| 20 | MIN | 06Variable4 | in4 | IN_PAR |
| 20 | MIN | 07Variable5 | in5 | IN_PAR |
| 20 | MIN | 08Variable6 | in6 | IN_PAR |
| 20 | MIN | 09Variable7 | in7 | IN_PAR |
| 20 | MIN | 10Variable8 | in8 | IN_PAR |
| 20 | MIN | 11Variable9 | out | OUT_FLT |
| 20 | MIN | 12EndByte1 | | |
| 20 | MIN | 13EndByte2 | | |
| 21 | MAX | 01LoopType | type | |
| 21 | MAX | 02LoopStaticID | spare | |
| 21 | MAX | 03Variable1 | in1 | IN_PAR |
| 21 | MAX | 04Variable2 | in2 | IN_PAR |
| 21 | MAX | 05Variable3 | in3 | IN_PAR |
| 21 | MAX | 06Variable4 | in4 | IN_PAR |
| 21 | MAX | 07Variable5 | in5 | IN_PAR |
| 21 | MAX | 08Variable6 | in6 | IN_PAR |
| 21 | MAX | 09Variable7 | in7 | IN_PAR |
| 21 | MAX | 10Variable8 | in8 | IN_PAR |
| 21 | MAX | 11Variable9 | out | OUT_FLT |
| 21 | MAX | 12EndByte1 | | |
| 21 | MAX | 13EndByte2 | | |
| FBID | FBName | FieldType | Description | IOCfg |
| 22 | AVE | 01LoopType | type | |
| 22 | AVE | 02LoopStaticID | spare | |
| 22 | AVE | 03Variable1 | in1 | IN_PAR |
| 22 | AVE | 04Variable2 | in2 | IN_PAR |
| 22 | AVE | 05Variable3 | in3 | IN_PAR |
| 22 | AVE | 06Variable4 | in4 | IN_PAR |
| 22 | AVE | 07Variable5 | in5 | IN_PAR |
| 22 | AVE | 08Variable6 | in6 | IN_PAR |
| 22 | AVE | 09Variable7 | in7 | IN_PAR |
| 22 | AVE | 10Variable8 | in8 | IN_PAR |
| 22 | AVE | 11Variable9 | out | OUT_FLT |
| 22 | AVE | 12EndByte1 | | |
| 22 | AVE | 13EndByte2 | | |
| 23 | COMP | 01LoopType | type | |
| 23 | COMP | 02LoopStaticID | spare | |
| 23 | COMP | 03Variable1 | in1 | IN_PAR |
| 23 | COMP | 04Variable2 | in2 | IN_PAR |
| 23 | COMP | 05Variable3 | onHyst | PAR_IN |
| 23 | COMP | 06Variable4 | offHyst | PAR_IN |
| 23 | COMP | 07Variable5 | out | OUT_DIG |
| 23 | COMP | 08Variable6 | unused1 | UNUSED |
| 23 | COMP | 09Variable7 | unused2 | UNUSED |
| 23 | COMP | 10Variable8 | unused3 | UNUSED |

| FBID | FBName | FieldType | Description | IOCfg |
|---|---|---|---|---|
| 23 | COMP | 11Variable9 | unused4 | UNUSED |
| 23 | COMP | 12EndByte1 | operation | |
| 23 | COMP | 13EndByte2 | negout | |
| FBID | FBName | FieldType | Description | IOCfg |
| 26 | ANA_LATCH | 01LoopType | type | |
| 26 | ANA_LATCH | 02LoopStaticID | spare | |
| 26 | ANA_LATCH | 03Variable1 | in | IN_PAR |
| 26 | ANA_LATCH | 04Variable2 | latch | IN_PAR |
| 26 | ANA_LATCH | 05Variable3 | out | OUT_FLT |
| 26 | ANA_LATCH | 06Variable4 | unused1 | UNUSED |
| 26 | ANA_LATCH | 07Variable5 | unused2 | UNUSED |
| 26 | ANA_LATCH | 08Variable6 | unused3 | UNUSED |
| 26 | ANA_LATCH | 09Variable7 | unused4 | UNUSED |
| 26 | ANA_LATCH | 10Variable8 | unused5 | UNUSED |
| 26 | ANA_LATCH | 11Variable9 | unused6 | UNUSED |
| 26 | ANA_LATCH | 12EndByte1 | negin | |
| 26 | ANA_LATCH | 13EndByte2 | | |
| 27 | SEL_PRTY | 01LoopType | type | |
| 27 | SEL_PRTY | 02LoopStaticID | spare | |
| 27 | SEL_PRTY | 03Variable1 | enable1 | IN_ONLY |
| 27 | SEL_PRTY | 04Variable2 | enable2 | IN_ONLY |
| 27 | SEL_PRTY | 05Variable3 | enable3 | IN_ONLY |
| 27 | SEL_PRTY | 06Variable4 | enable4 | IN_ONLY |
| 27 | SEL_PRTY | 07Variable5 | in1 | IN_PAR |
| 27 | SEL_PRTY | 08Variable6 | in2 | IN_PAR |
| 27 | SEL_PRTY | 09Variable7 | in3 | IN_PAR |
| 27 | SEL_PRTY | 10Variable8 | in4 | IN_PAR |
| 27 | SEL_PRTY | 11Variable9 | out | OUT_FLT |
| 27 | SEL_PRTY | 12EndByte1 | In1AsDefault | |
| 27 | SEL_PRTY | 13EndByte2 | | |
| FBID | FBName | FieldType | Description | IOCfg |
| 28 | HYSTREL | 01LoopType | type | |
| 28 | HYSTREL | 02LoopStaticID | spare | |
| 28 | HYSTREL | 03Variable1 | in | IN_PAR |
| 28 | HYSTREL | 04Variable2 | onVal | PAR_IN |
| 28 | HYSTREL | 05Variable3 | offVal | PAR_IN |
| 28 | HYSTREL | 06Variable4 | minOn | PAR_IN |
| 28 | HYSTREL | 07Variable5 | minOff | PAR_IN |
| 28 | HYSTREL | 08Variable6 | stgOut | OUT_DIG |
| 28 | HYSTREL | 09Variable7 | unused1 | UNUSED |
| 28 | HYSTREL | 10Variable8 | unused2 | UNUSED |
| 28 | HYSTREL | 11Variable9 | unused3 | UNUSED |
| 28 | HYSTREL | 12EndByte1 | | |
| 28 | HYSTREL | 13EndByte2 | | |
| 29 | SWITCH | 01LoopType | type | |
| 29 | SWITCH | 02LoopStaticID | spare | |
| 29 | SWITCH | 03Variable1 | sensor | IN_ONLY |
| 29 | SWITCH | 04Variable2 | out0 | OUT_DIG |

| | | | | |
|---|---|---|---|---|
| 29 | SWITCH | 05Variable3 | out1 | OUT_DIG |
| 29 | SWITCH | 06Variable4 | out2 | OUT_DIG |
| 29 | SWITCH | 07Variable5 | out3 | OUT_DIG |
| 29 | SWITCH | 08Variable6 | out4 | OUT_DIG |
| 29 | SWITCH | 09Variable7 | out5 | OUT_DIG |
| 29 | SWITCH | 10Variable8 | out6 | OUT_DIG |
| 29 | SWITCH | 11Variable9 | out7 | OUT_DIG |
| 29 | SWITCH | 12EndByte1 | offset | |
| 29 | SWITCH | 13EndByte2 | negout | |
| FBID | FBName | FieldType | Description | IOCfg |
| 30 | SELECT | 01LoopType | type | |
| 30 | SELECT | 02LoopStaticID | spare | |
| 30 | SELECT | 03Variable1 | x | IN_ONLY |
| 30 | SELECT | 04Variable2 | inputDefault | IN_PAR |
| 30 | SELECT | 05Variable3 | input0 | IN_PAR |
| 30 | SELECT | 06Variable4 | input1 | IN_PAR |
| 30 | SELECT | 07Variable5 | input2 | IN_PAR |
| 30 | SELECT | 08Variable6 | input3 | IN_PAR |
| 30 | SELECT | 09Variable7 | input4 | IN_PAR |
| 30 | SELECT | 10Variable8 | input5 | IN_PAR |
| 30 | SELECT | 11Variable9 | output | OUT_FLT |
| 30 | SELECT | 12EndByte1 | offset | |
| 30 | SELECT | 13EndByte2 | | |
| 31 | ENCODE | 01LoopType | type | |
| 31 | ENCODE | 02LoopStaticID | out9 | |
| 31 | ENCODE | 03Variable1 | inEnum | IN_ONLY |
| 31 | ENCODE | 04Variable2 | disable | IN_PAR |
| 31 | ENCODE | 05Variable3 | in123 | PARAM |
| 31 | ENCODE | 06Variable4 | in456 | PARAM |
| 31 | ENCODE | 07Variable5 | in789 | PARAM |
| 31 | ENCODE | 08Variable6 | out123 | PARAM |
| 31 | ENCODE | 09Variable7 | out456 | PARAM |
| 31 | ENCODE | 10Variable8 | out | OUT_DIG |
| 31 | ENCODE | 11Variable9 | fire | OUT_DIG |
| 31 | ENCODE | 12EndByte1 | out7 | |
| 31 | ENCODE | 13EndByte2 | out8 | |
| FBID | FBName | FieldType | Description | IOCfg |
| 40 | ADD | 01LoopType | type | |
| 40 | ADD | 02LoopStaticID | spare | |
| 40 | ADD | 03Variable1 | x1 | IN_PAR |
| 40 | ADD | 04Variable2 | x2 | IN_PAR |
| 40 | ADD | 05Variable3 | x3 | IN_PAR |
| 40 | ADD | 06Variable4 | x4 | IN_PAR |
| 40 | ADD | 07Variable5 | x5 | IN_PAR |
| 40 | ADD | 08Variable6 | x6 | IN_PAR |
| 40 | ADD | 09Variable7 | x7 | IN_PAR |
| 40 | ADD | 10Variable8 | x8 | IN_PAR |
| 40 | ADD | 11Variable9 | y | OUT_FLT |

| FBID | FBName | FieldType | Description | IOCfg |
|---|---|---|---|---|
| 40 | ADD | 12EndByte1 | | |
| 40 | ADD | 13EndByte2 | | |
| 41 | SUB | 01LoopType | type | |
| 41 | SUB | 02LoopStaticID | spare | |
| 41 | SUB | 03Variable1 | x1 | IN_PAR |
| 41 | SUB | 04Variable2 | x2 | IN_PAR |
| 41 | SUB | 05Variable3 | unused1 | UNUSED |
| 41 | SUB | 06Variable4 | unused2 | UNUSED |
| 41 | SUB | 07Variable5 | unused3 | UNUSED |
| 41 | SUB | 08Variable6 | unused4 | UNUSED |
| 41 | SUB | 09Variable7 | unused5 | UNUSED |
| 41 | SUB | 10Variable8 | unused6 | UNUSED |
| 41 | SUB | 11Variable9 | y | OUT_FLT |
| 41 | SUB | 12EndByte1 | | |
| 41 | SUB | 13EndByte2 | | |
| FBID | FBName | FieldType | Description | IOCfg |
| 42 | MUL | 01LoopType | type | |
| 42 | MUL | 02LoopStaticID | spare | |
| 42 | MUL | 03Variable1 | x1 | IN_PAR |
| 42 | MUL | 04Variable2 | x2 | IN_PAR |
| 42 | MUL | 05Variable3 | unused1 | UNUSED |
| 42 | MUL | 06Variable4 | unused2 | UNUSED |
| 42 | MUL | 07Variable5 | unused3 | UNUSED |
| 42 | MUL | 08Variable6 | unused4 | UNUSED |
| 42 | MUL | 09Variable7 | unused5 | UNUSED |
| 42 | MUL | 10Variable8 | unused6 | UNUSED |
| 42 | MUL | 11Variable9 | y | OUT_FLT |
| 42 | MUL | 12EndByte1 | | |
| 42 | MUL | 13EndByte2 | | |
| 43 | DIV | 01LoopType | type | |
| 43 | DIV | 02LoopStaticID | spare | |
| 43 | DIV | 03Variable1 | x1 | IN_PAR |
| 43 | DIV | 04Variable2 | x2 | IN_PAR |
| 43 | DIV | 05Variable3 | unused1 | UNUSED |
| 43 | DIV | 06Variable4 | unused2 | UNUSED |
| 43 | DIV | 07Variable5 | unused3 | UNUSED |
| 43 | DIV | 08Variable6 | unused4 | UNUSED |
| 43 | DIV | 09Variable7 | unused5 | UNUSED |
| 43 | DIV | 10Variable8 | unused6 | UNUSED |
| 43 | DIV | 11Variable9 | y | OUT_FLT |
| 43 | DIV | 12EndByte1 | | |
| 43 | DIV | 13EndByte2 | | |
| FBID | FBName | FieldType | Description | IOCfg |
| 44 | SQRT | 01LoopType | type | |
| 44 | SQRT | 02LoopStaticID | spare | |
| 44 | SQRT | 03Variable1 | x1 | IN_ONLY |
| 44 | SQRT | 04Variable2 | negInvalid | PAR_IN |
| 44 | SQRT | 05Variable3 | unused1 | UNUSED |

| FBID | FBName | FieldType | Description | IOCfg |
|---|---|---|---|---|
| 44 | SQRT | 06Variable4 | unused2 | UNUSED |
| 44 | SQRT | 07Variable5 | unused3 | UNUSED |
| 44 | SQRT | 08Variable6 | unused4 | UNUSED |
| 44 | SQRT | 09Variable7 | unused5 | UNUSED |
| 44 | SQRT | 10Variable8 | unused6 | UNUSED |
| 44 | SQRT | 11Variable9 | y | OUT_FLT |
| 44 | SQRT | 12EndByte1 | | |
| 44 | SQRT | 13EndByte2 | | |
| 45 | POW | 01LoopType | | |
| 45 | POW | 02LoopStaticID | spare | |
| 45 | POW | 03Variable1 | x | IN_ONLY |
| 45 | POW | 04Variable2 | y | IN_PAR |
| 45 | POW | 05Variable3 | negInvalid | PAR_IN |
| 45 | POW | 06Variable4 | z | OUT_FLT |
| 45 | POW | 07Variable5 | unused1 | UNUSED |
| 45 | POW | 08Variable6 | unused2 | UNUSED |
| 45 | POW | 09Variable7 | unused3 | UNUSED |
| 45 | POW | 10Variable8 | unused4 | UNUSED |
| 45 | POW | 11Variable9 | unused5 | UNUSED |
| 45 | POW | 12EndByte1 | | |
| 45 | POW | 13EndByte2 | | |
| FBID | FBName | FieldType | Description | IOCfg |
| 47 | DIG_FILT | 01LoopType | type | |
| 47 | DIG_FILT | 02LoopStaticID | spare | |
| 47 | DIG_FILT | 03Variable1 | x | IN_PAR |
| 47 | DIG_FILT | 04Variable2 | tau | PARAM |
| 47 | DIG_FILT | 05Variable3 | out | OUT_FLT |
| 47 | DIG_FILT | 06Variable4 | unused1 | UNUSED |
| 47 | DIG_FILT | 07Variable5 | unused2 | UNUSED |
| 47 | DIG_FILT | 08Variable6 | unused3 | UNUSED |
| 47 | DIG_FILT | 09Variable7 | unused4 | UNUSED |
| 47 | DIG_FILT | 10Variable8 | unused5 | UNUSED |
| 47 | DIG_FILT | 11Variable9 | unused6 | UNUSED |
| 47 | DIG_FILT | 12EndByte1 | zeroInit | |
| 47 | DIG_FILT | 13EndByte2 | | |
| 48 | ENTH | 01LoopType | type | |
| 48 | ENTH | 02LoopStaticID | spare | |
| 48 | ENTH | 03Variable1 | temp | IN_ONLY |
| 48 | ENTH | 04Variable2 | relhum | IN_ONLY |
| 48 | ENTH | 05Variable3 | enthout | OUT_FLT |
| 48 | ENTH | 06Variable4 | unused1 | UNUSED |
| 48 | ENTH | 07Variable5 | unused2 | UNUSED |
| 48 | ENTH | 08Variable6 | unused3 | UNUSED |
| 48 | ENTH | 09Variable7 | unused4 | UNUSED |
| 48 | ENTH | 10Variable8 | unused5 | UNUSED |
| 48 | ENTH | 11Variable9 | unused6 | UNUSED |
| 48 | ENTH | 12EndByte1 | | |
| 48 | ENTH | 13EndByte2 | | |

| FBID | FBName | FieldType | Description | IOCfg |
|---|---|---|---|---|
| 49 | RATIO | 01LoopType | type | |
| 49 | RATIO | 02LoopStaticID | spare | |
| 49 | RATIO | 03Variable1 | x | IN_PAR |
| 49 | RATIO | 04Variable2 | x1 | IN_PAR |
| 49 | RATIO | 05Variable3 | y1 | IN_PAR |
| 49 | RATIO | 06Variable4 | x2 | IN_PAR |
| 49 | RATIO | 07Variable5 | y2 | IN_PAR |
| 49 | RATIO | 08Variable6 | out | OUT_FLT |
| 49 | RATIO | 09Variable7 | unused1 | UNUSED |
| 49 | RATIO | 10Variable8 | unused2 | UNUSED |
| 49 | RATIO | 11Variable9 | unused3 | UNUSED |
| 49 | RATIO | 12EndByte1 | operation | |
| 49 | RATIO | 13EndByte2 | | |
| 50 | LIMIT | 01LoopType | type | |
| 50 | LIMIT | 02LoopStaticID | spare | |
| 50 | LIMIT | 03Variable1 | x | IN_PAR |
| 50 | LIMIT | 04Variable2 | hiLimit | IN_PAR |
| 50 | LIMIT | 05Variable3 | loLimit | IN_PAR |
| 50 | LIMIT | 06Variable4 | y | OUT_FLT |
| 50 | LIMIT | 07Variable5 | unused1 | UNUSED |
| 50 | LIMIT | 08Variable6 | unused2 | UNUSED |
| 50 | LIMIT | 09Variable7 | unused3 | UNUSED |
| 50 | LIMIT | 10Variable8 | unused4 | UNUSED |
| 50 | LIMIT | 11Variable9 | unused5 | UNUSED |
| 50 | LIMIT | 12EndByte1 | | |
| 50 | LIMIT | 13EndByte2 | | |

| FBID | FBName | FieldType | Description | IOCfg |
|---|---|---|---|---|
| 51 | RESET | 01LoopType | type | |
| 51 | RESET | 02LoopStaticID | spare | |
| 51 | RESET | 03Variable1 | input | IN_PAR |
| 51 | RESET | 04Variable2 | sensor | IN_PAR |
| 51 | RESET | 05Variable3 | zeroPctResetVal | PAR_IN |
| 51 | RESET | 06Variable4 | hundredPctResetVal | PAR_IN |
| 51 | RESET | 07Variable5 | resetAmount | PAR_IN |
| 51 | RESET | 08Variable6 | output | OUT_FLT |
| 51 | RESET | 09Variable7 | unused1 | UNUSED |
| 51 | RESET | 10Variable8 | unused2 | UNUSED |
| 51 | RESET | 11Variable9 | unused3 | UNUSED |
| 51 | RESET | 12EndByte1 | | |
| 51 | RESET | 13EndByte2 | | |
| 52 | VELP | 01LoopType | type | |
| 52 | VELP | 02LoopStaticID | spare | |
| 52 | VELP | 03Variable1 | press | IN_PAR |
| 52 | VELP | 04Variable2 | kfactor | PAR_IN |
| 52 | VELP | 05Variable3 | autoSetOffset | IN_PAR |
| 52 | VELP | 06Variable4 | clearOffset | IN_PAR |
| 52 | VELP | 07Variable5 | area | PAR_IN |
| 52 | VELP | 08Variable6 | flow | OUT_FLT |

| FBID | FBName | FieldType | Description | IOCfg |
|---|---|---|---|---|
| 52 | VELP | 09Variable7 | offset | OUT_FLT_SAV |
| 52 | VELP | 10Variable8 | vel | OUT_FLT |
| 52 | VELP | 11Variable9 | unused1 | UNUSED |
| 52 | VELP | 12EndByte1 | | |
| 52 | VELP | 13EndByte2 | | |

| FBID | FBName | FieldType | Description | IOCfg |
|---|---|---|---|---|
| 60 | PID | 01LoopType | type | |
| 60 | PID | 02LoopStaticID | spare | |
| 60 | PID | 03Variable1 | sensor | IN_PAR |
| 60 | PID | 04Variable2 | setPt | IN_PAR |
| 60 | PID | 05Variable3 | disable | IN_ONLY |
| 60 | PID | 06Variable4 | tr | PAR_IN |
| 60 | PID | 07Variable5 | intgTime | PAR_IN |
| 60 | PID | 08Variable6 | derivTime | PAR_IN |
| 60 | PID | 09Variable7 | deadBand | PAR_IN |
| 60 | PID | 10Variable8 | dbDelay | PAR_IN |
| 60 | PID | 11Variable9 | out | OUT_FLT |
| 60 | PID | 12EndByte1 | revAct | |
| 60 | PID | 13EndByte2 | bias | |
| 61 | AIA | 01LoopType | type | |
| 61 | AIA | 02LoopStaticID | spare | |
| 61 | AIA | 03Variable1 | sensor | IN_PAR |
| 61 | AIA | 04Variable2 | setpt | IN_PAR |
| 61 | AIA | 05Variable3 | disable | IN_ONLY |
| 61 | AIA | 06Variable4 | tr | PAR_IN |
| 61 | AIA | 07Variable5 | deadBand | PAR_IN |
| 61 | AIA | 08Variable6 | maxAOChange | PAR_IN |
| 61 | AIA | 09Variable7 | derivGain | PAR_IN |
| 61 | AIA | 10Variable8 | minAOChange | PAR_IN |
| 61 | AIA | 11Variable9 | output | OUT_FLT |
| 61 | AIA | 12EndByte1 | revAct | |
| 61 | AIA | 13EndByte2 | | |

| FBID | FBName | FieldType | Description | IOCfg |
|---|---|---|---|---|
| 62 | CYCLER | 01LoopType | type | |
| 62 | CYCLER | 02LoopStaticID | anticAuth | |
| 62 | CYCLER | 03Variable1 | in | IN_PAR |
| 62 | CYCLER | 04Variable2 | maxStgs | PAR_IN |
| 62 | CYCLER | 05Variable3 | minOn | PAR_IN |
| 62 | CYCLER | 06Variable4 | minOff | PAR_IN |
| 62 | CYCLER | 07Variable5 | intstgOn | PAR_IN |
| 62 | CYCLER | 08Variable6 | intstgOff | PAR_IN |
| 62 | CYCLER | 09Variable7 | overrideOff | IN_ONLY |
| 62 | CYCLER | 10Variable8 | disable | IN_ONLY |
| 62 | CYCLER | 11Variable9 | stgsAct | OUT_DIG |
| 62 | CYCLER | 12EndByte1 | cph | |
| 62 | CYCLER | 13EndByte2 | hyst | |
| 63 | STAGER | 01LoopType | type | |
| 63 | STAGER | 02LoopStaticID | anticAuth | |

| FBID | FBName | FieldType | Description | IOCfg |
|---|---|---|---|---|
| 63 | STAGER | 03Variable1 | in | IN_PAR |
| 63 | STAGER | 04Variable2 | maxStgs | PAR_IN |
| 63 | STAGER | 05Variable3 | minOn | PAR_IN |
| 63 | STAGER | 06Variable4 | minOff | PAR_IN |
| 63 | STAGER | 07Variable5 | intstgOn | PAR_IN |
| 63 | STAGER | 08Variable6 | intstgOff | PAR_IN |
| 63 | STAGER | 09Variable7 | overrideOff | IN_ONLY |
| 63 | STAGER | 10Variable8 | disable | IN_ONLY |
| 63 | STAGER | 11Variable9 | stgsAct | OUT_DIG |
| 63 | STAGER | 12EndByte1 | cph | |
| 63 | STAGER | 13EndByte2 | hyst | |

| FBID | FBName | FieldType | Description | IOCfg |
|---|---|---|---|---|
| 64 | STAGEDRIV | 01LoopType | type | |
| 64 | STAGEDRIV | 02LoopStaticID | spare | |
| 64 | STAGEDRIV | 03Variable1 | nStgActive | IN_ONLY |
| 64 | STAGEDRIV | 04Variable2 | runtimeReset | IN_ONLY |
| 64 | STAGEDRIV | 05Variable3 | stage1 | OUT_DIG |
| 64 | STAGEDRIV | 06Variable4 | stage2 | OUT_DIG |
| 64 | STAGEDRIV | 07Variable5 | stage3 | OUT_DIG |
| 64 | STAGEDRIV | 08Variable6 | stage4 | OUT_DIG |
| 64 | STAGEDRIV | 09Variable7 | stage5 | OUT_DIG |
| 64 | STAGEDRIV | 10Variable8 | stgStatusOut | OUT_FLT |
| 64 | STAGEDRIV | 11Variable9 | offsets | OUT_FLT_SAV |
| 64 | STAGEDRIV | 12EndByte1 | leadLag | |
| 64 | STAGEDRIV | 13EndByte2 | maxStgs | |
| 65 | RATE_LIM | 01LoopType | type | |
| 65 | RATE_LIM | 02LoopStaticID | spare | |
| 65 | RATE_LIM | 03Variable1 | in | IN_ONLY |
| 65 | RATE_LIM | 04Variable2 | disable | IN_PAR |
| 65 | RATE_LIM | 05Variable3 | startVal | PAR_IN |
| 65 | RATE_LIM | 06Variable4 | upRate | PAR_IN |
| 65 | RATE_LIM | 07Variable5 | downRate | PAR_IN |
| 65 | RATE_LIM | 08Variable6 | startInterval | PAR_IN |
| 65 | RATE_LIM | 09Variable7 | out | OUT_FLT |
| 65 | RATE_LIM | 10Variable8 | unused1 | UNUSED |
| 65 | RATE_LIM | 11Variable9 | unused2 | UNUSED |
| 65 | RATE_LIM | 12EndByte1 | | |
| 65 | RATE_LIM | 13EndByte2 | | |

| FBID | FBName | FieldType | Description | IOCfg |
|---|---|---|---|---|
| 66 | FLOW_CNTRL | 01LoopType | type | |
| 66 | FLOW_CNTRL | 02LoopStaticID | spare | |
| 66 | FLOW_CNTRL | 03Variable1 | cmdFlowPercent | IN_PAR |
| 66 | FLOW_CNTRL | 04Variable2 | flowSensor | IN_PAR |
| 66 | FLOW_CNTRL | 05Variable3 | minFlowSetPt | IN_PAR |
| 66 | FLOW_CNTRL | 06Variable4 | maxFlowSetPt | IN_PAR |
| 66 | FLOW_CNTRL | 07Variable5 | manFlowOverride | IN_PAR |
| 66 | FLOW_CNTRL | 08Variable6 | ManFlowValue | IN_PAR |
| 66 | FLOW_CNTRL | 09Variable7 | ductArea | PAR_IN |

| FBID | FBName | FieldType | Description | IOCfg |
|---|---|---|---|---|
| 66 | FLOW_CNTRL | 10Variable8 | effFlowSetPt | OUT_FLT |
| 66 | FLOW_CNTRL | 11Variable9 | damperPos | OUT_FLT |
| 66 | FLOW_CNTRL | 12EndByte1 | units | |
| 66 | FLOW_CNTRL | 13EndByte2 | motorSpeed | |
| 80 | OVERIDE | 01LoopType | type | |
| 80 | OVERIDE | 02LoopStaticID | spare | |
| 80 | OVERIDE | 03Variable1 | priority1val | IN_PAR |
| 80 | OVERIDE | 04Variable2 | priority2val | IN_PAR |
| 80 | OVERIDE | 05Variable3 | priority3val | IN_PAR |
| 80 | OVERIDE | 06Variable4 | priority4val | IN_PAR |
| 80 | OVERIDE | 07Variable5 | priority5val | IN_PAR |
| 80 | OVERIDE | 08Variable6 | priority6val | IN_PAR |
| 80 | OVERIDE | 09Variable7 | cntrlInput | IN_PAR |
| 80 | OVERIDE | 10Variable8 | defaultValue | PAR_IN |
| 80 | OVERIDE | 11Variable9 | effOutput | OUT_FLT |
| 80 | OVERIDE | 12EndByte1 | | |
| 80 | OVERIDE | 13EndByte2 | | |

| FBID | FBName | FieldType | Description | IOCfg |
|---|---|---|---|---|
| 81 | RUNT_ACCM | 01LoopType | type | |
| 81 | RUNT_ACCM | 02LoopStaticID | spare | |
| 81 | RUNT_ACCM | 03Variable1 | input | IN_PAR |
| 81 | RUNT_ACCM | 04Variable2 | enable | IN_PAR |
| 81 | RUNT_ACCM | 05Variable3 | preset | IN_PAR |
| 81 | RUNT_ACCM | 06Variable4 | presetValue | PAR_IN |
| 81 | RUNT_ACCM | 07Variable5 | runtimeMin | OUT_FLT_SAV |
| 81 | RUNT_ACCM | 08Variable6 | runtimeSec | OUT_FLT |
| 81 | RUNT_ACCM | 09Variable7 | runtimeHrs | OUT_FLT |
| 81 | RUNT_ACCM | 10Variable8 | runtimeDays | OUT_FLT |
| 81 | RUNT_ACCM | 11Variable9 | unused1 | UNUSED |
| 81 | RUNT_ACCM | 12EndByte1 | | |
| 81 | RUNT_ACCM | 13EndByte2 | | |
| 82 | COUNTER | 01LoopType | type | |
| 82 | COUNTER | 02LoopStaticID | spare | |
| 82 | COUNTER | 03Variable1 | input | IN_PAR |
| 82 | COUNTER | 04Variable2 | enable | IN_PAR |
| 82 | COUNTER | 05Variable3 | preset | IN_PAR |
| 82 | COUNTER | 06Variable4 | presetValue | PAR_IN |
| 82 | COUNTER | 07Variable5 | countValue | PAR_IN |
| 82 | COUNTER | 08Variable6 | stopAtZero | PAR_IN |
| 82 | COUNTER | 09Variable7 | counts | OUT_FLT_SAV |
| 82 | COUNTER | 10Variable8 | unused1 | UNUSED |
| 82 | COUNTER | 11Variable9 | unused2 | UNUSED |
| 82 | COUNTER | 12EndByte1 | | |
| 82 | COUNTER | 13EndByte2 | | |

| FBID | FBName | FieldType | Description | IOCfg |
|---|---|---|---|---|
| 83 | ALARM | 01LoopType | type | |
| 83 | ALARM | 02LoopStaticID | spare | |
| 83 | ALARM | 03Variable1 | value | IN_ONLY |

| | | | | |
|---|---|---|---|---|
| 83 | ALARM | 04Variable2 | highLimit | PAR_IN |
| 83 | ALARM | 05Variable3 | lowLimit | PAR_IN |
| 83 | ALARM | 06Variable4 | presetTime | PAR_IN |
| 83 | ALARM | 07Variable5 | postTime | PAR_IN |
| 83 | ALARM | 08Variable6 | disable | IN_ONLY |
| 83 | ALARM | 09Variable7 | alarmStatus | OUT_DIG |
| 83 | ALARM | 10Variable8 | unused1 | UNUSED |
| 83 | ALARM | 11Variable9 | unused2 | UNUSED |
| 83 | ALARM | 12EndByte1 | alarmID | |
| 83 | ALARM | 13EndByte2 | | |
| 100 | OCC_ARB | 01LoopType | type | |
| 100 | OCC_ARB | 02LoopStaticID | spare | |
| 100 | OCC_ARB | 03Variable1 | schedCurrentState | IN_ONLY |
| 100 | OCC_ARB | 04Variable2 | wmOverride | IN_ONLY |
| 100 | OCC_ARB | 05Variable3 | networkManOcc | IN_ONLY |
| 100 | OCC_ARB | 06Variable4 | occSensorState | IN_ONLY |
| 100 | OCC_ARB | 07Variable5 | effOccCurrentState | OUT_DIG |
| 100 | OCC_ARB | 08Variable6 | manOverrideState | OUT_FLT_SAV |
| 100 | OCC_ARB | 09Variable7 | unused1 | UNUSED |
| 100 | OCC_ARB | 10Variable8 | unused2 | UNUSED |
| 100 | OCC_ARB | 11Variable9 | unused3 | UNUSED |
| 100 | OCC_ARB | 12EndByte1 | netLastInWins | |
| 100 | OCC_ARB | 13EndByte2 | occSensorOper | |
| FBID | FBName | FieldType | Description | IOCfg |
| 101 | GEN_SPCALC | 01LoopType | type | |
| 101 | GEN_SPCALC | 02LoopStaticID | spare | |
| 101 | GEN_SPCALC | 03Variable1 | effOccCurrentState | IN_ONLY |
| 101 | GEN_SPCALC | 04Variable2 | resetInput | IN_PAR |
| 101 | GEN_SPCALC | 05Variable3 | reset0Pct | PAR_IN |
| 101 | GEN_SPCALC | 06Variable4 | reset100Pct | PAR_IN |
| 101 | GEN_SPCALC | 07Variable5 | resetAmount | PAR_IN |
| 101 | GEN_SPCALC | 08Variable6 | occSetPt | PAR_IN |
| 101 | GEN_SPCALC | 09Variable7 | stbySetPt | PAR_IN |
| 101 | GEN_SPCALC | 10Variable8 | unoccSetPt | PAR_IN |
| 101 | GEN_SPCALC | 11Variable9 | effSetPt | OUT_FLT |
| 101 | GEN_SPCALC | 12EndByte1 | | |
| 101 | GEN_SPCALC | 13EndByte2 | | |
| 102 | TEMP_SPCALC | 01LoopType | type | |
| 102 | TEMP_SPCALC | 02LoopStaticID | spare | |
| 102 | TEMP_SPCALC | 03Variable1 | effOccCurrentState | IN_ONLY |
| 102 | TEMP_SPCALC | 04Variable2 | schedNextState | IN_ONLY |
| 102 | TEMP_SPCALC | 05Variable3 | schedTuncos | IN_ONLY |
| 102 | TEMP_SPCALC | 06Variable4 | setpoint | IN_ONLY |
| 102 | TEMP_SPCALC | 07Variable5 | heatRampRate | IN_PAR |
| 102 | TEMP_SPCALC | 08Variable6 | coolRampRate | IN_PAR |
| 102 | TEMP_SPCALC | 09Variable7 | manOverrideState | IN_ONLY |
| 102 | TEMP_SPCALC | 10Variable8 | effHeatSP | OUT_FLT |
| 102 | TEMP_SPCALC | 11Variable9 | effCoolSP | OUT_FLT |
| 102 | TEMP_SPCALC | 12EndByte1 | | |

| | 102 | TEMP_SPCALC | 13EndByte2 | | |
|---|---|---|---|---|---|
| FBID | | FBName | FieldType | Description | IOCfg |
| | 103 | TEMP_MODE | 01LoopType | type | |
| | 103 | TEMP_MODE | 02LoopStaticID | spare | |
| | 103 | TEMP_MODE | 03Variable1 | sysSwitch | IN_ONLY |
| | 103 | TEMP_MODE | 04Variable2 | cmdMode | IN_ONLY |
| | 103 | TEMP_MODE | 05Variable3 | supplyTemp | IN_ONLY |
| | 103 | TEMP_MODE | 06Variable4 | spaceTemp | IN_ONLY |
| | 103 | TEMP_MODE | 07Variable5 | effHeatSP | IN_ONLY |
| | 103 | TEMP_MODE | 08Variable6 | effCoolSP | IN_ONLY |
| | 103 | TEMP_MODE | 09Variable7 | allowAutoChange | IN_PAR |
| | 103 | TEMP_MODE | 10Variable8 | effSetpt | OUT_FLT |
| | 103 | TEMP_MODE | 11Variable9 | effTempMode | OUT_FLT_SAV |
| | 103 | TEMP_MODE | 12EndByte1 | controlType | |
| | 103 | TEMP_MODE | 13EndByte2 | | |
| | 104 | STAGEDRIV_ADD | 01LoopType | type | |
| | 104 | STAGEDRIV_ADD | 02LoopStaticID | spare | |
| | 104 | STAGEDRIV_ADD | 03Variable1 | stgStatusIn | IN_ONLY |
| | 104 | STAGEDRIV_ADD | 04Variable2 | stage1 | OUT_DIG |
| | 104 | STAGEDRIV_ADD | 05Variable3 | stage2 | OUT_DIG |
| | 104 | STAGEDRIV_ADD | 06Variable4 | stage3 | OUT_DIG |
| | 104 | STAGEDRIV_ADD | 07Variable5 | stage4 | OUT_DIG |
| | 104 | STAGEDRIV_ADD | 08Variable6 | stage5 | OUT_DIG |
| | 104 | STAGEDRIV_ADD | 09Variable7 | stage6 | OUT_DIG |
| | 104 | STAGEDRIV_ADD | 10Variable8 | stage7 | OUT_DIG |
| | 104 | STAGEDRIV_ADD | 11Variable9 | stage8 | OUT_DIG |
| | 104 | STAGEDRIV_ADD | 12EndByte1 | firstStgNum | |
| | 104 | STAGEDRIV_ADD | 13EndByte2 | | |
| FBID | | FBName | FieldType | Description | IOCfg |
| | 129 | SCHED_SP | 01LoopType | type | |
| | 129 | SCHED_SP | 02LoopStaticID | spare | |
| | 129 | SCHED_SP | 03Variable1 | SchedOcc | OUT_DIG |
| | 129 | SCHED_SP | 04Variable2 | NextSchedOcc | OUT_DIG |
| | 129 | SCHED_SP | 05Variable3 | TUNCOS | OUT_FLT |
| | 129 | SCHED_SP | 06Variable4 | unused1 | UNUSED |
| | 129 | SCHED_SP | 07Variable5 | unused2 | UNUSED |
| | 129 | SCHED_SP | 08Variable6 | unused3 | UNUSED |
| | 129 | SCHED_SP | 09Variable7 | unused4 | UNUSED |
| | 129 | SCHED_SP | 10Variable8 | unused5 | UNUSED |
| | 129 | SCHED_SP | 11Variable9 | unused6 | UNUSED |
| | 129 | SCHED_SP | 12EndByte1 | | |
| | 129 | SCHED_SP | 13EndByte2 | | |
| | 130 | WALL_MOD | 01LoopType | type | |
| | 130 | WALL_MOD | 02LoopStaticID | spare | |
| | 130 | WALL_MOD | 03Variable1 | spaceTempIn | IN_ONLY |
| | 130 | WALL_MOD | 04Variable2 | setPointIn | IN_ONLY |
| | 130 | WALL_MOD | 05Variable3 | overide | IN_ONLY |
| | 130 | WALL_MOD | 06Variable4 | EffOverride | IN_ONLY |

| | | | | | |
|---|---|---|---|---|---|
| 130 | WALL_MOD | 07Variable5 | spaceTempOut | | OUT_FLT |
| 130 | WALL_MOD | 08Variable6 | setPointout | | OUT_FLT |
| 130 | WALL_MOD | 09Variable7 | WMOverride | | OUT_DIG |
| 130 | WALL_MOD | 10Variable8 | LED | | OUT_DIG |
| 130 | WALL_MOD | 11Variable9 | unused1 | | UNUSED |
| 130 | WALL_MOD | 12EndByte1 | | | |
| 130 | WALL_MOD | 13EndByte2 | | | |

| FBID | FBName | ByteCfg | ByteOffset | Negate | Comments |
|---|---|---|---|---|---|
| 7 | AND | | 0 | | Loop Type |
| 7 | AND | UNUSED | 1 | | |
| 7 | AND | | 2 | y | input 1 |
| 7 | AND | | 4 | y | input 2 |
| 7 | AND | | 6 | y | input 3 |
| 7 | AND | | 8 | y | input 4 |
| 7 | AND | | 10 | y | input 5 |
| 7 | AND | | 12 | y | input 6 |
| 7 | AND | | 14 | n | true delay - seconds |
| 7 | AND | | 16 | n | false delay - seconds |
| 7 | AND | | 18 | y | output-AND |
| 7 | AND | NEGBITIN | 20 | | individual input bit negation |
| 7 | AND | NEGBITOUT | 21 | | output bit negation |
| 9 | OR | | 0 | | Loop Type |
| 9 | OR | UNUSED | 1 | | |
| 9 | OR | | 2 | y | input 1 |
| 9 | OR | | 4 | y | input 2 |
| 9 | OR | | 6 | y | input 3 |
| 9 | OR | | 8 | y | input 4 |
| 9 | OR | | 10 | y | input 5 |
| 9 | OR | | 12 | y | input 6 |
| 9 | OR | | 14 | n | true delay - seconds |
| 9 | OR | | 16 | n | false delay - seconds |
| 9 | OR | | 18 | y | output-OR |
| 9 | OR | NEGBITIN | 20 | | individual input bit negation |
| 9 | OR | NEGBITOUT | 21 | | output bit negation |

| FBID | FBName | ByteCfg | ByteOffset | Negate | Comments |
|---|---|---|---|---|---|
| 11 | XOR | | 0 | | Loop Type |
| 11 | XOR | UNUSED | 1 | | |
| 11 | XOR | | 2 | y | Input 1 |
| 11 | XOR | | 4 | y | input 2 |
| 11 | XOR | | 6 | y | input 3 |
| 11 | XOR | | 8 | y | input 4 |
| 11 | XOR | | 10 | y | input 5 |
| 11 | XOR | | 12 | y | Input 6 |
| 11 | XOR | | 14 | n | true delay - seconds |
| 11 | XOR | | 16 | n | false delay - seconds |

| FBID | FBName | ByteCfg | ByteOffset | Negate | Comments |
|---|---|---|---|---|---|
| 11 | XOR | | 18 | y | output-XOR |
| 11 | XOR | NEGBITIN | 20 | | individual input bit negation |
| 11 | XOR | NEGBITOUT | 21 | | output bit negation |
| 13 | ONESHOT | | 0 | | Loop Type |
| 13 | ONESHOT | UNUSED | 1 | | |
| 13 | ONESHOT | | 2 | y | input |
| 13 | ONESHOT | | 4 | n | on time |
| 13 | ONESHOT | | 6 | y | output-One shot |
| 13 | ONESHOT | | 8 | | |
| 13 | ONESHOT | | 10 | | |
| 13 | ONESHOT | | 12 | | |
| 13 | ONESHOT | | 14 | | |
| 13 | ONESHOT | | 16 | | |
| 13 | ONESHOT | | 18 | | |
| 13 | ONESHOT | NEGBITIN | 20 | | input bit negation |
| 13 | ONESHOT | NEGBITOUT | 21 | | output bit negation |

| FBID | FBName | ByteCfg | ByteOffset | Negate | Comments |
|---|---|---|---|---|---|
| 20 | MIN | | 0 | | Loop Type |
| 20 | MIN | UNUSED | 1 | | |
| 20 | MIN | | 2 | | input 1 |
| 20 | MIN | | 4 | | input 2 |
| 20 | MIN | | 6 | | input 3 |
| 20 | MIN | | 8 | | input 4 |
| 20 | MIN | | 10 | | input 5 |
| 20 | MIN | | 12 | | input 6 |
| 20 | MIN | | 14 | | input 7 |
| 20 | MIN | | 16 | | input 8 |
| 20 | MIN | | 18 | | output- Minimum |
| 20 | MIN | UNUSED | 20 | | |
| 20 | MIN | UNUSED | 21 | | |
| 21 | MAX | | 0 | | Loop Type |
| 21 | MAX | UNUSED | 1 | | |
| 21 | MAX | | 2 | | input 1 |
| 21 | MAX | | 4 | | input 2 |
| 21 | MAX | | 6 | | input 3 |
| 21 | MAX | | 8 | | input 4 |
| 21 | MAX | | 10 | | input 5 |
| 21 | MAX | | 12 | | Input 6 |
| 21 | MAX | | 14 | | input 7 |
| 21 | MAX | | 16 | | input 8 |
| 21 | MAX | | 18 | | output-Maximum |
| 21 | MAX | UNUSED | 20 | | |
| 21 | MAX | UNUSED | 21 | | |

| FBID | FBName | ByteCfg | ByteOffset | Negate | Comments |
|---|---|---|---|---|---|
| 22 | AVE | | 0 | | Loop Type |
| 22 | AVE | UNUSED | 1 | | |
| 22 | AVE | | 2 | | input 1 |
| 22 | AVE | | 4 | | input 2 |

| FBID | FBName | ByteCfg | ByteOffset | Negate | Comments |
|---|---|---|---|---|---|
| 22 | AVE | | 6 | | input 3 |
| 22 | AVE | | 8 | | input 4 |
| 22 | AVE | | 10 | | input 5 |
| 22 | AVE | | 12 | | input 6 |
| 22 | AVE | | 14 | | input 7 |
| 22 | AVE | | 16 | | input 8 |
| 22 | AVE | | 18 | | output-Average |
| 22 | AVE | UNUSED | 20 | | |
| 22 | AVE | UNUSED | 21 | | |
| 23 | COMP | | 0 | | Loop Type |
| 23 | COMP | UNUSED | 1 | | |
| 23 | COMP | | 2 | n | input 1 |
| 23 | COMP | | 4 | n | input 2 |
| 23 | COMP | | 6 | | On Hysteresis |
| 23 | COMP | | 8 | | Off Hysteresis |
| 23 | COMP | | 10 | y | output-Comparator |
| 23 | COMP | | 12 | | |
| 23 | COMP | | 14 | | |
| 23 | COMP | | 16 | | |
| 23 | COMP | | 18 | | |
| 23 | COMP | UBYTE | 20 | | 0=EQ; 1=LT; 2=GT |
| 23 | COMP | NEGBITOUT | 21 | | output bit negation |

| FBID | FBName | ByteCfg | ByteOffset | Negate | Comments |
|---|---|---|---|---|---|
| 26 | ANA_LATCH | | 0 | | Loop Type |
| 26 | ANA_LATCH | UNUSED | 1 | | |
| 26 | ANA_LATCH | | 2 | n | input |
| 26 | ANA_LATCH | | 4 | y | latch |
| 26 | ANA_LATCH | | 6 | n | output-Latch |
| 26 | ANA_LATCH | | 8 | | |
| 26 | ANA_LATCH | | 10 | | |
| 26 | ANA_LATCH | | 12 | | |
| 26 | ANA_LATCH | | 14 | | |
| 26 | ANA_LATCH | | 16 | | |
| 26 | ANA_LATCH | | 18 | | |
| 26 | ANA_LATCH | NEGBITIN | 20 | | input bit negation |
| 26 | ANA_LATCH | UNUSED | 21 | | |
| 27 | SEL_PRTY | | 0 | | Loop Type |
| 27 | SEL_PRTY | UNUSED | 1 | | |
| 27 | SEL_PRTY | | 2 | | enable 1 |
| 27 | SEL_PRTY | | 4 | | enable 2 |
| 27 | SEL_PRTY | | 6 | | enable 3 |
| 27 | SEL_PRTY | | 8 | | enable 4 |
| 27 | SEL_PRTY | | 10 | | input 1 |
| 27 | SEL_PRTY | | 12 | | input 2 |
| 27 | SEL_PRTY | | 14 | | input 3 |
| 27 | SEL_PRTY | | 16 | | input 4 |
| 27 | SEL_PRTY | | 18 | | output-Select priority |
| 27 | SEL_PRTY | UBYTE | 20 | | yes/no |
| 27 | SEL_PRTY | UNUSED | 21 | | |

| FBID | FBName | ByteCfg | ByteOffset | Negate | Comments |
|---|---|---|---|---|---|
| 28 | HYSTREL | | 0 | | Loop Type |
| 28 | HYSTREL | UNUSED | 1 | | |
| 28 | HYSTREL | | 2 | | input |
| 28 | HYSTREL | | 4 | | on Value |
| 28 | HYSTREL | | 6 | | off Value |
| 28 | HYSTREL | | 8 | | Minimum On - seconds |
| 28 | HYSTREL | | 10 | | Minimum Off - seconds |
| 28 | HYSTREL | | 12 | | output-Stage |
| 28 | HYSTREL | | 14 | | |
| 28 | HYSTREL | | 16 | | |
| 28 | HYSTREL | | 18 | | |
| 28 | HYSTREL | UNUSED | 20 | | |
| 28 | HYSTREL | UNUSED | 21 | | |
| 29 | SWITCH | | 0 | | Loop Type |
| 29 | SWITCH | UNUSED | 1 | | |
| 29 | SWITCH | | 2 | | input |
| 29 | SWITCH | | 4 | y | output 1 |
| 29 | SWITCH | | 6 | y | output 2 |
| 29 | SWITCH | | 8 | y | output 3 |
| 29 | SWITCH | | 10 | y | output 4 |
| 29 | SWITCH | | 12 | y | output 5 |
| 29 | SWITCH | | 14 | y | output 6 |
| 29 | SWITCH | | 16 | y | output 7 |
| 29 | SWITCH | | 18 | y | output 8 |
| 29 | SWITCH | UBYTE | 20 | | offset |
| 29 | SWITCH | NEGBITOUT | 21 | | individual output bit negation |

| FBID | FBName | ByteCfg | ByteOffset | Negate | Comments |
|---|---|---|---|---|---|
| 30 | SELECT | | 0 | | Loop Type |
| 30 | SELECT | UNUSED | 1 | | |
| 30 | SELECT | | 2 | | index |
| 30 | SELECT | | 4 | | default |
| 30 | SELECT | | 6 | | input 1 |
| 30 | SELECT | | 8 | | input 2 |
| 30 | SELECT | | 10 | | input 3 |
| 30 | SELECT | | 12 | | input 4 |
| 30 | SELECT | | 14 | | input 5 |
| 30 | SELECT | | 16 | | input 6 |
| 30 | SELECT | | 18 | | output-Select |
| 30 | SELECT | UBYTE | 20 | | enumeration start value |
| 30 | SELECT | UNUSED | 21 | | |
| 31 | ENCODE | | 0 | | Loop Type |
| 31 | ENCODE | UBYTE | 1 | | out9 |
| 31 | ENCODE | | 2 | | inEnum |
| 31 | ENCODE | | 4 | | disable |
| 31 | ENCODE | | 6 | | input 1,2,3 |
| 31 | ENCODE | | 8 | | input 4,5,6 |
| 31 | ENCODE | | 10 | | input 7,8,9 |

| FBID | FBName | ByteCfg | ByteOffset | Negate | Comments |
|---|---|---|---|---|---|
| 31 | ENCODE |  | 12 |  | out 1,2,3 |
| 31 | ENCODE |  | 14 |  | out 4,5,6 |
| 31 | ENCODE |  | 16 |  | out |
| 31 | ENCODE |  | 18 |  | fire |
| 31 | ENCODE | UBYTE | 20 |  | out 7 |
| 31 | ENCODE | UBYTE | 21 |  | out 8 |

| FBID | FBName | ByteCfg | ByteOffset | Negate | Comments |
|---|---|---|---|---|---|
| 40 | ADD |  | 0 |  | Loop Type |
| 40 | ADD | UNUSED | 1 |  |  |
| 40 | ADD |  | 2 |  | x1 |
| 40 | ADD |  | 4 |  | x2 |
| 40 | ADD |  | 6 |  | x3 |
| 40 | ADD |  | 8 |  | x4 |
| 40 | ADD |  | 10 |  | x5 |
| 40 | ADD |  | 12 |  | x6 |
| 40 | ADD |  | 14 |  | x7 |
| 40 | ADD |  | 16 |  | x8 |
| 40 | ADD |  | 18 |  | output-Add |
| 40 | ADD | UNUSED | 20 |  |  |
| 40 | ADD | UNUSED | 21 |  |  |
| 41 | SUB |  | 0 |  | Loop Type |
| 41 | SUB | UNUSED | 1 |  |  |
| 41 | SUB |  | 2 |  | x1 |
| 41 | SUB |  | 4 |  | x2 |
| 41 | SUB |  | 6 |  |  |
| 41 | SUB |  | 8 |  |  |
| 41 | SUB |  | 10 |  |  |
| 41 | SUB |  | 12 |  |  |
| 41 | SUB |  | 14 |  |  |
| 41 | SUB |  | 16 |  |  |
| 41 | SUB |  | 18 |  | output-Subtract x1-x2 |
| 41 | SUB | UNUSED | 20 |  |  |
| 41 | SUB | UNUSED | 21 |  |  |

| FBID | FBName | ByteCfg | ByteOffset | Negate | Comments |
|---|---|---|---|---|---|
| 42 | MUL |  | 0 |  | Loop Type |
| 42 | MUL | UNUSED | 1 |  |  |
| 42 | MUL |  | 2 |  | x1 |
| 42 | MUL |  | 4 |  | x2 |
| 42 | MUL |  | 6 |  |  |
| 42 | MUL |  | 8 |  |  |
| 42 | MUL |  | 10 |  |  |
| 42 | MUL |  | 12 |  |  |
| 42 | MUL |  | 14 |  |  |
| 42 | MUL |  | 16 |  |  |
| 42 | MUL |  | 18 |  | output-Multiply |
| 42 | MUL | UNUSED | 20 |  |  |
| 42 | MUL | UNUSED | 21 |  |  |
| 43 | DIV |  | 0 |  | Loop Type |

| FBID | FBName | ByteCfg | ByteOffset | Negate | Comments |
|---|---|---|---|---|---|
| 43 | DIV | UNUSED | 1 | | |
| 43 | DIV | | 2 | | x1 Numerator |
| 43 | DIV | | 4 | | x2 Denominator |
| 43 | DIV | | 6 | | |
| 43 | DIV | | 8 | | |
| 43 | DIV | | 10 | | |
| 43 | DIV | | 12 | | |
| 43 | DIV | | 14 | | |
| 43 | DIV | | 16 | | |
| 43 | DIV | | 18 | | output-Divide |
| 43 | DIV | UNUSED | 20 | | |
| 43 | DIV | UNUSED | 21 | | |

| FBID | FBName | ByteCfg | ByteOffset | Negate | Comments |
|---|---|---|---|---|---|
| 44 | SQRT | | 0 | | Loop Type |
| 44 | SQRT | UNUSED | 1 | | |
| 44 | SQRT | | 2 | | x1 |
| 44 | SQRT | | 4 | | 0=sqrt of abs value; 1=invalid if negative |
| 44 | SQRT | | 6 | | |
| 44 | SQRT | | 8 | | |
| 44 | SQRT | | 10 | | |
| 44 | SQRT | | 12 | | |
| 44 | SQRT | | 14 | | |
| 44 | SQRT | | 16 | | |
| 44 | SQRT | | 18 | | output-Square root |
| 44 | SQRT | UNUSED | 20 | | |
| 44 | SQRT | UNUSED | 21 | | |
| 45 | POW | | 0 | | |
| 45 | POW | UNUSED | 1 | | |
| 45 | POW | | 2 | | base |
| 45 | POW | | 4 | | exponent |
| 45 | POW | | 6 | | 0=use abs of x; 1=invalid if x is negative |
| 45 | POW | | 8 | | output-Exponential |
| 45 | POW | | 10 | | |
| 45 | POW | | 12 | | |
| 45 | POW | | 14 | | |
| 45 | POW | | 16 | | |
| 45 | POW | | 18 | | |
| 45 | POW | UNUSED | 20 | | |
| 45 | POW | UNUSED | 21 | | |

| FBID | FBName | ByteCfg | ByteOffset | Negate | Comments |
|---|---|---|---|---|---|
| 47 | DIG_FILT | | 0 | | Loop Type |
| 47 | DIG_FILT | UNUSED | 1 | | |
| 47 | DIG_FILT | | 2 | | x |
| 47 | DIG_FILT | | 4 | | tau - seconds |
| 47 | DIG_FILT | | 6 | | output-Filtered |
| 47 | DIG_FILT | | 8 | | |

| | | | | | |
|---|---|---|---|---|---|
| 47 | DIG_FILT | | 10 | | |
| 47 | DIG_FILT | | 12 | | |
| 47 | DIG_FILT | | 14 | | |
| 47 | DIG_FILT | | 16 | | |
| 47 | DIG_FILT | | 18 | | |
| 47 | DIG_FILT | UBYTE | 20 | | 0=init filt to 1st value; 1=init filt to 0.0 |
| 47 | DIG_FILT | UNUSED | 21 | | |
| 48 | ENTH | | 0 | | Loop Type |
| 48 | ENTH | UNUSED | 1 | | |
| 48 | ENTH | | 2 | | temp |
| 48 | ENTH | | 4 | | relative humidity |
| 48 | ENTH | | 6 | | output-Enthalpy |
| 48 | ENTH | | 8 | | |
| 48 | ENTH | | 10 | | |
| 48 | ENTH | | 12 | | |
| 48 | ENTH | | 14 | | |
| 48 | ENTH | | 16 | | |
| 48 | ENTH | | 18 | | |
| 48 | ENTH | UNUSED | 20 | | |
| 48 | ENTH | UNUSED | 21 | | |

| FBID | FBName | ByteCfg | ByteOffset | Negate | Comments |
|---|---|---|---|---|---|
| 49 | RATIO | | 0 | | Loop Type |
| 49 | RATIO | UNUSED | 1 | | |
| 49 | RATIO | | 2 | | x |
| 49 | RATIO | | 4 | | in x1 |
| 49 | RATIO | | 6 | | in y1 |
| 49 | RATIO | | 8 | | in x2 |
| 49 | RATIO | | 10 | | in y2 |
| 49 | RATIO | | 12 | | output-Ratio |
| 49 | RATIO | | 14 | | |
| 49 | RATIO | | 16 | | |
| 49 | RATIO | | 18 | | |
| 49 | RATIO | RatioOp | 20 | | 0=unlimited, 1=vavFlowBal, 2=endpt Limited |
| 49 | RATIO | UNUSED | 21 | | |
| 50 | LIMIT | | 0 | | Loop Type |
| 50 | LIMIT | UNUSED | 1 | | |
| 50 | LIMIT | | 2 | | input |
| 50 | LIMIT | | 4 | | high Limit |
| 50 | LIMIT | | 6 | | low Limit |
| 50 | LIMIT | | 8 | | output-Limit |
| 50 | LIMIT | | 10 | | |
| 50 | LIMIT | | 12 | | |
| 50 | LIMIT | | 14 | | |
| 50 | LIMIT | | 16 | | |
| 50 | LIMIT | | 18 | | |
| 50 | LIMIT | UNUSED | 20 | | |
| 50 | LIMIT | UNUSED | 21 | | |

| FBID | FBName | ByteCfg | ByteOffset | Negate | Comments |
|---|---|---|---|---|---|
| 51 | RESET | | 0 | | Loop Type |
| 51 | RESET | UNUSED | 1 | | |
| 51 | RESET | | 2 | | input |
| 51 | RESET | | 4 | | sensor |
| 51 | RESET | | 6 | | zeroPctResetVal |
| 51 | RESET | | 8 | | hundredPctResetVal |
| 51 | RESET | | 10 | | resetAmount |
| 51 | RESET | | 12 | | output-Reset |
| 51 | RESET | | 14 | | |
| 51 | RESET | | 16 | | |
| 51 | RESET | | 18 | | |
| 51 | RESET | UNUSED | 20 | | |
| 51 | RESET | UNUSED | 21 | | |
| 52 | VELP | | 0 | | Loop Type |
| 52 | VELP | UNUSED | 1 | | |
| 52 | VELP | | 2 | | pressure |
| 52 | VELP | | 4 | | K Factor |
| 52 | VELP | | 6 | | auto set offest |
| 52 | VELP | | 8 | | clear offset |
| 52 | VELP | | 10 | | area |
| 52 | VELP | | 12 | | output-Flow |
| 52 | VELP | | 14 | | output-Offset |
| 52 | VELP | | 16 | | output-Velocity |
| 52 | VELP | | 18 | | |
| 52 | VELP | UNUSED | 20 | | |
| 52 | VELP | UNUSED | 21 | | |

| FBID | FBName | ByteCfg | ByteOffset | Negate | Comments |
|---|---|---|---|---|---|
| 60 | PID | | 0 | | Loop Type |
| 60 | PID | UNUSED | 1 | | |
| 60 | PID | | 2 | | input |
| 60 | PID | | 4 | | setpoint |
| 60 | PID | | 6 | | disable |
| 60 | PID | | 8 | | throttling range |
| 60 | PID | | 10 | | integral Time - seconds |
| 60 | PID | | 12 | | derivative Time |
| 60 | PID | | 14 | | deadband |
| 60 | PID | | 16 | | deadband delay |
| 60 | PID | | 18 | | output-PID |
| 60 | PID | UBYTE | 20 | | reverse acting |
| 60 | PID | UBYTE | 21 | | bias 0 - 100% |
| 61 | AIA | | 0 | | Loop Type |
| 61 | AIA | UNUSED | 1 | | |
| 61 | AIA | | 2 | | sensor |
| 61 | AIA | | 4 | | setpoint |
| 61 | AIA | | 6 | | disable Integral |
| 61 | AIA | | 8 | | throttling range |
| 61 | AIA | | 10 | | deadband |

| FBID | FBName | ByteCfg | ByteOffset | Negate | Comments |
|---|---|---|---|---|---|
| 61 | AIA | | 12 | | maximum analog ouput change |
| 61 | AIA | | 14 | | derivative Gain |
| 61 | AIA | | 16 | | minimun analog output change |
| 61 | AIA | | 18 | | output-AIA |
| 61 | AIA | UBYTE | 20 | | 0=direct; 1=reverse |
| 61 | AIA | UNUSED | 21 | | delay |

| FBID | FBName | ByteCfg | ByteOffset | Negate | Comments |
|---|---|---|---|---|---|
| 62 | CYCLER | | 0 | | Loop Type |
| 62 | CYCLER | UBYTE | 1 | | anticipator auth (0-200%) |
| 62 | CYCLER | | 2 | | input (from PID) |
| 62 | CYCLER | | 4 | | maximum stages |
| 62 | CYCLER | | 6 | | minimum On time - seconds |
| 62 | CYCLER | | 8 | | minimum Off time - seconds |
| 62 | CYCLER | | 10 | | interstage Delay On time - seconds |
| 62 | CYCLER | | 12 | | interstage Delay Off time - seconds |
| 62 | CYCLER | | 14 | | override Off |
| 62 | CYCLER | | 16 | | disable |
| 62 | CYCLER | | 18 | | output-Number of stages |
| 62 | CYCLER | UBYTE | 20 | | cycles per Hour |
| 62 | CYCLER | UBYTE | 21 | | Hysteresis - note Antcipator = 4 * hyst |
| 63 | STAGER | | 0 | | Loop Type |
| 63 | STAGER | UBYTE | 1 | | anticipator Auth (0-200%) |
| 63 | STAGER | | 2 | | input (from PID) |
| 63 | STAGER | | 4 | | maximum stages |
| 63 | STAGER | | 6 | | minimum On time - seconds |
| 63 | STAGER | | 8 | | minimum Off time - seconds |
| 63 | STAGER | | 10 | | interstage Delay On time - seconds |
| 63 | STAGER | | 12 | | interstage Delay Off time - seconds |
| 63 | STAGER | | 14 | | override Off |
| 63 | STAGER | | 16 | | disable |
| 63 | STAGER | | 18 | | output-Number of stages |
| 63 | STAGER | UBYTE | 20 | | Must be Zero |
| 63 | STAGER | UBYTE | 21 | | Hysteresis - note Antcipator = 4 * hyst |

| FBID | FBName | ByteCfg | ByteOffset | Negate | Comments |
|---|---|---|---|---|---|
| 64 | STAGEDRIV | | 0 | | Loop Type |
| 64 | STAGEDRIV | UNUSED | 1 | | |
| 64 | STAGEDRIV | | 2 | | input (number of Stages active) |
| 64 | STAGEDRIV | | 4 | | runtime reset |
| 64 | STAGEDRIV | | 6 | | output-Stage 1 |
| 64 | STAGEDRIV | | 8 | | output-Stage 2 |
| 64 | STAGEDRIV | | 10 | | output-Stage 3 |

| FBID | FBName | ByteCfg | ByteOffset | Negate | Comments |
|---|---|---|---|---|---|
| 64 | STAGEDRIV | | 12 | | output-Stage 4 |
| 64 | STAGEDRIV | | 14 | | output-Stage 5 |
| 64 | STAGEDRIV | | 16 | | output-Stage status |
| 64 | STAGEDRIV | | 18 | | Internal Use Only |
| 64 | STAGEDRIV | UBYTE | 20 | | STD=0;FOFO=1;RUNEQ=2 |
| 64 | STAGEDRIV | UBYTE | 21 | | maximum number of stages |
| 65 | RATE_LIM | | 0 | | Loop Type |
| 65 | RATE_LIM | UNUSED | 1 | | |
| 65 | RATE_LIM | | 2 | | Input |
| 65 | RATE_LIM | | 4 | | disable |
| 65 | RATE_LIM | | 6 | | start value |
| 65 | RATE_LIM | | 8 | | up rate (0 = not used) |
| 65 | RATE_LIM | | 10 | | down rate (0 = not used) |
| 65 | RATE_LIM | | 12 | | start interval (if 0 then always rate limit) |
| 65 | RATE_LIM | | 14 | | output-Rate limit |
| 65 | RATE_LIM | | 16 | | |
| 65 | RATE_LIM | | 18 | | |
| 65 | RATE_LIM | UNUSED | 20 | | |
| 65 | RATE_LIM | UNUSED | 21 | | |

| FBID | FBName | ByteCfg | ByteOffset | Negate | Comments |
|---|---|---|---|---|---|
| 66 | FLOW_CNTRL | | 0 | | Loop Type |
| 66 | FLOW_CNTRL | UNUSED | 1 | | |
| 66 | FLOW_CNTRL | | 2 | | command flow percent |
| 66 | FLOW_CNTRL | | 4 | | flow sensor |
| 66 | FLOW_CNTRL | | 6 | | minimun flow SP |
| 66 | FLOW_CNTRL | | 8 | | maximum flow SP |
| 66 | FLOW_CNTRL | | 10 | | manual flow override |
| 66 | FLOW_CNTRL | | 12 | | manual flow value |
| 66 | FLOW_CNTRL | | 14 | | duct area |
| 66 | FLOW_CNTRL | | 16 | | output-Effective flow SP |
| 66 | FLOW_CNTRL | | 18 | | output-Damper Pos |
| 66 | FLOW_CNTRL | UBYTE | 20 | | units |
| 66 | FLOW_CNTRL | UBYTE | 21 | | motor speed |
| 80 | OVERIDE | | 0 | | Loop Type |
| 80 | OVERIDE | UNUSED | 1 | | |
| 80 | OVERIDE | | 2 | | priority 1 value |
| 80 | OVERIDE | | 4 | | priority 2 value |
| 80 | OVERIDE | | 6 | | priority 3 value |
| 80 | OVERIDE | | 8 | | priority 4 value |
| 80 | OVERIDE | | 10 | | priority 5 value |
| 80 | OVERIDE | | 12 | | priority 6 value |
| 80 | OVERIDE | | 14 | | controller input |
| 80 | OVERIDE | | 16 | | default value |
| 80 | OVERIDE | | 18 | | output-Override |
| 80 | OVERIDE | UNUSED | 20 | | |
| 80 | OVERIDE | UNUSED | 21 | | |

| FBID | FBName | ByteCfg | ByteOffset | Negate | Comments |
|---|---|---|---|---|---|

| FBID | FBName | ByteCfg | ByteOffset | Negate | Comments |
|---|---|---|---|---|---|
| 81 | RUNT_ACCM | | 0 | | Loop Type |
| 81 | RUNT_ACCM | UNUSED | 1 | | |
| 81 | RUNT_ACCM | | 2 | | input |
| 81 | RUNT_ACCM | | 4 | | enable |
| 81 | RUNT_ACCM | | 6 | | preset |
| 81 | RUNT_ACCM | | 8 | | preset value |
| 81 | RUNT_ACCM | | 10 | | output-Runtime minutes |
| 81 | RUNT_ACCM | | 12 | | output-Runtime seconds |
| 81 | RUNT_ACCM | | 14 | | output-Runtime hours |
| 81 | RUNT_ACCM | | 16 | | output-Runtime days |
| 81 | RUNT_ACCM | | 18 | | |
| 81 | RUNT_ACCM | UNUSED | 20 | | |
| 81 | RUNT_ACCM | UNUSED | 21 | | |
| 82 | COUNTER | | 0 | | Loop Type |
| 82 | COUNTER | UNUSED | 1 | | |
| 82 | COUNTER | | 2 | | input |
| 82 | COUNTER | | 4 | | enable |
| 82 | COUNTER | | 6 | | preset |
| 82 | COUNTER | | 8 | | preset value |
| 82 | COUNTER | | 10 | | count value |
| 82 | COUNTER | | 12 | | 0=continue counting; 1=stop at zero |
| 82 | COUNTER | | 14 | | output-Count |
| 82 | COUNTER | | 16 | | |
| 82 | COUNTER | | 18 | | |
| 82 | COUNTER | UNUSED | 20 | | |
| 82 | COUNTER | UNUSED | 21 | | |

| FBID | FBName | ByteCfg | ByteOffset | Negate | Comments |
|---|---|---|---|---|---|
| 83 | ALARM | | 0 | | Loop Type |
| 83 | ALARM | UNUSED | 1 | | |
| 83 | ALARM | | 2 | | value |
| 83 | ALARM | | 4 | | high Limit |
| 83 | ALARM | | 6 | | low Limit |
| 83 | ALARM | | 8 | | preset Time |
| 83 | ALARM | | 10 | | post time |
| 83 | ALARM | | 12 | | disable |
| 83 | ALARM | | 14 | | output-Alarm Status |
| 83 | ALARM | | 16 | | |
| 83 | ALARM | | 18 | | |
| 83 | ALARM | AlarmID | 20 | | Val 48-79 nvoError bit position |
| 83 | ALARM | UNUSED | 21 | | |
| 100 | OCC_ARB | | 0 | | Loop Type |
| 100 | OCC_ARB | UNUSED | 1 | | |
| 100 | OCC_ARB | | 2 | | schedule current state |
| 100 | OCC_ARB | | 4 | | wall module override |
| 100 | OCC_ARB | | 6 | | network manual occ command |
| 100 | OCC_ARB | | 8 | | occ sensor |

| FBID | FBName | ByteCfg | ByteOffset | Negate | Comments |
|---|---|---|---|---|---|
| 100 | OCC_ARB | | 10 | | output-Effective current occ state |
| 100 | OCC_ARB | | 12 | | output-Man Override |
| 100 | OCC_ARB | | 14 | | |
| 100 | OCC_ARB | | 16 | | |
| 100 | OCC_ARB | | 18 | | |
| 100 | OCC_ARB | UBYTE | 20 | | 0=net wins; 1=last in wins |
| 100 | OCC_ARB | UBYTE | 21 | | 0=cr; 1=cc; 2=tenant |
| FBID | FBName | ByteCfg | ByteOffset | Negate | Comments |
| 101 | GEN_SPCALC | | 0 | | Loop Type |
| 101 | GEN_SPCALC | UNUSED | 1 | | |
| 101 | GEN_SPCALC | | 2 | | effective Occ current state |
| 101 | GEN_SPCALC | | 4 | | reset input |
| 101 | GEN_SPCALC | | 6 | | reset 0 % |
| 101 | GEN_SPCALC | | 8 | | reset 100% |
| 101 | GEN_SPCALC | | 10 | | reset amount |
| 101 | GEN_SPCALC | | 12 | | occupied setpoint |
| 101 | GEN_SPCALC | | 14 | | standby setpoint |
| 101 | GEN_SPCALC | | 16 | | unoccupied setpoint |
| 101 | GEN_SPCALC | | 18 | | output-Effective setpoint |
| 101 | GEN_SPCALC | UNUSED | 20 | | |
| 101 | GEN_SPCALC | UNUSED | 21 | | |
| 102 | TEMP_SPCALC | | 0 | | Loop Type |
| 102 | TEMP_SPCALC | UNUSED | 1 | | |
| 102 | TEMP_SPCALC | | 2 | | effective occ current state |
| 102 | TEMP_SPCALC | | 4 | | sched next state |
| 102 | TEMP_SPCALC | | 6 | | sched Time until next change of state |
| 102 | TEMP_SPCALC | | 8 | | setpoint (<10 = offset) |
| 102 | TEMP_SPCALC | | 10 | | heat ramp rate |
| 102 | TEMP_SPCALC | | 12 | | cool ramp rate |
| 102 | TEMP_SPCALC | | 14 | | man override state |
| 102 | TEMP_SPCALC | | 16 | | output-effective heat setpoint |
| 102 | TEMP_SPCALC | | 18 | | output-effective cool setpoint |
| 102 | TEMP_SPCALC | UNUSED | 20 | | |
| 102 | TEMP_SPCALC | UNUSED | 21 | | |
| FBID | FBName | ByteCfg | ByteOffset | Negate | Comments |
| 103 | TEMP_MODE | | 0 | | Loop Type |
| 103 | TEMP_MODE | UNUSED | 1 | | |
| 103 | TEMP_MODE | | 2 | | system switch |
| 103 | TEMP_MODE | | 4 | | command mode |
| 103 | TEMP_MODE | | 6 | | supply temp |
| 103 | TEMP_MODE | | 8 | | space temp |
| 103 | TEMP_MODE | | 10 | | effective heating setpoint |
| 103 | TEMP_MODE | | 12 | | effective cooling setpoint |
| 103 | TEMP_MODE | | 14 | | Auto changeover enable/disable |
| 103 | TEMP_MODE | | 16 | | output-Current effective setpoint |

| | | | | | |
|---|---|---|---|---|---|
| 103 | TEMP_MODE | | 18 | | output-Effective temperature mode |
| 103 | TEMP_MODE | UBYTE | 20 | | control type (0=CVAHU; 1=VAV) |
| 103 | TEMP_MODE | UNUSED | 21 | | |
| 104 | STAGEDRIV_ADD | | 0 | | Loop Type |
| 104 | STAGEDRIV_ADD | UNUSED | 1 | | |
| 104 | STAGEDRIV_ADD | | 2 | | input |
| 104 | STAGEDRIV_ADD | | 4 | | output-Stage 1 |
| 104 | STAGEDRIV_ADD | | 6 | | output-Stage 2 |
| 104 | STAGEDRIV_ADD | | 8 | | output-Stage 3 |
| 104 | STAGEDRIV_ADD | | 10 | | output-Stage 4 |
| 104 | STAGEDRIV_ADD | | 12 | | output-Stage 5 |
| 104 | STAGEDRIV_ADD | | 14 | | output-Stage 6 |
| 104 | STAGEDRIV_ADD | | 16 | | output-Stage 7 |
| 104 | STAGEDRIV_ADD | | 18 | | output-Stage 8 |
| 104 | STAGEDRIV_ADD | UBYTE | 20 | | first stage enumeration |
| 104 | STAGEDRIV_ADD | UNUSED | 21 | | |

| FBID | FBName | ByteCfg | ByteOffset | Negate | Comments |
|---|---|---|---|---|---|
| 129 | SCHED_SP | | 0 | | Loop Type |
| 129 | SCHED_SP | UNUSED | 1 | | |
| 129 | SCHED_SP | | 2 | | output-Schedule current state |
| 129 | SCHED_SP | | 4 | | output-Schedule next state |
| 129 | SCHED_SP | | 6 | | output-Schedule time unitil next change of state |
| 129 | SCHED_SP | | 8 | | |
| 129 | SCHED_SP | | 10 | | |
| 129 | SCHED_SP | | 12 | | |
| 129 | SCHED_SP | | 14 | | |
| 129 | SCHED_SP | | 16 | | |
| 129 | SCHED_SP | | 18 | | |
| 129 | SCHED_SP | UNUSED | 20 | | |
| 129 | SCHED_SP | UNUSED | 21 | | |
| 130 | WALL_MOD | | 0 | | Loop Type |
| 130 | WALL_MOD | UNUSED | 1 | | |
| 130 | WALL_MOD | | 2 | | space temperature |
| 130 | WALL_MOD | | 4 | | setpoint |
| 130 | WALL_MOD | | 6 | | override |
| 130 | WALL_MOD | | 8 | | effective override state |

| | | | |
|---|---|---|---|
| 130 | WALL_MOD | | 10 | output-Space temperature
| 130 | WALL_MOD | | 12 | output-Setpoint
| 130 | WALL_MOD | | 14 | output-Wall module override
| 130 | WALL_MOD | | 16 | output-LED
| 130 | WALL_MOD | | 18 |
| 130 | WALL_MOD | UNUSED | 20 |
| 130 | WALL_MOD | UNUSED | 21 |

What is claimed is:

1. An air flow balancing system comprising:
   at least one pressure-based air flow sensor;
   a conditioner connected to the air flow sensor;
   an averaging and filter module connected to the conditioner;
   a linearizer connected to the averaging and filter module;
   a variable storage module connected to the linearizer;
   an air flow balancing block implementation module connected to the variable storage module;
   wherein inputs to the air flow balancing block implementation module comprise an air flow pressure, a duct area, a maximum flow speed, and/or a minimum flow speed; and
   wherein a balancing block of the balancing block implementation module is of a function block engine.

2. The system of claim 1, wherein an output of the conditioner is a voltage indicative of a magnitude of pressure.

3. The system of claim 2, further comprising:
   an analog-to-digital converter connected between the conditioner and the averaging and filter module; and
   wherein the analog-to-digital converter is for converting voltage into counts indicative of the magnitude of pressure.

4. The system of claim 3, wherein the averaging and filter module is for providing filtered average counts.

5. The system of claim 3, wherein the linearizer is for providing linearized counts.

6. The system of claim 1, wherein a signal from the linearizer is to be converted and/or corrected to a flow signal in accordance with a multipoint curve using linear interpolation between points of the curve.

7. The system of claim 1, further comprising an operating system connected between the variable storage module and the balancing block implementation module.

8. The system of claim 1, wherein the variable storage module is adapted to a standard protocol for connection to a communication bus.

* * * * *

UNITED STATES PATENT AND TRADEMARK OFFICE
CERTIFICATE OF CORRECTION

PATENT NO. : 7,653,459 B2 Page 1 of 1
APPLICATION NO. : 11/620431
DATED : January 26, 2010
INVENTOR(S) : Pouchak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 391 days.

Signed and Sealed this

Twenty-third Day of November, 2010

David J. Kappos
*Director of the United States Patent and Trademark Office*